United States Patent
Okada

(10) Patent No.: US 7,219,561 B2
(45) Date of Patent: May 22, 2007

(54) FORCE-DETECTING DEVICE

(75) Inventor: Kazuhiro Okada, Ageo (JP)

(73) Assignee: Wacoh Corporation, Saitama (JP)

( * ) Notice: Subject to any disclaimer, the term of this patent is extended or adjusted under 35 U.S.C. 154(b) by 0 days.

(21) Appl. No.: 10/547,459

(22) PCT Filed: Apr. 15, 2004

(86) PCT No.: PCT/JP2004/005387

§ 371 (c)(1),
(2), (4) Date: Aug. 30, 2005

(87) PCT Pub. No.: WO2004/097360

PCT Pub. Date: Nov. 11, 2004

(65) Prior Publication Data

US 2006/0169060 A1 Aug. 3, 2006

(30) Foreign Application Priority Data

Apr. 28, 2003 (JP) ............................. 2003-123243

(51) Int. Cl.
*G01D 7/00* (2006.01)
(52) U.S. Cl. ................................................ 73/862.043
(58) Field of Classification Search ........... 73/862.041, 73/862.043, 862.044, 862.045
See application file for complete search history.

(56) References Cited

U.S. PATENT DOCUMENTS

| 4,088,015 | A | 5/1978 | Wolfer |
| 4,092,854 | A | 6/1978 | Henry et al. |

(Continued)

FOREIGN PATENT DOCUMENTS

| EP | 0 538 899 | 4/1993 |
| JP | 59-20828 | 2/1984 |
| JP | 63-12930 | 1/1988 |
| JP | 63-33647 | 7/1988 |
| JP | 2549289 | 8/1996 |
| JP | 2000-249609 | 9/2000 |

OTHER PUBLICATIONS

Patent Abstracts of Japan of JP 2549289 dated Aug. 8, 1996 (Publication No. 63-255635).
Patent Abstracts of Japan of JP 63-33647 dated Jul. 6, 1988 (Publication No. 57-118132).
English translation of JP 59-20808 dated Feb. 2, 1984.
"Compact Three-Degree of Freedom Load Cell" IBM Technical Disclosure Bulletin (1995) vol. 38, No. 9 pp. 435-437.

*Primary Examiner*—Michael Cygan
*Assistant Examiner*—O. Davis
(74) *Attorney, Agent, or Firm*—Ladas and Parry LLP

(57) ABSTRACT

Forces and moments are detected in a distinguishing manner by a simple structure. A supporting member (20) is positioned below a force receiving member (10), which receives forces to be detected, and between these components, four columnar force transmitting members (11 to 14) are connected. Connecting members, having flexibility, are interposed at the upper and lower ends of each of the columnar force transmitting members (11 to 14) so that the columnar force transmitting members (11 to 14) can become inclined when the force receiving member (10) becomes displaced upon receiving a force. Sensors (21 to 24), each equipped with capacitance elements, are positioned at the connections parts of the respective columnar force transmitting members (11 to 14) and the supporting member (20) to detect forces that are transmitted from the respective columnar force transmitting members (11 to 14) to the supporting member (20). Based on the detection values of the sensors (21 to 24), a detection circuit (30) detects, in a distinguishing manner, forces and moments acting on the force receiving member (10). All of forces Fx, Fy, and Fz and moments Mx, My, and Mz can be detected.

53 Claims, 35 Drawing Sheets

U.S. PATENT DOCUMENTS

| | | |
|---|---|---|
| 4,094,192 A | 6/1978 | Watson et al. |
| 4,099,409 A | 7/1978 | Edmond |
| 4,149,422 A | 4/1979 | Olsen et al. |
| 4,398,429 A | 8/1983 | Cook et al. |
| 4,444,061 A | 4/1984 | Mathias |
| 4,550,617 A | 11/1985 | Fraignier et al. |
| 4,560,017 A | 12/1985 | Hood |
| 4,788,869 A | 12/1988 | Li |
| 4,799,562 A | 1/1989 | Burrows et al. |
| 4,849,730 A | 7/1989 | Izumi et al. |
| 4,905,523 A | 3/1990 | Okada ............ 73/862.04 |
| 4,967,605 A | 11/1990 | Okada ............ 73/862.04 |
| 4,969,366 A | 11/1990 | Okada ............ 73/862.08 |
| 5,014,415 A | 5/1991 | Okada ............ 29/621.1 |
| 5,035,148 A | 7/1991 | Okada ............ 73/862.04 |
| 5,092,645 A | 3/1992 | Okada ............ 294/86.4 |
| 5,182,515 A | 1/1993 | Okada ............ 324/259 |
| 5,231,386 A | 7/1993 | Brandenburg et al. |
| 5,263,375 A | 11/1993 | Okada ............ 73/862.042 |
| 5,295,386 A | 3/1994 | Okada ............ 73/1 D |
| 5,343,765 A | 9/1994 | Okada ............ 73/862.043 |
| 5,348,519 A | 9/1994 | Prince et al. |
| 5,365,799 A | 11/1994 | Okada ............ 73/862.041 |
| 5,392,658 A | 2/1995 | Okada ............ 73/862.043 |
| 5,406,848 A | 4/1995 | Okada ............ 73/517 R |
| 5,421,213 A | 6/1995 | Okada ............ 73/862.043 |
| 5,437,196 A | 8/1995 | Okada ............ 73/862.043 |
| 5,492,020 A | 2/1996 | Okada ............ 73/862.626 |
| 5,497,668 A | 3/1996 | Okada ............ 73/862.626 |
| 5,506,568 A | 4/1996 | Chen |
| 5,531,002 A | 7/1996 | Okada ............ 29/25.41 |
| 5,531,092 A | 7/1996 | Okada ............ 73/1 D |
| 5,548,092 A | 8/1996 | Shriver |
| 5,571,972 A | 11/1996 | Okada ............ 73/862.043 |
| 5,639,973 A | 6/1997 | Okada ............ 73/862.043 |
| 5,646,346 A | 7/1997 | Okada ............ 73/504.04 |
| 5,668,318 A | 9/1997 | Okada ............ 73/504.11 |
| 5,682,000 A | 10/1997 | Okada ............ 73/862.043 |
| 5,744,718 A | 4/1998 | Okada ............ 73/514.33 |
| 5,780,749 A | 7/1998 | Okada ............ 73/862.043 |
| 5,811,693 A | 9/1998 | Okada ............ 73/862.043 |
| 5,823,278 A | 10/1998 | Geringer |
| 5,831,163 A | 11/1998 | Okada ............ 73/504.12 |
| 5,850,040 A | 12/1998 | Okada ............ 73/504.04 |
| 5,856,620 A | 1/1999 | Okada ............ 73/514.32 |
| 5,962,787 A | 10/1999 | Okada et al. ............ 73/514.32 |
| 5,987,985 A | 11/1999 | Okada ............ 73/504.04 |
| 6,003,371 A | 12/1999 | Okada ............ 73/504.02 |
| 6,053,057 A | 4/2000 | Okada ............ 73/862.043 |
| 6,076,401 A | 6/2000 | Okada ............ 73/504.12 |
| 6,098,461 A | 8/2000 | Okada ............ 73/514.34 |
| 6,122,846 A | 9/2000 | Gray et al. |
| 6,155,976 A | 12/2000 | Sackner et al. |
| 6,158,291 A | 12/2000 | Okada ............ 73/862.043 |
| 6,159,761 A | 12/2000 | Okada ............ 438/53 |
| 6,185,814 B1 | 2/2001 | Okada ............ 29/621.1 |
| 6,205,856 B1 | 3/2001 | Okada ............ 73/504.11 |
| 6,269,697 B1 | 8/2001 | Okada ............ 73/504.02 |
| 6,282,956 B1 | 9/2001 | Okada ............ 73/504.12 |
| 6,314,823 B1 | 11/2001 | Okada ............ 73/862.043 |
| 6,367,326 B1 | 4/2002 | Okada ............ 73/504.12 |
| 6,378,381 B1 | 4/2002 | Okada et al. ............ 73/862.043 |
| 6,422,096 B1 | 7/2002 | Bulat |
| 6,474,133 B1 | 11/2002 | Okada ............ 73/1.38 |
| 6,477,903 B2 | 11/2002 | Okada ............ 73/862.043 |
| 6,512,364 B1 | 1/2003 | Okada ............ 324/158.1 |
| 6,530,283 B2 | 3/2003 | Okada et al. ............ 73/780 |
| 6,668,659 B2 | 12/2003 | Morikawa et al. |
| 6,716,253 B2 | 4/2004 | Okada ............ 73/52 |
| 6,772,632 B2 | 8/2004 | Okada ............ 73/514.38 |
| 6,779,408 B2 | 8/2004 | Okada et al. ............ 324/681 |
| 6,809,529 B2 | 10/2004 | Okada |
| 6,823,744 B2 | 11/2004 | Ohsato et al. |
| 6,859,048 B2 | 2/2005 | Okada |
| 6,864,677 B1 | 3/2005 | Okada |
| 6,865,943 B2 | 3/2005 | Okada |
| 6,894,482 B2 | 5/2005 | Okada |
| 6,915,709 B2 | 7/2005 | Okada |
| 6,920,788 B2 | 7/2005 | Okada |
| 2002/0163509 A1 | 11/2002 | Roberts |

|     | C11 | C12 | C13 | C14 | C15 | C21 | C22 | C23 | C24 | C25 |
|-----|-----|-----|-----|-----|-----|-----|-----|-----|-----|-----|
| +Fx | +   | −   | 0   | 0   | 0   | +   | −   | 0   | 0   | 0   |
| +Fy | 0   | 0   | +   | −   | 0   | 0   | 0   | +   | −   | 0   |
| +Fz | −   | −   | −   | −   | −   | −   | −   | −   | −   | −   |
| +Mx | −   | −   | −   | −   | −   | −   | −   | −   | −   | −   |
| +My | +   | +   | +   | +   | +   | −   | −   | −   | −   | −   |
| +Mz | −   | +   | +   | −   | 0   | −   | +   | −   | +   | 0   |

Fig.14A

|     | C31 | C32 | C33 | C34 | C35 | C41 | C42 | C43 | C44 | C45 |
|-----|-----|-----|-----|-----|-----|-----|-----|-----|-----|-----|
| +Fx | +   | −   | 0   | 0   | 0   | +   | −   | 0   | 0   | 0   |
| +Fy | 0   | 0   | +   | −   | 0   | 0   | 0   | +   | −   | 0   |
| +Fz | −   | −   | −   | −   | −   | −   | −   | −   | −   | −   |
| +Mx | +   | +   | +   | +   | +   | +   | +   | +   | +   | +   |
| +My | −   | −   | −   | −   | −   | +   | +   | +   | +   | +   |
| +Mz | +   | −   | −   | +   | 0   | +   | −   | +   | −   | 0   |

Fig.14B $Fx = (C11-C12)+(C21-C22)+(C31-C32)+(C41-C42)$ $Fy = (C13-C14)+(C23-C24)+(C33-C34)+(C43-C44)$ $Fz = -(C15+C25+C35+C45)$ $Mx = -(((C11+C12+C13+C14+C15)+(C21+C22+C23+C24+C25))$
$\phantom{Mx = }-((C31+C32+C33+C34+C35)+(C41+C42+C43+C44+C45)))$ $My = ((C11+C12+C13+C14+C15)+(C41+C42+C43+C44+C45))$
$\phantom{My =}-((C21+C22+C23+C24+C25)+(C31+C32+C33+C34+C35))$ $Mz = (((C31-C32)+(C41-C42))-((C11-C12)+(C21-C22)))$
$\phantom{Mz =}+(((C13-C14)+(C43-C44))-((C23-C24)+(C33-C34)))$ Fx= (C11+C21+C31+C41)
     −(C12+C22+C32+C42)

$Fz = -(C15+C25+C35+C45)$ $Mz = (C12+C13+C22+C24+C31+C34+C41+C43)$
$\quad - (C11+C14+C21+C23+C32+C33+C42+C44)$

|     | C11 | C12 | C13 | C14 | C15 | C21 | C22 | C23 | C24 | C25 |
|-----|-----|-----|-----|-----|-----|-----|-----|-----|-----|-----|
| +Fx | +   | −   | 0   | 0   | 0   | +   | −   | 0   | 0   | 0   |
| +Fy | 0   | 0   | +   | −   | 0   | 0   | 0   | +   | −   | 0   |
| +Fz | −   | −   | −   | −   | −   | −   | −   | −   | −   | −   |
| +Mx | 0   | 0   | 0   | 0   | 0   | 0   | 0   | 0   | 0   | 0   |
| +My | +   | +   | +   | +   | +   | −   | −   | −   | −   | −   |
| +Mz | 0   | 0   | +   | −   | 0   | 0   | 0   | −   | +   | 0   |

Fig.28A

|     | C31 | C32 | C33 | C34 | C35 | C41 | C42 | C43 | C44 | C45 |
|-----|-----|-----|-----|-----|-----|-----|-----|-----|-----|-----|
| +Fx | +   | −   | 0   | 0   | 0   | +   | −   | 0   | 0   | 0   |
| +Fy | 0   | 0   | +   | −   | 0   | 0   | 0   | +   | −   | 0   |
| +Fz | −   | −   | −   | −   | −   | −   | −   | −   | −   | −   |
| +Mx | −   | −   | −   | −   | −   | +   | +   | +   | +   | +   |
| +My | 0   | 0   | 0   | 0   | 0   | 0   | 0   | 0   | 0   | 0   |
| +Mz | −   | +   | 0   | 0   | 0   | +   | −   | 0   | 0   | 0   |

FORCE-DETECTING DEVICE

TECHNICAL FIELD

This invention concerns a force detection device, and particularly concerns a force detection device suited for measuring forces and moments independently.

BACKGROUND ART

Various types of force detection devices are used for controlling the motions of robots and industrial machines. Compact force detection devices are also incorporated as man-machine interfaces of input devices for electronic equipment. In order to achieve miniaturization and cost reduction, a force detection device that is used in such an application is required to be as simple in structure as possible and yet enable forces of the respective coordinate axes in three-dimensional space to be detected independent of each other.

Multi-axis force detection devices that are presently used can be classified into a type, with which specific directional components of a force that acts on a three-dimensional structure are detected as displacements that arise at a specific part, and a type, with which the directional components are detected as mechanical strains that arise at a specific part. A capacitance element type force detection device is a representative device of the former displacement detection type, and with this device, a capacitance element is comprised of a pair of electrodes and the displacement arising at one of the electrodes due to an acting force is detected based on the static capacitance value of the capacitance element. Such a static capacitance type force detection device is disclosed, for example, in Japanese Patent Publication No. 215627/1993. Meanwhile, a strain gauge type force detection device is a representative device of the latter strain detection type, and with this device, the mechanical strain that arises as a result of an acting force is detected as a change of gauge resistance or other form of electrical resistance. Such a strain gauge type force detection device is disclosed, for example, in Japanese Patent Publication No. 292029/1986.

In general, the objects of detection by a force detection device are force components in the direction of predetermined coordinate axes and moment components about the predetermined coordinate axes. In the case where an XYZ three-dimensional coordinate system is defined in three-dimensional space, the objects of detection will be the six components of the force components Fx, Fy, and Fz in the directions of the respective coordinate axes and the moment components Mx, My, and Mz about the respective coordinate axes. However priorly, regardless of the displacement detection type or the strain detection type, a force detection device of a considerably complex three-dimensional structure was required to detect the respective components independent of each other.

Thus an object of this invention is to provide a force detection device that can detect forces and moments in a distinguishing manner by means of a structure that is as simple as possible.

DISCLOSURE OF INVENTION (1) The first feature of the present invention resides in a force detection device comprising:

a force receiving member receiving forces to be detected;
a supporting member positioned below the force receiving member;
a first force transmitting member having an upper end thereof connected to the force receiving member and a lower end thereof connected via a connecting member, having flexibility, to the supporting member;
a second force transmitting member having an upper end thereof connected to the force receiving member and a lower end thereof connected via a connecting member, having flexibility, to the supporting member;
a third force transmitting member having an upper end thereof connected to the force receiving member and a lower end thereof connected via a connecting member, having flexibility, to the supporting member;
a fourth force transmitting member having an upper end thereof connected to the force receiving member and a lower end thereof connected via a connecting member, having flexibility, to the supporting member;
a first sensor having capacitance elements each of which comprises a fixed electrode fixed to the supporting member, and a displaceable electrode fixed to a displaceable surface that becomes displaced in accordance to a displacement of a lower part of the first force transmitting member;
a second sensor having capacitance elements each of which comprises a fixed electrode fixed to the supporting member, and a displaceable electrode fixed to a displaceable surface that becomes displaced in accordance to a displacement of a lower part of the second force transmitting member;
a third sensor having capacitance elements each of which comprises a fixed electrode fixed to the supporting member, and a displaceable electrode fixed to a displaceable surface that becomes displaced in accordance to a displacement of a lower part of the third force transmitting member;
a fourth sensor having capacitance elements each of which comprises a fixed electrode fixed to the supporting member, and a displaceable electrode fixed to a displaceable surface that becomes displaced in accordance to a displacement of a lower part of the fourth force transmitting member;
wiring, dividing the respective capacitance elements of the first to fourth sensors into a plurality of groups and connecting the plurality of capacitance elements, belonging to the same group, to each other in parallel; and
a detection circuit detecting a force or a moment, acting on the force receiving member, based on a difference between an overall static capacitance value of a set of capacitance elements belonging to one group and an overall static capacitance value of a set of capacitance elements belonging to another group.

(2) The second feature of the present invention resides in a force detection device having the first feature, wherein
when an XYZ three-dimensional coordinate system with an X-axis, a Y-axis and a Z-axis is defined,
each of the first to fourth force transmitting members is comprised of a structure having the Z-axis direction as a longitudinal direction,
a surface on which the fixed electrodes are formed is a surface parallel to an XY plane,
the first sensor has an "X-axis inclination detection capacitance element, belonging to a first group and being positioned at a position at which an electrode interval narrows when the first force transmitting member becomes inclined in a positive X-axis direction", and an "X-axis inclination detection capacitance element, belonging to a second group and being positioned at a position at which an electrode interval widens when the first force transmitting member becomes inclined in the positive X-axis direction", the second sensor has an "X-axis inclination detection capacitance element, belonging to the first group and being positioned at a position at which an electrode interval narrows when the second force transmitting member becomes inclined in the positive X-axis direction", and an "X-axis inclination detection capacitance element, belonging to the second group and being positioned at a position at which an electrode interval widens when the second force transmitting member becomes inclined in the positive X-axis direction", the third sensor has an "X-axis inclination detection capacitance element, belonging to the first group and being positioned at a position at which an electrode interval narrows when the third force transmitting member becomes inclined in the positive X-axis direction", and an "X-axis inclination detection capacitance element, belonging to the second group and being positioned at a position at which an electrode interval widens when the third force transmitting member becomes inclined in the positive X-axis direction", the fourth sensor has an "X-axis inclination detection capacitance element, belonging to the first group and being positioned at a position at which an electrode interval narrows when the fourth force transmitting member becomes inclined in the positive X-axis direction", and an "X-axis inclination detection capacitance element, belonging to the second group and being positioned at a position at which an electrode interval widens when the fourth force transmitting member becomes inclined in the positive X-axis direction", and the detection circuit has a function of detecting a force Fx in the X-axis direction, which acts on the force receiving member, by a difference between an overall static capacitance value of a set of X-axis inclination detection capacitance elements belonging to the first group and an overall static capacitance value of a set of X-axis inclination detection capacitance elements belonging to the second group.

(3) The third feature of the present invention resides in a force detection device having the second feature, wherein the first sensor furthermore has a "Y-axis inclination detection capacitance element, belonging to a third group and being positioned at a position at which an electrode interval narrows when the first force transmitting member becomes inclined in a positive Y-axis direction", and a "Y-axis inclination detection capacitance element, belonging to a fourth group and being positioned at a position at which an electrode interval widens when the first force transmitting member becomes inclined in the positive Y-axis direction", the second sensor furthermore has a "Y-axis inclination detection capacitance element, belonging to the third group and being positioned at a position at which an electrode interval narrows when the second force transmitting member becomes inclined in the positive Y-axis direction", and a "Y-axis inclination detection capacitance element, belonging to the fourth group and being positioned at a position at which an electrode interval widens when the second force transmitting member becomes inclined in the positive Y-axis direction", the third sensor furthermore has a "Y-axis inclination detection capacitance element, belonging to the third group and being positioned at a position at which an electrode interval narrows when the third force transmitting member becomes inclined in the positive Y-axis direction", and a "Y-axis inclination detection capacitance element, belonging to the fourth group and being positioned at a position at which an electrode interval widens when the third force transmitting member becomes inclined in the positive Y-axis direction", the fourth sensor furthermore has a "Y-axis inclination detection capacitance element, belonging to the third group and being positioned at a position at which an electrode interval narrows when the fourth force transmitting member becomes inclined in the positive Y-axis direction", and a "Y-axis inclination detection capacitance element, belonging to the fourth group and being positioned at a position at which an electrode interval widens when the fourth force transmitting member becomes inclined in the positive Y-axis direction", and the detection circuit has a function of detecting a force Fy in the Y-axis direction, which acts on the force receiving member, by a difference between an overall static capacitance value of a set of Y-axis inclination detection capacitance elements belonging to the third group and an overall static capacitance value of a set of Y-axis inclination detection capacitance elements belonging to the fourth group.

(4) The fourth feature of the present invention resides in a force detection device having the second or third feature, wherein the first sensor furthermore has a "Z-axis displacement detection capacitance element, being positioned at a position at which an electrode interval undergoes a change of either narrowing or widening in an overall manner when the first force transmitting member becomes displaced in the Z-axis direction and at which a change such that the electrode interval narrows at one part but widens at another part occurs when the first force transmitting member becomes inclined", the second sensor furthermore has a "Z-axis displacement detection capacitance element, being positioned at a position at which an electrode interval undergoes a change of either narrowing or widening in an overall manner when the second force transmitting member becomes displaced in the Z-axis direction and at which a change such that the electrode interval narrows at one part but widens at another part occurs when the second force transmitting member becomes inclined", the third sensor furthermore has a "Z-axis displacement detection capacitance element, being positioned at a position at which an electrode interval undergoes a change of either narrowing or widening in an overall manner when the third force transmitting member becomes displaced in the Z-axis direction and at which a change such that the electrode interval narrows at one part but widens at another part occurs when the third force transmitting member becomes inclined", the fourth sensor furthermore has a "Z-axis displacement detection capacitance element, being positioned at a position at which an electrode interval undergoes a change of either narrowing or widening in an overall manner when the fourth force transmitting member becomes displaced in the Z-axis direction and at which a change such that the electrode interval narrows at one part but widens at another part occurs when the fourth force transmitting member becomes inclined", the Z-axis displacement detection capacitance elements of the first to fourth sensors are connected to each other in parallel by a wiring, and the detection circuit has a function of detecting a force Fz in the Z-axis direction, which acts on the force receiving member, by an overall static capacitance value of a set of capacitance elements that are connected in parallel.

(5) The fifth feature of the present invention resides in a force detection device having the first feature, wherein when an XYZ three-dimensional coordinate system with an X-axis, a Y-axis and a Z-axis is defined, each of the first to fourth force transmitting members is comprised of a structure having the Z-axis direction as a longitudinal direction, a surface on which the fixed electrodes are formed is a surface parallel to an XY plane, the first sensor has a "Z-axis displacement detection capacitance element, belonging to a first group and being positioned at a position at which an electrode interval widens in an overall manner when the first force transmitting member becomes displaced in a positive Z-axis direction and at which a change such that the electrode interval narrows at one part but widens at another part occurs when the first force transmitting member becomes inclined" and a "Z-axis displacement detection capacitance element, belonging to a second group and being positioned at a position at which an electrode interval narrows in an overall manner when the first force transmitting member becomes displaced in the positive Z-axis direction and at which a change such that the electrode interval narrows at one part but widens at another part occurs when the first force transmitting member becomes inclined", the second sensor has a "Z-axis displacement detection capacitance element, belonging to the first group and being positioned at a position at which an electrode interval widens in an overall manner when the second force transmitting member becomes displaced in the positive Z-axis direction and at which a change such that the electrode interval narrows at one part but widens at another part occurs when the second force transmitting member becomes inclined" and a "Z-axis displacement detection capacitance element, belonging to the second group and being positioned at a position at which an electrode interval narrows in an overall manner when the second force transmitting member becomes displaced in the positive Z-axis direction and at which a change such that the electrode interval narrows at one part but widens at another part occurs when the second force transmitting member becomes inclined", the third sensor has a "Z-axis displacement detection capacitance element, belonging to the first group and being positioned at a position at which an electrode interval widens in an overall manner when the third force transmitting member becomes displaced in the positive Z-axis direction and at which a change such that the electrode interval narrows at one part but widens at another part occurs when the third force transmitting member becomes inclined" and a "Z-axis displacement detection capacitance element, belonging to the second group and being positioned at a position at which an electrode interval narrows in an overall manner when the third force transmitting member becomes displaced in the positive Z-axis direction and at which a change such that the electrode interval narrows at one part but widens at another part occurs when the third force transmitting member becomes inclined", the fourth sensor has a "Z-axis displacement detection capacitance element, belonging to the first group and being positioned at a position at which an electrode interval widens in an overall manner when the fourth force transmitting member becomes displaced in the positive Z-axis direction and at which a change such that the electrode interval narrows at one part but widens at another part occurs when the fourth force transmitting member becomes inclined" and a "Z-axis displacement detection capacitance element, belonging to the second group and being positioned at a position at which an electrode interval narrows in an overall manner when the fourth force transmitting member becomes displaced in the positive Z-axis direction and at which a change such that the electrode interval narrows at one part but widens at another part occurs when the fourth force transmitting member becomes inclined", and the detection circuit has a function of detecting a force Fz in the Z-axis direction, which acts on the force receiving member, by a difference between an overall static capacitance value of a set of Z-axis displacement detection capacitance elements belonging to the first group and an overall static capacitance value of a set of Z-axis displacement detection capacitance elements belonging to the second group.

(6) The sixth feature of the present invention resides in a force detection device having the first feature, wherein when an XYZ three-dimensional coordinate system with an X-axis, a Y-axis and a Z-axis is defined, each of the first to fourth force transmitting members is comprised of a structure having the Z-axis direction as a longitudinal direction, a surface on which the fixed electrodes are formed is a surface parallel to an XY plane, the first force transmitting member is positioned so that a longitudinal direction axis thereof is in the first quadrant of the XY plane, the second force transmitting member is positioned so that a longitudinal direction axis thereof is in the second quadrant of the XY plane, the third force transmitting member is positioned so that a longitudinal direction axis thereof is in the third quadrant of the XY plane, and the fourth force transmitting member is positioned so that a longitudinal direction axis thereof is in the fourth quadrant of the XY plane.

(7) The seventh feature of the present invention resides in a force detection device having the sixth feature, wherein the first sensor has a "Z-axis displacement detection capacitance element, belonging to a first group and being positioned at a position at which an electrode interval undergoes a change of either narrowing or widening in an overall manner when the first force transmitting member becomes displaced in the Z-axis direction and at which a change such that the electrode interval narrows at one part but widens at another part occurs when the first force transmitting member becomes inclined", the second sensor has a "Z-axis displacement detection capacitance element, belonging to the first group and being positioned at a position at which an electrode interval undergoes a change of either narrowing or widening in an overall manner when the second force transmitting member becomes displaced in the Z-axis direction and at which a change such that the electrode interval narrows at one part but widens at another part occurs when the second force transmitting member becomes inclined", the third sensor has a "Z-axis displacement detection capacitance element, belonging to a second group and being positioned at a position at which an electrode interval undergoes a change of either narrowing or widening in an overall manner when the third force transmitting member becomes displaced in the Z-axis direction and at which a change such that the electrode interval narrows at one part but widens at another part occurs when the third force transmitting member becomes inclined", the fourth sensor has a "Z-axis displacement detection capacitance element, belonging to the second group and being positioned at a position at which an electrode interval undergoes a change of either narrowing or widening in an overall manner when the fourth force transmitting member becomes displaced in the Z-axis direction and at which a change such that the electrode interval narrows at one part but widens at another part occurs when the fourth force transmitting member becomes inclined", and the detection circuit has a function of detecting a moment Mx about the X-axis that acts on the force receiving member by a difference between an overall static capacitance value of a set of Z-axis displacement detection capacitance elements belonging to the first group and an overall static capacitance value of a set of Z-axis displacement detection capacitance elements belonging to the second group.

(8) The eighth feature of the present invention resides in a force detection device having the seventh feature, wherein the first sensor furthermore has a "Z-axis displacement detection capacitance element, belonging to a third group and being positioned at a position at which an electrode interval undergoes a change of either narrowing or widening in an overall manner when the first force transmitting member becomes displaced in the Z-axis direction and at which a change such that the electrode interval narrows at one part but widens at another part occurs when the first force transmitting member becomes inclined", the second sensor furthermore has a "Z-axis displacement detection capacitance element, belonging to a fourth group and being positioned at a position at which an electrode interval undergoes a change of either narrowing or widening in an overall manner when the second force transmitting member becomes displaced in the Z-axis direction and at which a change such that the electrode interval narrows at one part but widens at another part occurs when the second force transmitting member becomes inclined", the third sensor furthermore has a "Z-axis displacement detection capacitance element, belonging to the fourth group and being positioned at a position at which an electrode interval undergoes a change of either narrowing or widening in an overall manner when the third force transmitting member becomes displaced in the Z-axis direction and at which a change such that the electrode interval narrows at one part but widens at another part occurs when the third force transmitting member becomes inclined", the fourth sensor furthermore has a "Z-axis displacement detection capacitance element, belonging to the third group and being positioned at a position at which an electrode interval undergoes a change of either narrowing or widening in an overall manner when the fourth force transmitting member becomes displaced in the Z-axis direction and at which a change such that the electrode interval narrows at one part but widens at another part occurs when the fourth force transmitting member becomes inclined", and the detection circuit has a function of detecting a moment My about the Y-axis that acts on the force receiving member by a difference between an overall static capacitance value of a set of Z-axis displacement detection capacitance elements belonging to the third group and an overall static capacitance value of a set of Z-axis displacement detection capacitance elements belonging to the fourth group.

(9) The ninth feature of the present invention resides in a force detection device having the seventh or eighth feature, wherein the first sensor furthermore has a "Z-axis displacement detection capacitance element, belonging to a fifth group and being positioned at a position at which an electrode interval undergoes a change of either narrowing or widening in an overall manner when the first force transmitting member becomes displaced in the Z-axis direction and at which a change such that the electrode interval narrows at one part but widens at another part occurs when the first force transmitting member becomes inclined", the second sensor furthermore has a "Z-axis displacement detection capacitance element, belonging to the fifth group and being positioned at a position at which an electrode interval undergoes a change of either narrowing or widening in an overall manner when the second force transmitting member becomes displaced in the Z-axis direction and at which a change such that the electrode interval narrows at one part but widens at another part occurs when the second force transmitting member becomes inclined", the third sensor furthermore has a "Z-axis displacement detection capacitance element, belonging to the fifth group and being positioned at a position at which an electrode interval undergoes a change of either narrowing or widening in an overall manner when the third force transmitting member becomes displaced in the Z-axis direction and at which a change such that the electrode interval narrows at one part but widens at another part occurs when the third force transmitting member becomes inclined", the fourth sensor furthermore has a "Z-axis displacement detection capacitance element, belonging to the fifth group and being positioned at a position at which an electrode interval undergoes a change of either narrowing or widening in an overall manner when the fourth force transmitting member becomes displaced in the Z-axis direction and at which a change such that the electrode interval narrows at one part but widens at another part occurs when the fourth force transmitting member becomes inclined", and the detection circuit has a function of detecting a force Fz in the Z-axis direction, which acts on the force receiving member, by an overall static capacitance value of a set of Z-axis displacement detection capacitance elements belonging to the fifth group.

(10) The tenth feature of the present invention resides in a force detection device having the sixth feature, wherein the first sensor has a "Z-axis displacement detection capacitance element, belonging to a first group and being positioned at a position at which an electrode interval widens in an overall manner when the first force transmitting member becomes displaced in a positive Z-axis direction and at which a change such that the electrode interval narrows at one part but widens at another part occurs when the first force transmitting member becomes inclined" and a "Z-axis displacement detection capacitance element, belonging to a second group and being positioned at a position at which an electrode interval narrows in an overall manner when the first force transmitting member becomes displaced in the positive Z-axis direction and at which a change such that the electrode interval narrows at one part but widens at another part occurs when the first force transmitting member becomes inclined", the second sensor has a "Z-axis displacement detection capacitance element, belonging to the first group and being positioned at a position at which an electrode interval widens in an overall manner when the second force transmitting member becomes displaced in the positive Z-axis direction and at which a change such that the electrode interval narrows at one part but widens at another part occurs when the second force transmitting member becomes inclined" and a "Z-axis displacement detection capacitance element, belonging to the second group and being positioned at a position at which an electrode interval narrows in an overall manner when the second force transmitting member becomes displaced in the positive Z-axis direction and at which a change such that the electrode interval narrows at one part but widens at another part occurs when the second force transmitting member becomes inclined", the third sensor has a "Z-axis displacement detection capacitance element, belonging to the second group and being positioned at a position at which an electrode interval widens in an overall manner when the third force transmitting member becomes displaced in the positive Z-axis direction and at which a change such that the electrode interval narrows at one part but widens at another part occurs when the third force transmitting member becomes inclined" and a "Z-axis displacement detection capacitance element, belonging to the first group and being positioned at a position at which an electrode interval narrows in an overall manner when the third force transmitting member becomes displaced in the positive Z-axis direction and at which a change such that the electrode interval narrows at one part but widens at another part occurs when the third force transmitting member becomes inclined", the fourth sensor has a "Z-axis displacement detection capacitance element, belonging to the second group and being positioned at a position at which an electrode interval widens in an overall manner when the fourth force transmitting member becomes displaced in the positive Z-axis direction and at which a change such that the electrode interval narrows at one part but widens at another part occurs when the fourth force transmitting member becomes inclined" and a "Z-axis displacement detection capacitance element, belonging to the first group and being positioned at a position at which an electrode interval narrows in an overall manner when the fourth force transmitting member becomes displaced in the positive Z-axis direction and at which a change such that the electrode interval narrows at one part but widens at another part occurs when the fourth force transmitting member becomes inclined", and the detection circuit has a function of detecting a moment Mx about the X-axis that acts on the force receiving member by a difference between an overall static capacitance value of a set of Z-axis displacement detection capacitance elements belonging to the first group and an overall static capacitance value of a set of Z-axis displacement detection capacitance elements belonging to the second group.

(11) The eleventh feature of the present invention resides in a force detection device having the tenth feature, wherein the first sensor furthermore has a "Z-axis displacement detection capacitance element, belonging to a third group and being positioned at a position at which an electrode interval widens in an overall manner when the first force transmitting member becomes displaced in the positive Z-axis direction and at which a change such that the electrode interval narrows at one part but widens at another part occurs when the first force transmitting member becomes inclined" and a "Z-axis displacement detection capacitance element, belonging to a fourth group and being positioned at a position at which an electrode interval narrows in an overall manner when the first force transmitting member becomes displaced in the positive Z-axis direction and at which a change such that the electrode interval narrows at one part but widens at another part occurs when the first force transmitting member becomes inclined", the second sensor furthermore has a "Z-axis displacement detection capacitance element, belonging to the fourth group and being positioned at a position at which an electrode interval widens in an overall manner when the second force transmitting member becomes displaced in the positive Z-axis direction and at which a change such that the electrode interval narrows at one part but widens at another part occurs when the second force transmitting member becomes inclined" and a "Z-axis displacement detection capacitance element, belonging to the third group and being positioned at a position at which an electrode interval narrows in an overall manner when the second force transmitting member becomes displaced in the positive Z-axis direction and at which a change such that the electrode interval narrows at one part but widens at another part occurs when the second force transmitting member becomes inclined", the third sensor furthermore has a "Z-axis displacement detection capacitance element, belonging to the fourth group and being positioned at a position at which an electrode interval widens in an overall manner when the third force transmitting member becomes displaced in the positive Z-axis direction and at which a change such that the electrode interval narrows at one part but widens at another part occurs when the third force transmitting member becomes inclined" and a "Z-axis displacement detection capacitance element, belonging to the third group and being positioned at a position at which an electrode interval narrows in an overall manner when the third force transmitting member becomes displaced in the positive Z-axis direction and at which a change such that the electrode interval narrows at one part but widens at another part occurs when the third force transmitting member becomes inclined", the fourth sensor furthermore has a "Z-axis displacement detection capacitance element, belonging to the third group and being positioned at a position at which an electrode interval widens in an overall manner when the fourth force transmitting member becomes displaced in the positive Z-axis direction and at which a change such that the electrode interval narrows at one part but widens at another part occurs when the fourth force transmitting member becomes inclined" and a "Z-axis displacement detection capacitance element, belonging to the fourth group and being positioned at a position at which an electrode interval narrows in an overall manner when the fourth force transmitting member becomes displaced in the positive Z-axis direction and at which a change such that the electrode interval narrows at one part but widens at another part occurs when the fourth force transmitting member becomes inclined", and the detection circuit has a function of detecting a moment My about the Y-axis that acts on the force receiving member by a difference between an overall static capacitance value of a set of Z-axis displacement detection capacitance elements belonging to the third group and an overall static capacitance value of a set of Z-axis displacement detection capacitance elements belonging to the fourth group.

(12) The twelfth feature of the present invention resides in a force detection device having the tenth or eleventh feature, wherein the first sensor furthermore has a "Z-axis displacement detection capacitance element, belonging to a fifth group and being positioned at a position at which an electrode interval widens in an overall manner when the first force transmitting member becomes displaced in the positive Z-axis direction and at which a change such that the electrode interval narrows at one part but widens at another part occurs when the first force transmitting member becomes inclined" and a "Z-axis displacement detection capacitance element, belonging to a sixth group and being positioned at a position at which an electrode interval narrows in an overall manner when the first force transmitting member becomes displaced in the positive Z-axis direction and at which a change such that the electrode interval narrows at one part but widens at another part occurs when the first force transmitting member becomes inclined", the second sensor furthermore has a "Z-axis displacement detection capacitance element, belonging to the fifth group and being positioned at a position at which an electrode interval widens in an overall manner when the second force transmitting member becomes displaced in the positive Z-axis direction and at which a change such that the electrode interval narrows at one part but widens at another part occurs when the second force transmitting member becomes inclined" and a "Z-axis displacement detection capacitance element, belonging to the sixth group and being positioned at a position at which an electrode interval narrows in an overall manner when the second force transmitting member becomes displaced in the positive Z-axis direction and at which a change such that the electrode interval narrows at one part but widens at another part occurs when the second force transmitting member becomes inclined", the third sensor furthermore has a "Z-axis displacement detection capacitance element, belonging to the fifth group and being positioned at a position at which an electrode interval widens in an overall manner when the third force transmitting member becomes displaced in the positive Z-axis direction and at which a change such that the electrode interval narrows at one part but widens at another part occurs when the third force transmitting member becomes inclined" and a "Z-axis displacement detection capacitance element, belonging to the sixth group and being positioned at a position at which an electrode interval narrows in an overall manner when the third force transmitting member becomes displaced in the positive Z-axis direction and at which a change such that the electrode interval narrows at one part but widens at another part occurs when the third force transmitting member becomes inclined", the fourth sensor furthermore has a "Z-axis displacement detection capacitance element, belonging to the fifth group and being positioned at a position at which an electrode interval widens in an overall manner when the fourth force transmitting member becomes displaced in the positive Z-axis direction and at which a change such that the electrode interval narrows at one part but widens at another part occurs when the fourth force transmitting member becomes inclined" and a "Z-axis displacement detection capacitance element, belonging to the sixth group and being positioned at a position at which an electrode interval narrows in an overall manner when the fourth force transmitting member becomes displaced in the positive Z-axis direction and at which a change such that the electrode interval narrows at one part but widens at another part occurs when the fourth force transmitting member becomes inclined", and the detection circuit has a function of detecting a force Fz in the Z-axis direction, which acts on the force receiving member, by a difference between an overall static capacitance value of a set of Z-axis displacement detection capacitance elements belonging to the fifth group and an overall static capacitance value of a set of Z-axis displacement detection capacitance elements belonging to the sixth group.

(13) The thirteenth feature of the present invention resides in a force detection device having the sixth feature, wherein the first sensor has an "X-axis inclination detection capacitance element, belonging to a first group and being positioned at a position at which an electrode interval narrows when the first force transmitting member becomes inclined in a positive X-axis direction", an "X-axis inclination detection capacitance element, belonging to a second group and being positioned at a position at which an electrode interval widens when the first force transmitting member becomes inclined in the positive X-axis direction", a "Y-axis inclination detection capacitance element, belonging to the first group and being positioned at a position at which an electrode interval narrows when the first force transmitting member becomes inclined in a positive Y-axis direction", and a "Y-axis inclination detection capacitance element, belonging to the first group and being positioned at a position at which an electrode interval widens when the first force transmitting member becomes inclined in the positive Y-axis direction", the second sensor has an "X-axis inclination detection capacitance element, belonging to the first group and being positioned at a position at which an electrode interval narrows when the second force transmitting member becomes inclined in the positive X-axis direction", an "X-axis inclination detection capacitance element, belonging to the second group and being positioned at a position at which an electrode interval widens when the second force transmitting member becomes inclined in the positive X-axis direction", a "Y-axis inclination detection capacitance element, belonging to the first group and being positioned at a position at which an electrode interval narrows when the second force transmitting member becomes inclined in the positive Y-axis direction", and a "Y-axis inclination detection capacitance element, belonging to the second group and being positioned at a position at which an electrode interval widens when the second force transmitting member becomes inclined in the positive Y-axis direction", the third sensor has an "X-axis inclination detection capacitance element, belonging to the second group and being positioned at a position at which an electrode interval narrows when the third force transmitting member becomes inclined in the positive X-axis direction", an "X-axis inclination detection capacitance element, belonging to the first group and being positioned at a position at which an electrode interval widens when the third force transmitting member becomes inclined in the positive X-axis direction", a "Y-axis inclination detection capacitance element, belonging to the first group and being positioned at a position at which an electrode interval narrows when the third force transmitting member becomes inclined in the positive Y-axis direction", and a "Y-axis inclination detection capacitance element, belonging to the second group and being positioned at a position at which an electrode interval widens when the third force transmitting member becomes inclined in the positive Y-axis direction", the fourth sensor has an "X-axis inclination detection capacitance element, belonging to the second group and being positioned at a position at which an electrode interval narrows when the fourth force transmitting member becomes inclined in the positive X-axis direction", an "X-axis inclination detection capacitance element, belonging to the first group and being positioned at a position at which an electrode interval widens when the fourth force transmitting member becomes inclined in the positive X-axis direction", a "Y-axis inclination detection capacitance element, belonging to the second group and being positioned at a position at which an electrode interval narrows when the fourth force transmitting member becomes inclined in the positive Y-axis direction", and a "Y-axis inclination detection capacitance element, belonging to the first group and being positioned at a position at which an electrode interval widens when the fourth force transmitting member becomes inclined in the positive Y-axis direction", and the detection circuit has a function of detecting a moment Mz about the Z-axis that acts on the force receiving member by a difference between an overall static capacitance value of a set of capacitance elements belonging to the first group and an overall static capacitance value of a set of capacitance elements belonging to the second group.

(14) The fourteenth feature of the present invention resides in a force detection device having the thirteenth feature, wherein the X-axis inclination detection capacitance element, belonging to the first group that forms the first sensor, and the Y-axis inclination detection capacitance element, belonging to the first group that forms the first sensor, are comprised as a physically single capacitance element, the X-axis inclination detection capacitance element, belonging to the second group that forms the first sensor, and the Y-axis inclination detection capacitance element, belonging to the second group that forms the first sensor, are comprised as a physically single capacitance element, the X-axis inclination detection capacitance element, belonging to the first group that forms the second sensor, and the Y-axis inclination detection capacitance element, belonging to the first group that forms the second sensor, are comprised as a physically single capacitance element, the X-axis inclination detection capacitance element, belonging to the second group that forms the second sensor, and the Y-axis inclination detection capacitance element, belonging to the second group that forms the second sensor, are comprised as a physically single capacitance element, the X-axis inclination detection capacitance element, belonging to the first group that forms the third sensor, and the Y-axis inclination detection capacitance element, belonging to the first group that forms the third sensor, are comprised as a physically single capacitance element, the X-axis inclination detection capacitance element, belonging to the second group that forms the third sensor, and the Y-axis inclination detection capacitance element, belonging to the second group that forms the third sensor, are comprised as a physically single capacitance element, and the X-axis inclination detection capacitance element, belonging to the first group that forms the fourth sensor, and the Y-axis inclination detection capacitance element, belonging to the first group that forms the fourth sensor, are comprised as a physically single capacitance element, the X-axis inclination detection capacitance element, belonging to the second group that forms the fourth sensor, and the Y-axis inclination detection capacitance element, belonging to the second group that forms the fourth sensor, are comprised as a physically single capacitance element.

(15) The fifteenth feature of the present invention resides in a force detection device having the first feature, wherein when an XYZ three-dimensional coordinate system with an X-axis, a Y-axis and a Z-axis is defined, each of the first to fourth force transmitting members is comprised of a structure having the Z-axis direction as a longitudinal direction, a surface on which the fixed electrodes are formed is a surface parallel to an XY plane, the first force transmitting member is positioned at a position at which a longitudinal direction axis thereof intersects a positive part of the X-axis, the second force transmitting member is positioned at a position at which a longitudinal direction axis thereof intersects a negative part of the X-axis, the third force transmitting member is positioned at a position at which a longitudinal direction axis thereof intersects a positive part of the Y-axis, and the fourth force transmitting member is positioned at a position at which a longitudinal direction axis thereof intersects a negative part of the Y-axis.

(16) The sixteenth feature of the present invention resides in a force detection device having the fifteenth feature, wherein the first sensor has a "Z-axis displacement detection capacitance element, belonging to a first group and being positioned at a position at which an electrode interval widens in an overall manner when the first force transmitting member becomes displaced in a positive Z-axis direction and at which a change such that the electrode interval narrows at one part but widens at another part occurs when the first force transmitting member becomes inclined" and a "Z-axis displacement detection capacitance element, belonging to a second group and being positioned at a position at which an electrode interval narrows in an overall manner when the first force transmitting member becomes displaced in the positive Z-axis direction and at which a change such that the electrode interval narrows at one part but widens at another part occurs when the first force transmitting member becomes inclined", the second sensor has a "Z-axis displacement detection capacitance element, belonging to the second group and being positioned at a position at which an electrode interval widens in an overall manner when the second force transmitting member becomes displaced in the positive Z-axis direction and at which a change such that the electrode interval narrows at one part but widens at another part occurs when the second force transmitting member becomes inclined" and a "Z-axis displacement detection capacitance element, belonging to the first group and being positioned at a position at which an electrode interval narrows in an overall manner when the second force transmitting member becomes displaced in the positive Z-axis direction and at which a change such that the electrode interval narrows at one part but widens at another part occurs when the second force transmitting member becomes inclined", the third sensor has a "Z-axis displacement detection capacitance element, belonging to a third group and being positioned at a position at which an electrode interval widens in an overall manner when the third force transmitting member becomes displaced in the positive Z-axis direction and at which a change such that the electrode interval narrows at one part but widens at another part occurs when the third force transmitting member becomes inclined" and a "Z-axis displacement detection capacitance element, belonging to a fourth group and being positioned at a position at which an electrode interval narrows in an overall manner when the third force transmitting member becomes displaced in the positive Z-axis direction and at which a change such that the electrode interval narrows at one part but widens at another part occurs when the third force transmitting member becomes inclined", the fourth sensor has a "Z-axis displacement detection capacitance element, belonging to the fourth group and being positioned at a position at which an electrode interval widens in an overall manner when the fourth force transmitting member becomes displaced in the positive Z-axis direction and at which a change such that the electrode interval narrows at one part but widens at another part occurs when the fourth force transmitting member becomes inclined" and a "Z-axis displacement detection capacitance element, belonging to the third group and being positioned at a position at which an electrode interval narrows in an overall manner when the fourth force transmitting member becomes displaced in the positive Z-axis direction and at which a change such that the electrode interval narrows at one part but widens at another part occurs when the fourth force transmitting member becomes inclined", and the detection circuit has a function of detecting a moment My about the Y-axis that acts on the force receiving member by a difference between an overall static capacitance value of a set of Z-axis displacement detection capacitance elements belonging to the first group and an overall static capacitance value of a set of Z-axis displacement detection capacitance elements belonging to the second group and a function of detecting a moment Mx about the X-axis that acts on the force receiving member by a difference between an overall static capacitance value of a set of Z-axis displacement detection capacitance elements belonging to the third group and an overall static capacitance value of a set of Z-axis displacement detection capacitance elements belonging to the fourth group.

(17) The seventeenth feature of the present invention resides in a force detection device having the sixteenth feature, wherein the first sensor furthermore has a "Z-axis displacement detection capacitance element, belonging to a fifth group and being positioned at a position at which an electrode interval widens in an overall manner when the first force transmitting member becomes displaced in the positive Z-axis direction and at which a change such that the electrode interval narrows at one part but widens at another part occurs when the first force transmitting member becomes inclined" and a "Z-axis displacement detection capacitance element, belonging to a sixth group and being positioned at a position at which an electrode interval narrows in an overall manner when the first force transmitting member becomes displaced in the positive Z-axis direction and at which a change such that the electrode interval narrows at one part but widens at another part occurs when the first force transmitting member becomes inclined", the second sensor furthermore has a "Z-axis displacement detection capacitance element, belonging to the fifth group and being positioned at a position at which an electrode interval widens in an overall manner when the second force transmitting member becomes displaced in the positive Z-axis direction and at which a change such that the electrode interval narrows at one part but widens at another part occurs when the second force transmitting member becomes inclined" and a "Z-axis displacement detection capacitance element, belonging to the sixth group and being positioned at a position at which an electrode interval narrows in an overall manner when the second force transmitting member becomes displaced in the positive Z-axis direction and at which a change such that the electrode interval narrows at one part but widens at another part occurs when the second force transmitting member becomes inclined", the third sensor furthermore has a "Z-axis displacement detection capacitance element, belonging to the fifth group and being positioned at a position at which an electrode interval widens in an overall manner when the third force transmitting member becomes displaced in the positive Z-axis direction and at which a change such that the electrode interval narrows at one part but widens at another part occurs when the third force transmitting member becomes inclined" and a "Z-axis displacement detection capacitance element, belonging to the sixth group and being positioned at a position at which an electrode interval narrows in an overall manner when the third force transmitting member becomes displaced in the positive Z-axis direction and at which a change such that the electrode interval narrows at one part but widens at another part occurs when the third force transmitting member becomes inclined", the fourth sensor furthermore has a "Z-axis displacement detection capacitance element, belonging to the fifth group and being positioned at a position at which an electrode interval widens in an overall manner when the fourth force transmitting member becomes displaced in the positive Z-axis direction and at which a change such that the electrode interval narrows at one part but widens at another part occurs when the fourth force transmitting member becomes inclined" and a "Z-axis displacement detection capacitance element, belonging to the sixth group and being positioned at a position at which an electrode interval narrows in an overall manner when the fourth force transmitting member becomes displaced in the positive Z-axis direction and at which a change such that the electrode interval narrows at one part but widens at another part occurs when the fourth force transmitting member becomes inclined", and the detection circuit has a function of detecting a force Fz in the Z-axis direction, which acts on the force receiving member, by a difference between an overall static capacitance value of a set of Z-axis displacement detection capacitance elements belonging to the fifth group and an overall static capacitance value of a set of Z-axis displacement detection capacitance elements belonging to the sixth group.

(18) The eighteenth feature of the present invention resides in a force detection device having the fifteenth feature, wherein the first sensor has a "Y-axis inclination detection capacitance element, belonging to a first group and being positioned at a position at which an electrode interval narrows when the first force transmitting member becomes inclined in a positive Y-axis direction", and a "Y-axis inclination detection capacitance element, belonging to a second group and being positioned at a position at which an electrode interval widens when the first force transmitting member becomes inclined in the positive Y-axis direction", the second sensor has a "Y-axis inclination detection capacitance element, belonging to the second group and being positioned at a position at which an electrode interval narrows when the second force transmitting member becomes inclined in the positive Y-axis direction", and a "Y-axis inclination detection capacitance element, belonging to the first group and being positioned at a position at which an electrode interval widens when the second force transmitting member becomes inclined in the positive Y-axis direction", the third sensor has an "X-axis inclination detection capacitance element, belonging to the second group and being positioned at a position at which an electrode interval narrows when the third force transmitting member becomes inclined in a positive X-axis direction", and an "X-axis inclination detection capacitance element, belonging to the first group and being positioned at a position at which an electrode interval widens when the third force transmitting member becomes inclined in the positive X-axis direction", the fourth sensor has an "X-axis inclination detection capacitance element, belonging to the first group and being positioned at a position at which an electrode interval narrows when the fourth force transmitting member becomes inclined in the positive X-axis direction", and an "X-axis inclination detection capacitance element, belonging to the second group and being positioned at a position at which an electrode interval widens when the fourth force transmitting member becomes inclined in the positive X-axis direction", and the detection circuit has a function of detecting a moment Mz about the Z-axis that acts on the force receiving member by a difference between an overall static capacitance value of a set of capacitance elements belonging to the first group and an overall static capacitance value of a set of capacitance elements belonging to the second group.

(19) The nineteenth feature of the present invention resides in a force detection device having the second, thirteenth or eighteenth feature, wherein with an xy two-dimensional coordinate system, having an origin along a longitudinal direction axis of a specific force transmitting member, having an x-axis parallel to the X-axis, and having a y-axis parallel to Y-axis, being defined, the X-axis inclination detection capacitance element for the force transmitting member is comprised of a pair of capacitance elements having electrodes, positioned respectively at a positive part and a negative part of the x-axis.

(20) The twentieth feature of the present invention resides in a force detection device having the third, thirteenth or eighteenth feature, wherein with an xy two-dimensional coordinate system, having an origin along a longitudinal direction axis of a specific force transmitting member, having an x-axis parallel to the X-axis, and having a y-axis parallel to Y-axis, being defined, the Y-axis inclination detection capacitance element for the force transmitting member is comprised of a pair of capacitance elements having electrodes, positioned respectively at a positive part and a negative part of the y-axis.

(21) The twenty-first feature of the present invention resides in a force detection device having the fourth, fifth, seventh through twelfth, sixteenth or seventeenth feature, wherein the Z-axis displacement detection capacitance element for a specific force transmitting member is comprised of a capacitance element having a circular or annular electrode centered about a longitudinal direction axis of the force transmitting member.

(22) The twenty-second feature of the present invention resides in a force detection device having the twenty-first feature, wherein a plurality of Z-axis displacement capacitance elements are formed of a plurality of circular or annular electrodes that are positioned concentrically on the same plane.

(23) The twenty-third feature of the present invention resides in a force detection device having any of the first through twenty-second features, wherein the upper ends of the respective force transmitting members are connected to the force receiving member via connecting members that have flexibility.

(24) The twenty-fourth feature of the present invention resides in a force detection device having the twenty-third feature, wherein the force receiving member is comprised of a plate-like member, the respective force transmitting members are comprised of columnar members, and the connecting members, connecting the force receiving member with the respective force transmitting members, are comprised of thin parts of the plate-like force receiving member.

(25) The twenty-fifth feature of the present invention resides in a force detection device having any of the first through twenty-fourth features, wherein the respective force transmitting members are comprised of columnar members, lower surfaces of the force transmitting members are joined to centers of diaphragms that function as connecting members, and by fixing circumferences of the diaphragms to the supporting member, the force transmitting members are connected to the supporting member.

(26) The twenty-sixth feature of the present invention resides in a force detection device having the twenty-fifth feature, wherein diaphragms having flexibility and conductivity are used as the connecting members, the lower surfaces of the force transmitting members are joined to the centers of the diaphragms, and by fixing the circumferences of the diaphragms to the supporting member, the force transmitting members are connected to the supporting member and the diaphragms themselves are used as displaceable electrodes.

(27) The twenty-seventh feature of the present invention resides in a force detection device having the twenty-fifth or twenty-sixth feature, wherein at least a part of the plurality of fixed electrodes are formed on a top surface of the supporting member so that at least a part of the capacitance elements are formed below the diaphragms.

(28) The twenty-eighth feature of the present invention resides in a force detection device having any of the twenty-fifth through twenty-seventh features, wherein an auxiliary base plate, having openings for passing through the force transmitting members, is fixed to the supporting member so as to be positioned above the diaphragms, and at least a part of the plurality of fixed electrodes are formed on a bottom surface of the auxiliary base plate so that at least a part of the capacitance elements are formed above the diaphragms.

BRIEF DESCRIPTION OF THE DRAWINGS

FIG. 14A and FIG. 14B show tables illustrating the principles of detection of the respective force components by the force detection device of the first embodiment of this invention and showing the modes of variation of the static capacitance values of the respective capacitance elements when the respective force components act on a force receiving member.

FIG. 28A and FIG. 28B show tables illustrating the principles of detection of the respective force components by the force detection device of the second embodiment of this invention and showing the modes of variation of the static capacitance values of the respective capacitance elements when the respective force components act on a force receiving member.

BEST MODE FOR CARRYING OUT THE INVENTION

This invention shall now be described based on the illustrated embodiments.

<<<Section 1. Basic Concepts>>>

Figure 1:
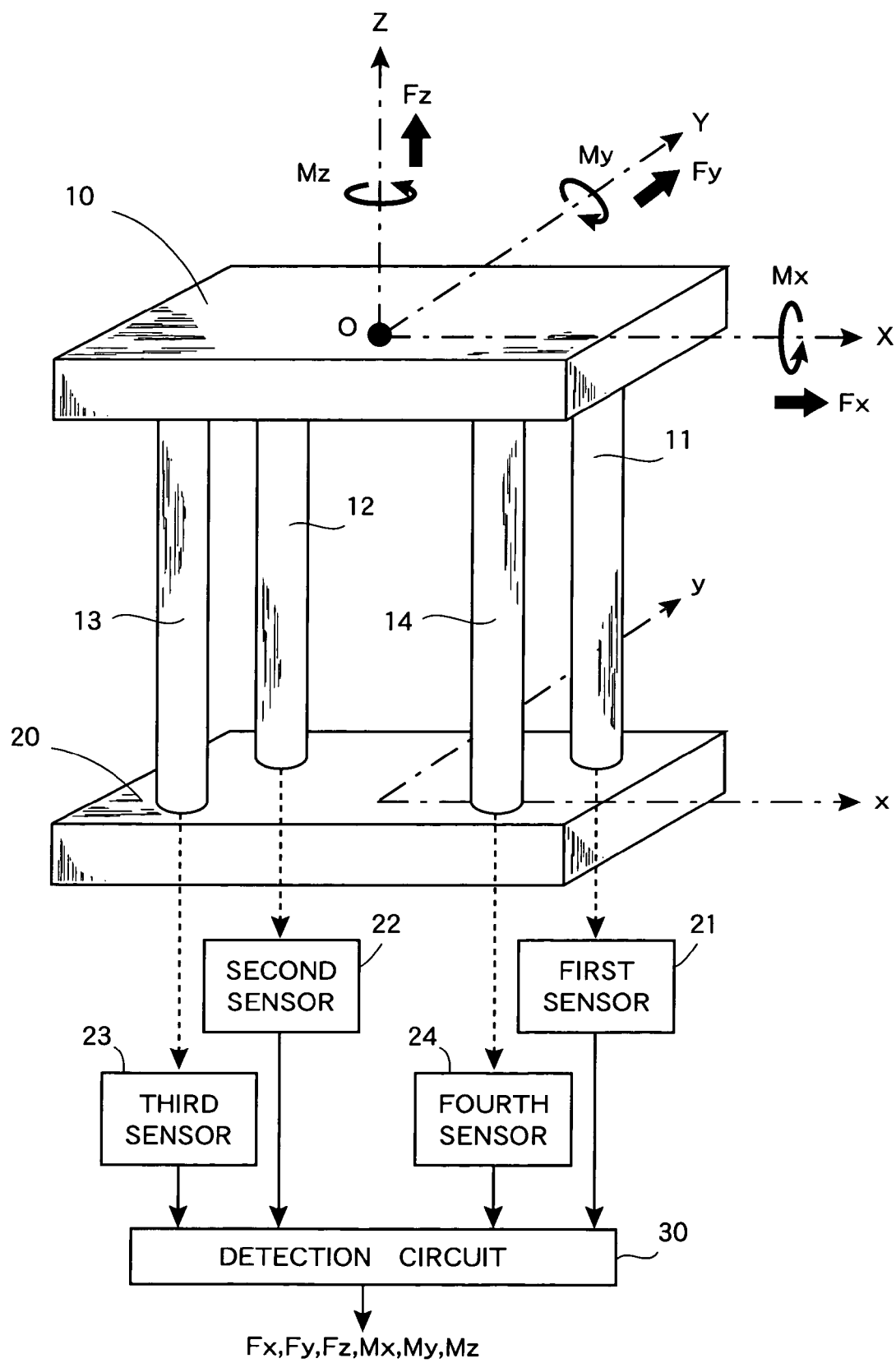
FIG. 1 is a perspective view (partially in block diagram) showing the basic arrangement of this invention's force detection device.

First, the basic concepts of this invention's force detection device shall be described. As shown in FIG. 1, the basic components of this invention's force detection device are a force receiving member 10, a first force transmitting member 11, a second force transmitting member 12, a third force transmitting member 13, a fourth force transmitting member 14, a supporting member 20, a first sensor 21, a second sensor 22, a third sensor 23, a fourth sensor 24, and a detection circuit 30.

Force receiving member 10 is a component that receives forces that are to be detected, and here, for the sake of description, an origin O is defined at a central position of force receiving member 10 and an XYZ three-dimensional coordinate system is defined as illustrated. Though force receiving member 10 and supporting member 20 are comprised of plate-like members in the illustrated example, these do not necessarily have to be plate-like and may have an arbitrary shape. The force components that act on force receiving member 10 are force components Fx, Fy, and Fz in the respective coordinate axis directions of the coordinate system and moment components Mx, My, and Mz about the respective coordinate axes.

In the present Application, the term "force" may be used as suitable to refer to a force in the direction of a specific coordinate axis or as a collective force that includes the moment components. For example, whereas in FIG. 1, forces Fx, Fy, and Fz refer to the force components in the direction of the respective coordinate axes and not moments, in the case of the expression, "the six forces of Fx, Fy, Fz, Mx, My, and Mz," the term "force" shall refer to the collective force that includes the force components in the respective coordinate axis directions and the moment components about the respective coordinate axes.

Supporting member 20 is a component that is positioned below force receiving member 10 and serves the function of supporting force receiving member 10. As mentioned above, force receiving member 10 and supporting member 20 do not necessarily have to be plate-like in form. However, in terms of performing the detection of forces in relation to the respective coordinate axes X, Y, and Z by means of first sensor 21 to fourth sensor 24 as shall be described later, the use of supporting member 20 with a top surface that is parallel to the XY plane of the abovementioned XYZ three-dimensional coordinate system is preferable and both force receiving member 10 and supporting member 20 are thus preferably made plate-like in form in terms of practical use. Here, for the sake of description, an xy plane shall be defined on the top surface of supporting member 20. This xy plane, indicated in lower-case letters, is a plane parallel to the XY plane, indicated in capital letters, the x-axis and the X-axis are parallel, and the y-axis and the Y-axis are parallel.

First force transmitting member 11 to fourth force transmitting member 14 are members connecting force receiving member 10 and supporting member 20 and are structures that are positioned along the Z-axis, and, moreover, these four members are positioned on the xy plane with a predetermined interval between each other. Though in the illustrated example, these force transmitting members 11 to 14 are all columnar structures, which are positioned with their longitudinal directions being oriented in parallel to the Z-axis, in principle, these members may be arranged as structures of any arbitrary shape. However, for practical use, columnar structures, such as those illustrated, are preferable in terms of realizing a simple structure. Also for practical use, first force transmitting member 11 to fourth force transmitting member 14 are preferably made of exactly the same material and to exactly the same size. This is because by making these components the same in material and size, the sensitivities of detection by first sensor 21 to fourth sensor 24 can be made equal. If the components differ in material and size, it becomes difficult to make the respective sensors equal in sensitivity and sensitivity correction measures become necessary.

What are important here are that the upper end of each of force transmitting members 11 to 14 is connected to force receiving member 10 via a connecting member (not shown in the Figure) having flexibility and that the lower end of each of force transmitting members 11 to 14 is connected to supporting member 20 via a connecting member (not shown in the Figure) having flexibility. That is, first force transmitting member 11 to fourth force transmitting member 14 are connected with flexibility to force receiving member 10 and to supporting member 20. Here, flexibility is the same in definition as elasticity, and whereas in a state in which no force whatsoever is acting on force receiving member 10, force receiving member 10 takes a fixed position with respect to supporting member 20, when a force of some form acts on force receiving member 10, the connecting members with flexibility undergo elastic deformation and a change occurs in the relative position of force receiving member 10 with respect to supporting member 20. Obviously, when the force that is acting on force receiving member 10 is eliminated, force receiving member 10 returns to the original fixed position.

Thus in the case of the example shown in FIG. 1, the upper end parts and the lower end parts of columnar first force transmitting member 11 to fourth force transmitting member 14 are respectively formed of connecting members with flexibility (obviously, the entireties of first force transmitting member 11 to fourth force transmitting member 14 may be formed of a material with flexibility). Since these connecting members undergo elastic deformation to some degree, first force transmitting member 11 to fourth force transmitting member 14 can become inclined with respect to force receiving member 10 and supporting member 20. These connecting members can also be elongated and shrunken in the vertical direction (Z-axis direction) of the Figure, and when force receiving member 10 is moved in the upward direction (+Z-axis direction) of the Figure, the connecting members become elongated, causing the distance between force receiving member 10 and supporting member 20 to increase, and oppositely, when force receiving member 10 is moved in the downward direction (−Z-axis direction) of the Figure, the connecting members shrink and cause the distance between force receiving member 10 and supporting member 20 to decrease. Obviously, the degrees of such displacements and inclinations increase in accordance to the magnitude of a force acting on force receiving member 10.

Each of first sensor 21 to fourth sensor 24 is a sensor that detects a force that is applied towards supporting member 20 from each of first force transmitting member 11 to fourth force transmitting member 14, respectively, and as shall be described below, each is comprised of a plurality of capacitance elements. When a force acts on force receiving member 10, this force is transmitted to supporting member 20 via first force transmitting member 11 to fourth force transmitting member 14. First sensor 21 to fourth sensor 24 have a function of detecting forces that are transmitted in this manner, and to be more specific and as shall be described in detail later, have a function of detecting the inclination degrees of the force transmitting members by detecting the forces resulting from the inclinations of the force transmitting members and a function of detecting a pressing force (a force in the −Z-axis direction that is directed downwards in the Figure) or a pulling force (a force in the +Z-axis direction that is directed upwards in the Figure) that the force transmitting members apply as a whole to the supporting member.

Detection circuit 30 is a component that performs the processes of detecting forces and moments that act on force receiving member 10 based on the static capacitance values of the plurality of capacitance elements that make up the respective sensors 21 to 24 and output signals, indicating the force components Fx, Fy, and Fz of the respective coordinate axis directions of the XYZ three-dimensional coordinate system, and signals, indicating the moment components Mx, My, and Mz about the respective coordinate axes. Actually the detection of a force or a moment is performed based on the abovementioned inclination degrees of the force transmitting members and the pressing/pulling force applied to the supporting member. The specific methods for these shall be described later.

The basic operation principles of the force detection device shown in FIG. 1 shall now be described with reference to the front views of FIG. 2A to FIG. 2C. Though here, for the sake of description, just the operations related to first force transmitting member 11 and second force transmitting member 12 shall be described, the operations related to third force transmitting member 13 and fourth force transmitting member 14 are the same.

Figure 2A:
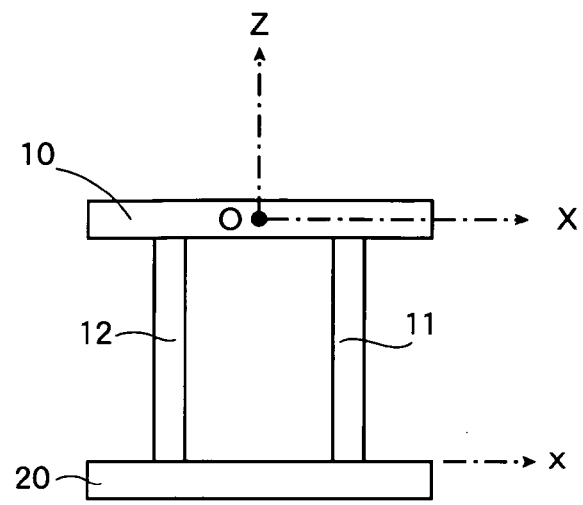
FIG. 2A to FIG. 2C are front views illustrating the basic operation principles of the force detection device shown in FIG. 1.

FIG. 2A shows a state in which no force whatsoever is acting on this force detection device and in this state, force receiving member 10 is maintained at a fixed position with respect to supporting member 20. Obviously, since the weight of force receiving member 10, etc., is applied to supporting member 20 even in this state, supporting member 20 receives some form of force from first force transmitting member 11 and second force transmitting member 12. However, since the force that is received in this state is a force in the stationary state, even if such a force is detected by first sensor 21 and second sensor 22, the detection values of forces and moments that are output from detection circuit 30 are adjusted to be 0. In other words, detection circuit 30 has a function of using the detection results of the respective sensors 21 to 24 in such a stationary state as references and thereby detecting a change that occurs with respect to these references as a force or moment acting on force receiving member 10.

Figure 2B:
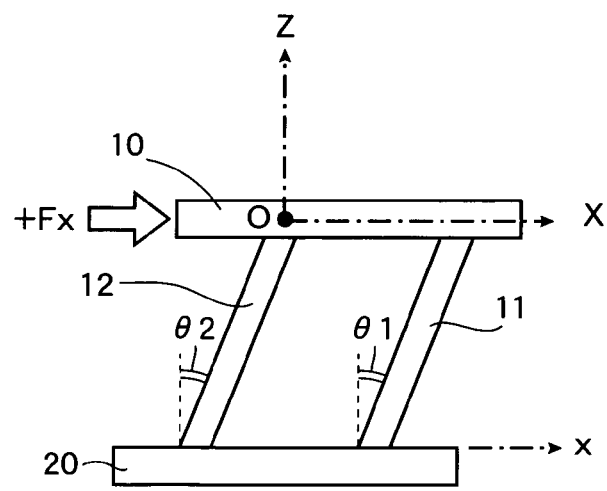

Here, a case, where a positive X-axis direction force +Fx acts on force receiving member 10 as shown in FIG. 2B, shall be considered first. This corresponds to a case where a force that pushes the position of origin O towards the right side of the Figure is applied. In this case, force receiving member 10 undergoes a sliding motion toward the right side of the Figure and first force transmitting member 11 and second force transmitting member 12 become inclined towards the right side of the Figure as illustrated. Here, the inclination degree of first force transmitting member 11 shall be referred to as θ1 and the inclination degree of second force transmitting member 12 shall be referred to as θ2. Also, these angles θ1 and θ2, which indicate the degrees of inclination in the direction of the x-axis in the XZ plane, shall be referred to as "inclination degrees in relation to the X-axis direction." Likewise, angles, which indicate the degrees of inclination in the direction of the y-axis in the YZ plane, shall be referred to as "inclination degrees in relation to the Y-axis direction." With the illustrated example, since the two force transmitting members 11 and 12 are disposed in parallel along the x-axis, the inclination degrees in the Y-axis direction are 0.

Strictly speaking, the distance between force receiving member 10 and supporting member 20 decreases slightly when the respective force transmitting members 11 and 12 become inclined, and force receiving member 10 thus does not undergo a completely parallel movement in the X-axis direction but moves slightly in the –Z-axis direction as well. However, since the amount of movement in the –Z-axis direction can be neglected when the inclination degrees are comparatively small, it shall be considered here, for the sake of description, that force receiving member 10 moves in just the X-axis direction.

Figure 2C:
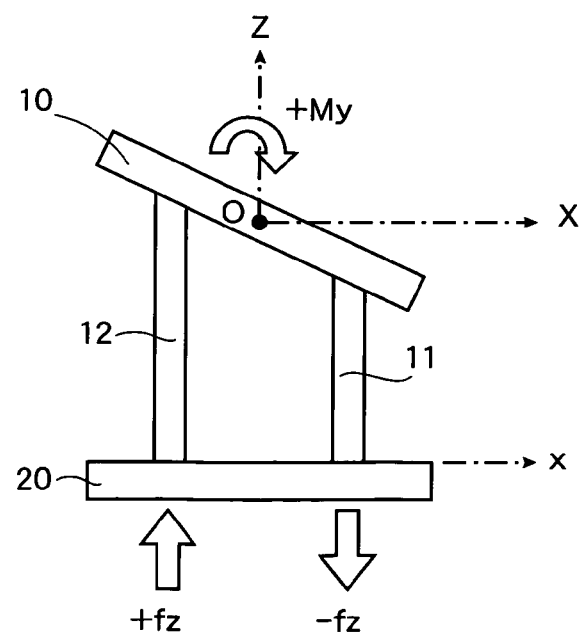

A case where a moment +My about the Y-axis acts on force receiving member 10 as shown in FIG. 2C shall now be considered. In FIG. 2C, since the Y-axis is a perpendicular direction axis that is directed towards the rear side of the paper surface in the Figure, the moment +My corresponds to a force that rotates the entirety of force receiving member 10 in the clockwise direction about origin O. In the present Application, a positive direction moment about a certain coordinate axis shall be defined as being in the direction of rotation of a right-handed screw in the case where the right-handed screw is advanced in the positive direction of the coordinate axis. In the present case, a shrinking force acts on first force transmitting member 11 and an elongating force acts on second force transmitting member 12 as illustrated. Thus a pressing force (a force in the –Z-axis direction; this is indicated as a force –fz here) acts on supporting member 20 from first force transmitting member 11 and a pulling force (a force in the +Z-axis direction; this is indicated as a force +fz here) acts on supporting member 20 from second force transmitting member 12.

Thus with this invention's force detection device, the modes of the forces that are transmitted to supporting member 20 via the two force transmitting members 11 and 12 differ between the case where an X-axis direction force Fx acts on force receiving member 10 and the case where a moment My about the Y-axis acts. The two can thus be distinguished and detected separately.

That is, when an X-axis direction force Fx acts, the two force transmitting members 11 and 12 become inclined in the X-axis direction and give rise to inclination degrees θ1 and θ2 as shown in FIG. 2B and forces corresponding to such inclinations are transmitted to supporting member 20. Here, when first force transmitting member 11, second force transmitting member 12, and the connecting members, which have flexibility and connect the force transmitting members to supporting member 20, are made the same in material and size and a structure by which this force detection device is laterally symmetrical with respect to the Z-axis in the Figure is arranged, inclination degree θ1=inclination degree θ2. The value of the sum, (θ1+θ2), will thus indicate the force Fx in the X-axis direction. By handling each inclination degree θ with a sign attached (for example, by deeming an inclination in the positive X-axis direction to be positive and an inclination in the negative X-axis direction to be negative), an X-axis direction force Fx that acts can be detected along with its sign.

As shall be described below, with this invention, the inclination degrees of first force transmitting member 11 and second force transmitting member 12 are detected by first sensor 21 and second sensor 22 as forces that are applied to supporting member 20. To perform such detection, the forces that are applied to supporting member 20 from the respective force transmitting members are detected according to each part. For example, with regard to the stresses that arise at the connecting part of first force transmitting member 11 and supporting member 20 in FIG. 2B, it can be understood that a right side part and a left side part of the bottom part of first force transmitting member 11 differ in the direction of the stress that arises. That is, with the illustrated example, since first force transmitting member 11 is inclined towards the right, whereas a pressing force, that is, a force, which presses the upper surface of supporting member 20 downwards, arises at the right side part of the bottom part of first force transmitting member 11, a pulling force, that is, a force, which pulls the upper surface of supporting member 20 upwards, arises at the left side part. By detecting such differences in the stresses that arise at the respective left and right parts of the bottom part of first force transmitting member 11, the inclination degree of first force transmitting member 11 can be obtained. A specific method for this shall be described in detail in Section 2.

Thus with this invention's force detection device, for detection of an X-axis direction force Fx, first sensor 21 is provided with a function of detecting the state of inclination in the x-axis direction of first force transmitting member 11 with respect to supporting member 20 and second sensor 22 is provided with the function of detecting the state of inclination in the x-axis direction of second force transmitting member 12 with respect to supporting member 20. If first sensor 21 has a function of detecting the inclination degree θ1 in relation to the X-axis direction of first force transmitting member 11 and second sensor 22 has a function of detecting the inclination degree in relation to the X-axis direction of second force transmitting member 12, detection circuit 30 can perform the process of detecting the X-axis direction component Fx of a force, acting on force receiving member 10, based on the sum of the inclination degree θ1 in relation to the X-axis direction that is detected by first sensor 21 and the inclination degree θ2 in relation to the X-axis direction that is detected by second sensor 22.

Meanwhile, when a moment My about the Y-axis acts, a pressing force −fz and a pulling force +fz are transmitted to supporting member 20 from the two force transmitting members 11 and 12 as shown in FIG. 2C. The forces that are thus transmitted differ from the forces in a case where the force transmitting members become inclined. That is, in a case where the force transmitting members become inclined as shown in FIG. 2B, the stresses that arise at the bottom part differ at the right side part and at the left side part. However, when a moment My acts as shown in FIG. 2C, a pressing force −fz is applied by the entirety of first force detection member 11 and a pulling force +fz is applied by the entirety of second force detection member 12.

Thus whereas with the action of an X-axis direction force Fx, first force transmitting member 11 and second force transmitting member 12 are subject to equivalent phenomena, that is, inclinations in the same direction as shown in FIG. 2B, with the action of a moment My about the Y-axis, first force transmitting member 11 and second force transmitting member 12 are subject to mutually opposite phenomena wherein a pressing force −fz is applied to one and a pulling force +fz is applied to the other as shown in FIG. 2C. The moment My that acts can thus be determined as the difference of the pulling force +fz and the pressing force −fz, that is, as (+fz)−(−fz)=2fz.

That is, for detection of a moment My about the Y-axis by this invention's force detection device, first sensor 21 is provided with a function of detecting a force that is applied from the entirety of first force transmitting member 11 to supporting member 20 and second sensor 22 is provided with a function of detecting a force that is applied from the entirety of second force transmitting member 12 to supporting member 20. If first sensor 21 has the function of detecting a force in relation to the Z-axis direction that is applied from the entirety of first force transmitting member 11 to supporting member 20 and second sensor 22 has the function of detecting a force in relation to the Z-axis direction that is applied from the entirety of second force transmitting member 12 to supporting member 20, detection circuit 30 can perform the process of detecting a moment My about the Y-axis that acts on force receiving member 10 based on the difference between the force in relation to the Z-axis direction that is detected by first sensor 21 and the force in relation to the Z-axis direction that is detected by second sensor 22.

Though just the operations related to first force transmitting member 11 and second force transmitting member 12 were described above with reference to FIG. 2A to FIG. 2C, the operations related to third force transmitting member 13 and fourth force transmitting member 14 are the same, and an X-axis direction force Fx and a moment My about the Y-axis that act on force receiving member 10 can also be detected using the detection functions of third sensor 23 and fourth sensor 24. It can also be understood by considering the operations related to first force transmitting member 11 and fourth force transmitting member 14 upon rotating the force detection device shown in FIG. 1 by 90° with the Z-axis as the rotation axis, that a Y-axis direction force Fy and a moment Mx about the X-axis that act on force receiving member 10 can be detected using the detection functions of first sensor 21 and fourth sensor 24. Likewise, by the operations related to second force transmitting member 12 and third force transmitting member 13, a Y-axis direction force Fy and a moment Mx about the X-axis that act on force receiving member 10 can also be detected using the detection functions of second sensor 22 and third sensor 23.

<<<Section 2. Force Sensors Used in this Invention>>>

The force detection device shown in FIG. 1 is provided with first sensor 21 to fourth sensor 24. These sensors are force sensors that detect forces applied to supporting member 20 from first force transmitting member 11 to fourth force transmitting member 14, respectively, and the detections of forces Fx and Fy and moments Mx and My based on the principles described with FIG. 2A to FIG. 2C require functions that enable each of the forces due to the inclinations of the respective force transmitting members 11 to 14 and the pulling force/pressing force applied by the entireties of force transmitting members 11 and 14 to be detected independently.

Figure 3:
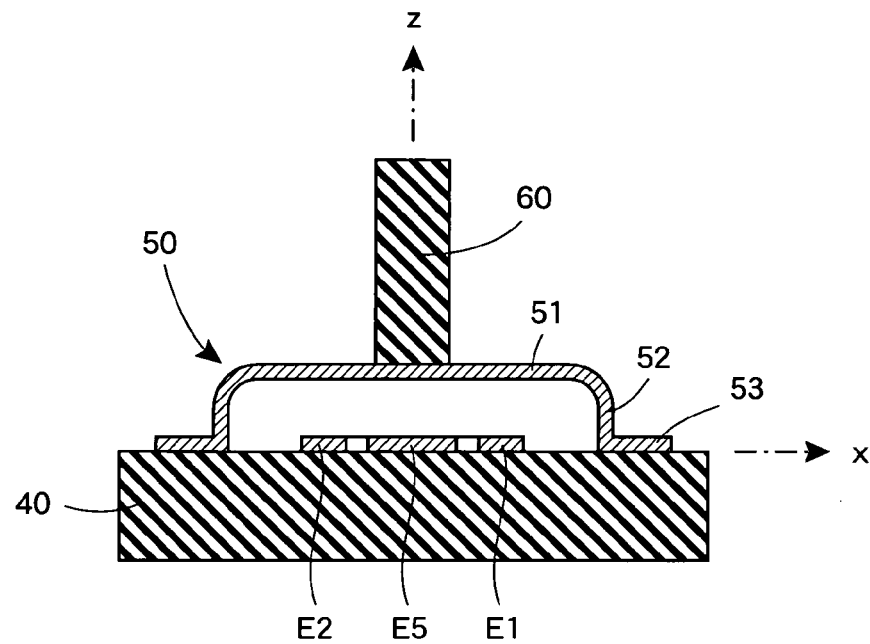
FIG. 3 is a side view in section (section across the xz plane) showing an example of a multi-axis force sensor that is suitable as each of a first sensor 21 to a fourth sensor 24 in the force detection device shown in FIG. 1.

Thus with this invention, static capacitance type force sensors, each having a plurality of capacitance elements, are used as the respective sensors 21 to 24. FIG. 3 is a side view in section showing an example of such a static capacitance element type multi-axis force sensor. Though this multi-axis force sensor in itself is a known sensor and is put to practical use in various uses, the basic structure and operations of this multi-axis force sensor shall be described briefly here.

Figure 4:
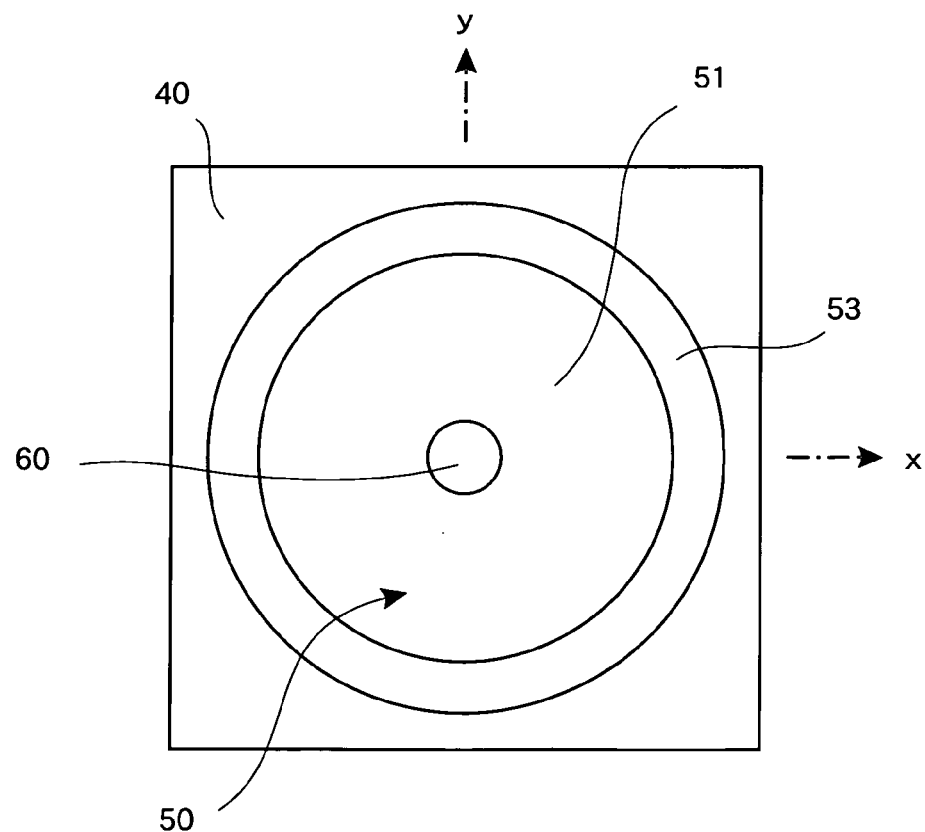
FIG. 4 is a top view of the multi-axis force sensor shown in FIG. 3.

As shown in the side view in section of FIG. 3, this multi-axis force sensor comprises a plate-like supporting member 40, a bowl-like connecting member 50, disposed above the supporting member, a force transmitting member 60, and fixed electrodes E1 to E5, disposed on the top surface of supporting member 40. As shown in the top view of FIG. 4, bowl-like connecting member 50 has the shape of a circular bowl, which has a flat bottom and is set upside down. Here, for the sake of description, an origin O is defined at a central position of the top surface of supporting member 40 and an xyz three-dimensional coordinate system, having x-, y-, and z-axes in the illustrated directions, is defined. As shown in the side view in section of FIG. 3, bowl-like connecting member 50 comprises the respective parts of a disc-like diaphragm 51, corresponding to the flat bottom part of a bowl, a cylindrical side wall part 52, which supports the periphery of the diaphragm, and fixing part 53 for fixing side wall part 52 to the top surface of supporting member 40, and a cylindrical force transmitting member 60 is connected to a central part of the upper surface of diaphragm 51. Origin O is defined at the position of the intersection of the line of extension of the axial center of this cylindrical force transmitting member 60 and the top surface of supporting member 40.

Here, in the case of this example, whereas each of supporting member 40 and force transmitting member 60 has an adequate rigidity, bowl-like connecting member 50 has flexibility (in other words, a property of undergoing elastic deformation). In this example, bowl-like connecting member 50 is formed of a thin plate of metal and supporting member 40 and force transmitting member 60 are formed of an insulating material.

Figure 5:
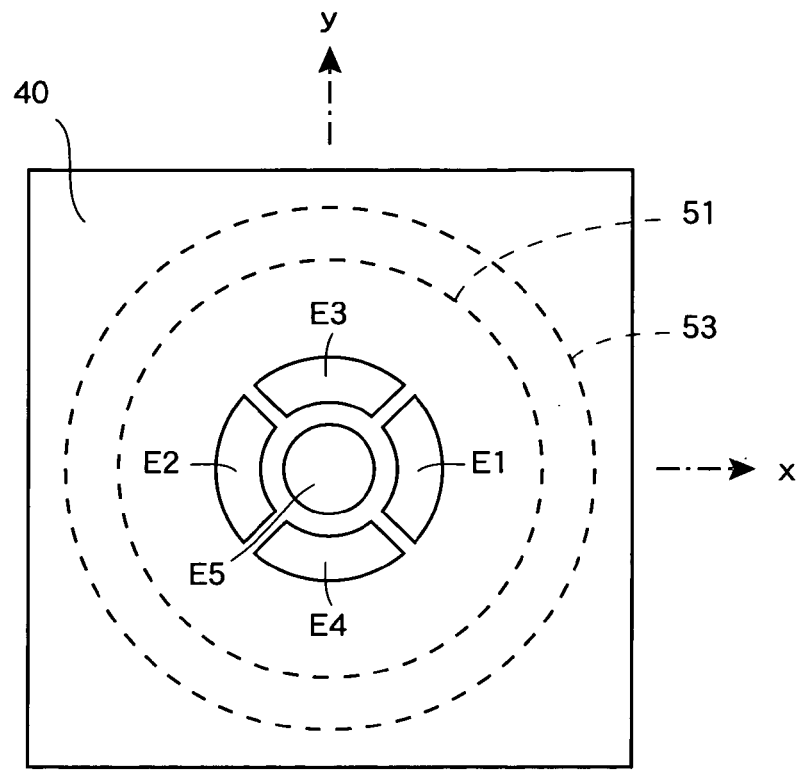
FIG. 5 is a top view of a supporting member 40 of the multi-axis force sensor shown in FIG. 3 (the broken lines indicate the position of a bowl-like connection member).

As shown in the top view of FIG. 5, five fixed electrodes E1 to E5 are formed on the top surface of plate-like supporting member 40. Here, fixed electrode E1 is positioned at a positive part of the x-axis, fixed electrode E2 is positioned at a negative part of the x-axis, fixed electrode E3 is positioned at a positive part of the y-axis, and fixed electrode E4 is positioned at a negative part of the y-axis, and all of these electrodes are electrodes of the same size and same fan-like shape that is line symmetrical with respect to the corresponding coordinate axes. Meanwhile, fixed electrode E5 is a circular electrode that is positioned at the position of origin O. The positions of the parts of bowl-like connecting member 50 that are fixed onto supporting member 40 are indicated by the broken lines in FIG. 5. As illustrated, diaphragm 51 is positioned above supporting member 40 so as to oppose all fixed electrodes E1 to E5. By forming diaphragm 51 of a metal plate or other conductive material as mentioned above, diaphragm 51 is made to have flexibility and conductivity and function in itself as a single common displaceable electrode that forms capacitance elements across the opposing fixed electrodes E1 to E5. Here, the five capacitance elements that are formed by the respective fixed electrodes E1 to E5 and diaphragm 51, which functions as a common displaceable electrode, shall be referred to respectively as capacitance elements C1 to C5.

The manner in which bowl-like connecting member 50 deforms and the variations of the static capacitance values of the respective capacitance elements C1 to C5 when forces of various directional components act on force transmitting member 60 shall now be considered.

Figure 6:
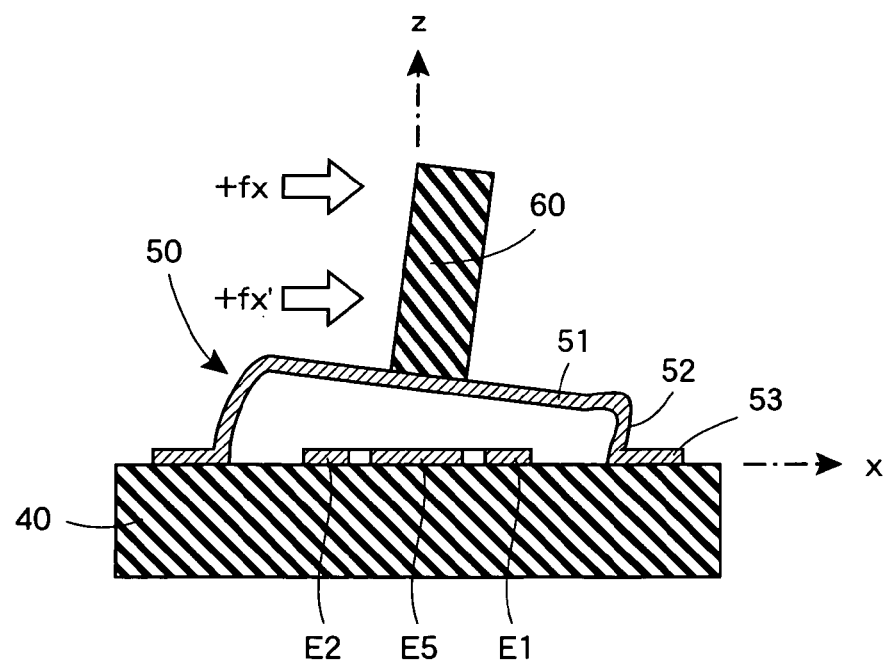
FIG. 6 is a side view in section showing a state wherein a positive x-axis direction force +fx is applied to the multi-axis force sensor shown in FIG. 3.

First, a case where a positive x-axis direction force +fx is applied to an upper part of force transmitting member 60 as shown in FIG. 6 shall be considered. In this case, a force that makes force transmitting member 60 become inclined towards the right acts and bowl-like connecting member 50 with flexibility becomes deformed as shown in the Figure so that diaphragm 51 becomes inclined in a manner such that its right part is moved downwards and its left part is moved upwards. As a result, whereas capacitance element C1 becomes narrower in the distance between both electrodes (fixed electrode E1 and diaphragm 51) and thus increases in static capacitance value, capacitance element C2 becomes wider in the distance between both electrodes (fixed electrode E2 and diaphragm 51) and thus decreases in static capacitance value. Here, with each of the other three capacitance elements C3 to C5, though the distance between electrodes narrows at the right half, since the distance between electrodes spreads at the left half, the static capacitance value does not change in total.

Such deformations occur in the same manner when a positive X-axis direction force +fx' is applied to a lower part of force transmitting member 60. However, due to the principle of a leverage, even when the magnitude of +fx and the magnitude of +fx' are equal, the former will give rise to a greater deformation.

Figure 7:
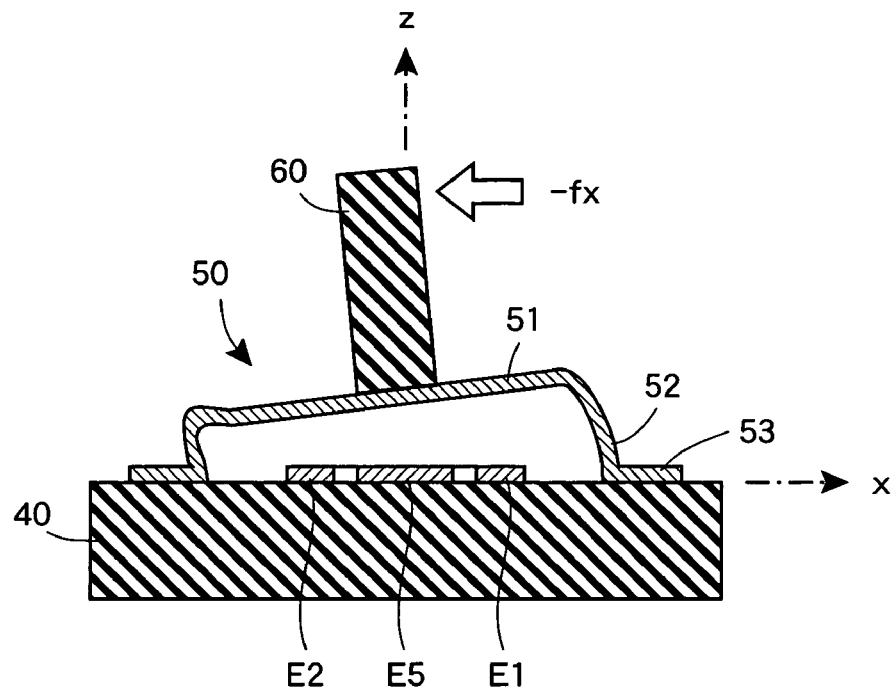
FIG. 7 is a side view in section showing a state wherein a negative x-axis direction force −fx is applied to the multi-axis force sensor shown in FIG. 3.

Next, a case where a negative x-axis direction force −fx is applied to the upper part of force transmitting member 60 as shown in FIG. 7 shall be considered. In this case, a force that makes force transmitting member 60 become inclined towards the left acts and bowl-like connecting member 50 with flexibility becomes deformed as shown in the Figure so that diaphragm 51 becomes inclined in a manner such that its left part moves downwards and its right part moves upwards. As a result, the static capacitance value of capacitance element C1 decreases and the static capacitance value of capacitance element C2 increases.

An x-axis direction force that acts on force transmitting member 60 can thus be determined as the difference between the static capacitance value of first capacitance element C1 and the static capacitance value of second capacitance element C2. The magnitude of the determined difference indicates the magnitude of the acting force and the sign of the determined difference indicates the direction of the acting force. By exactly the same principle, a y-axis direction force fy that acts on force transmitting member 60 can be determined as the difference between the static capacitance value of third capacitance element C3 and the static capacitance value of fourth capacitance element C4.

A force fx that is thus determined indicates non other than the inclination degree in relation to the x-axis direction of columnar force transmitting member 60 and a force fy indicates non other than the inclination degree in relation to the y-axis direction of columnar force transmitting member 60. The inclination degree in relation to the x-axis direction of force transmitting member 60 can thus be determined as the difference between the static capacitance value of first capacitance element C1 and the static capacitance value of second capacitance element C2, and the inclination degree in relation to the y-axis direction of force transmitting member 60 can thus be determined as the difference between the static capacitance value of third capacitance element C3 and the static capacitance value of fourth capacitance element C4. In other words, based on the difference between a force that is applied from a first part of the bottom end of force transmitting member 60 and a force that is applied from a second part of the bottom end of force transmitting member 60, the inclination degree of force transmitting member 60 with respect to supporting member 40 can be detected.

Figure 8:
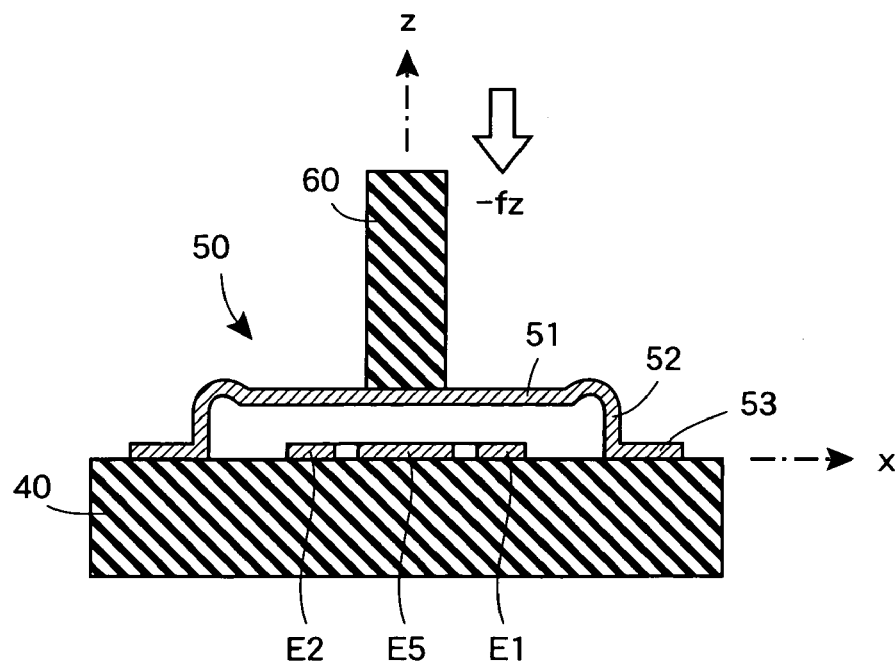
FIG. 8 is a side view in section showing a state wherein a negative z-axis direction force −fz is applied to the multi-axis force sensor shown in FIG. 3.

Next, a case where a negative z-axis direction force −fz is applied to force transmitting member 60 as shown in FIG. 8 shall be considered. In this case, since a force in the downward direction of the Figure is applied to the entirety of force transmitting member 60, a downward pressing force is made to act on bowl-like connecting member 50 by the entirety of force transmitting member 60 without force transmitting member 60 becoming inclined, and bowl-like connecting member 50 with flexibility becomes deformed as shown in the Figure so that all of the five capacitance elements C1 to C5 become narrowed in electrode interval and increase in static capacitance value. Oppositely, when a force +fz that pulls force transmitting member 60 upwards is applied, an upward pulling force acts on bowl-like connecting member 50 from the entirety of force transmitting member 60 so that all of the five capacitance elements C1 to C5 become widened in electrode interval and decrease in static capacitance value.

Thus under an environment wherein only a z-axis direction force fz acts on force transmitting member 60, the acting force fz can be determined by detecting the static capacitance value of any of first to fifth capacitance elements C1 to C5. However, under an environment where forces fx and fy of the other axial directional components are mixed, even if, for example, the static capacitance value of capacitance element C1 is determined solitarily or the static capacitance value of capacitance element C3 is determined solitarily, these values will not necessarily indicate a z-axis direction force fz. In order to detect a z-axis direction force fz under any environment, the static capacitance value of capacitance element C5 is used. Since as mentioned above, a change in the static capacitance value of capacitance element C5 will not occur in a case where an x-axis direction force fx or a y-axis direction force fy acts, just a z-axis direction force fz can be detected independently by using the static capacitance value of capacitance element C5.

There are other methods that may be used to detect just a z-axis direction force fz independently. For example, the sum of the static capacitance value of capacitance element C1 and the static capacitance value of capacitance element C2 may be determined and this may be used as the detection value of a z-axis direction force fz. Since in regard to the action of an x-axis direction force fx, the change of the static capacitance value of capacitance element C1 and the change of the static capacitance value of capacitance element C2 are in a complementary relationship, by summing the two values, the component of the x-axis direction force fx can be canceled out and just the detection value of the z-axis direction force fz can be taken out. Likewise, the sum of the static capacitance value of capacitance element C3 and the static capacitance value of capacitance element C4 may be determined and this may be used as the detection value of a z-axis direction force fz. Furthermore, the sum of the static capacitance values of the four capacitance elements C1 to C4 or the sum of the static capacitance values of the five capacitance elements C1 to C5 may be determined and this may also be used as the detected value of a z-axis direction force fz. Thus fixed electrode E5 (capacitance element C5) does not necessarily have to be provided.

As described above, by using the multi-axis force sensor shown in FIG. 3, an inclination degree in relation to the x-axis direction (force fx) of force transmitting member 60, an inclination degree in relation to the y-axis direction (force fy) of force transmitting member 60, and a force (force fz) that is applied to supporting member 40 from the entirety of force transmitting member 60 can be detected. This means that the multi-axis sensor shown in FIG. 3 is a sensor that can be used as each of the respective sensors 21 to 24 in the force detection device shown in FIG. 1.

<<<Section 3. Structure and Principles of a First Embodiment of the Invention>>>

The major structural parts of a force detection device of a first embodiment of this invention shall now be described using FIG. 9 to FIG. 13, the operation principles of this device shall be described using FIG. 14A, FIG. 14B, and FIG. 15, the wiring for performing the detection in accordance to these operation principles shall be described using FIG. 16 to FIG. 21, and an electrode configuration suited for the detection of all six force components shall be described using FIG. 22 to FIG. 26.

Figure 9:
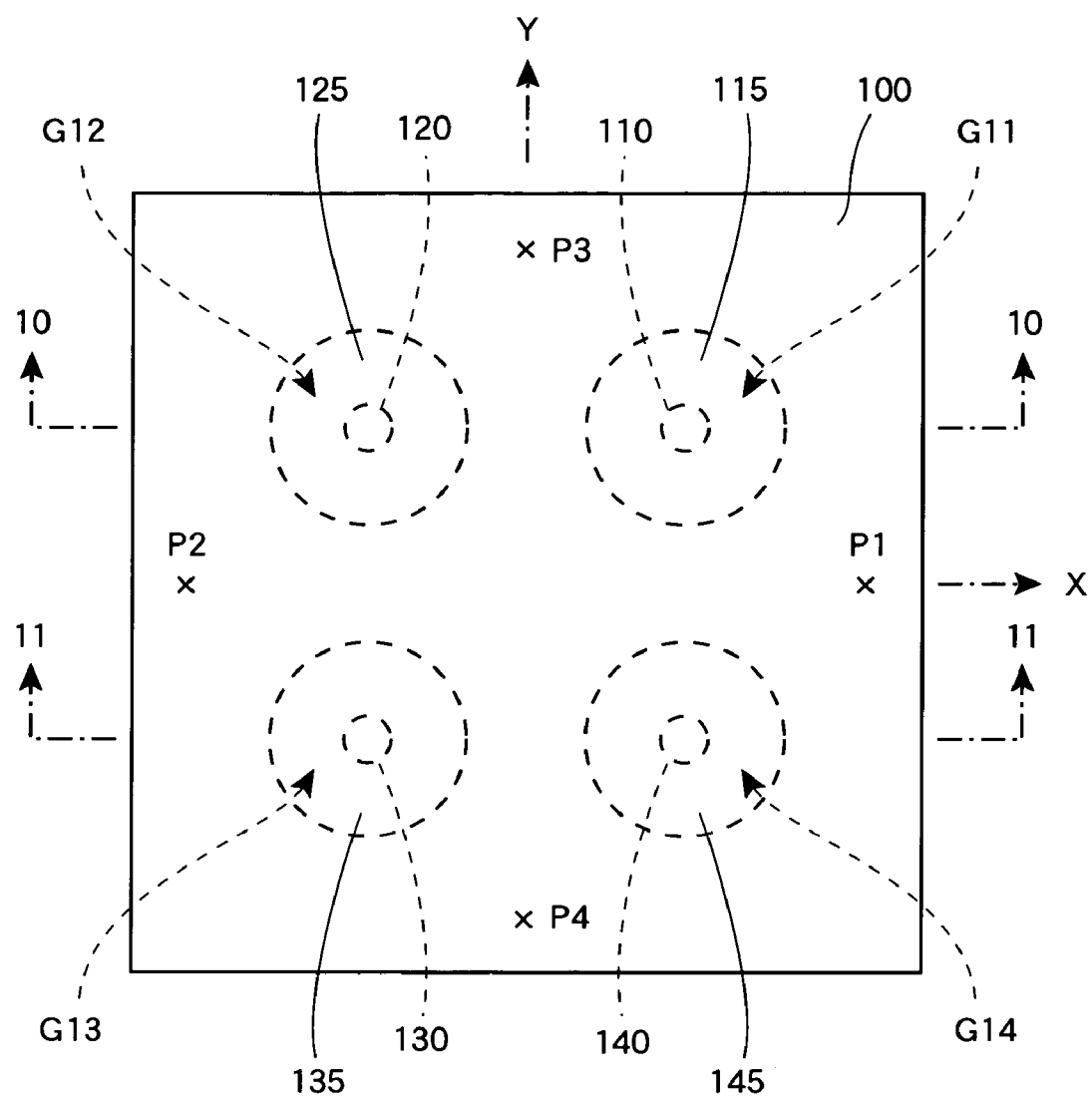
FIG. 9 is a top view of a force detection device of a first embodiment of this invention.
Figure 10:
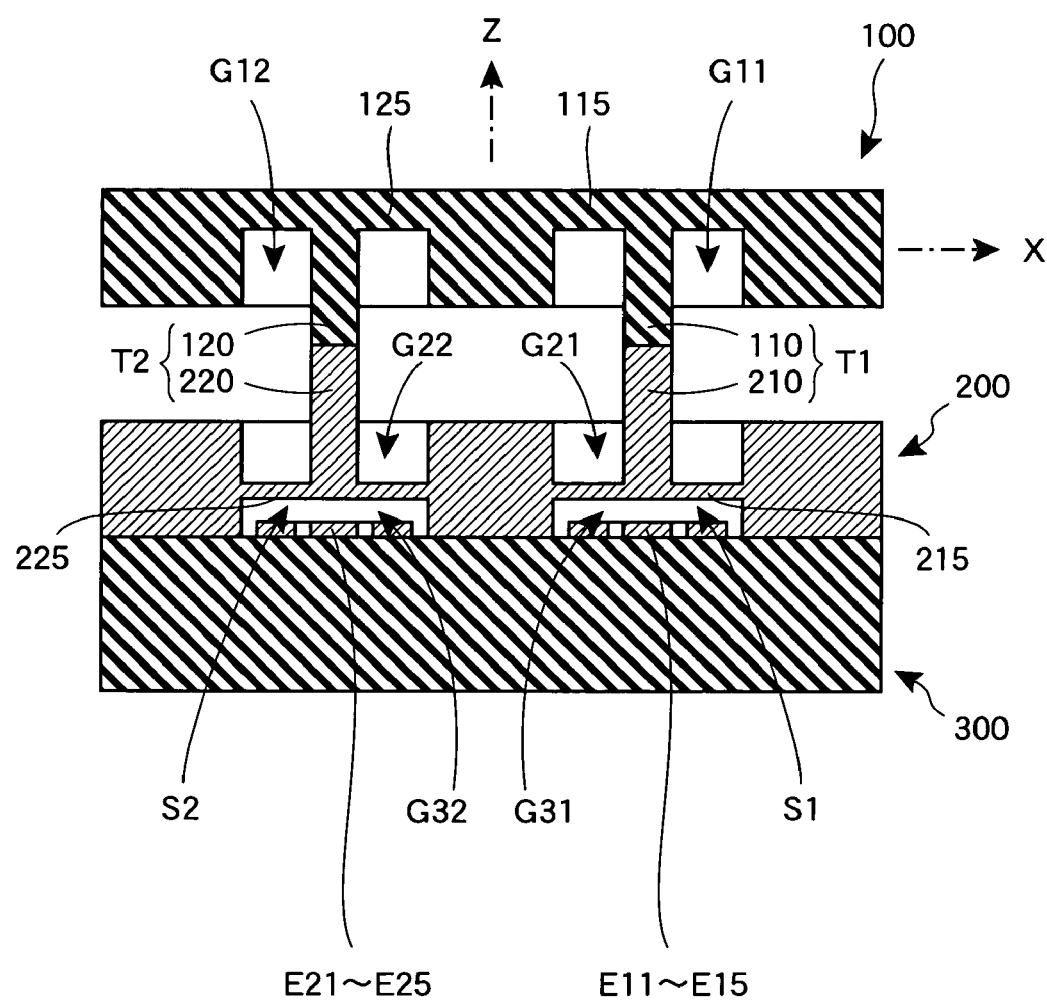
FIG. 10 is a first side view in section of the force detection device of the first embodiment of this invention and shows the section along sectioning line 10—10 of the device shown in FIG. 9.
Figure 11:
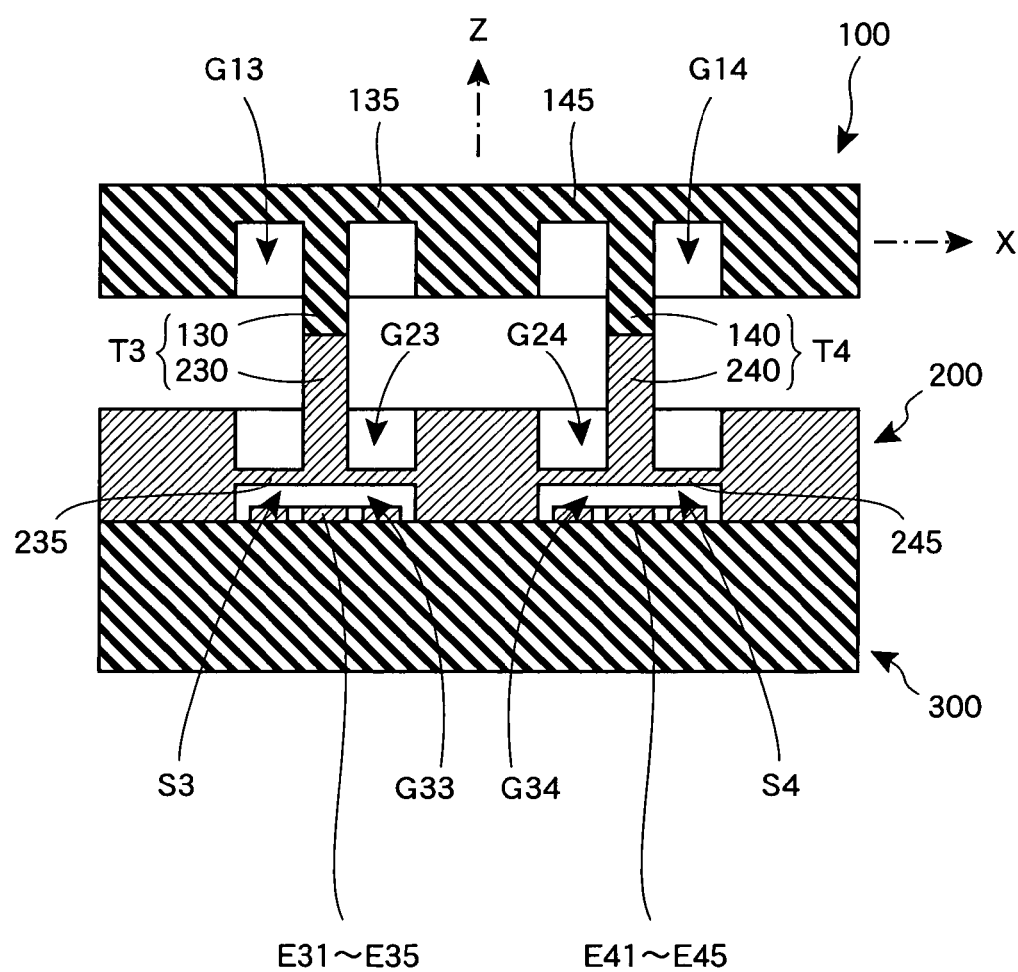
FIG. 11 is a second side view in section of the force detection device of the first embodiment of this invention and shows the section along sectioning line 11—11 of the device shown in FIG. 9.

FIG. 9 is a top view of this force detection device of the first embodiment. FIG. 10 shows a side view in section along sectioning line 10—10 of this top view and FIG. 11 shows a side view in section along sectioning line 11—11. As shown in FIG. 10 or FIG. 11, the basic components of this force detection device are a force receiving member 100, an intermediate member 200, and a supporting member 300, and the basic form of each of these is a plate-like member having a top surface of square shape. FIG. 10 and FIG. 11 are side views in section that differ from each other in sectioning position and the geometrical structures that appear in the Figures are exactly the same. These differ in just the symbols of the respective parts.

Figure 12:
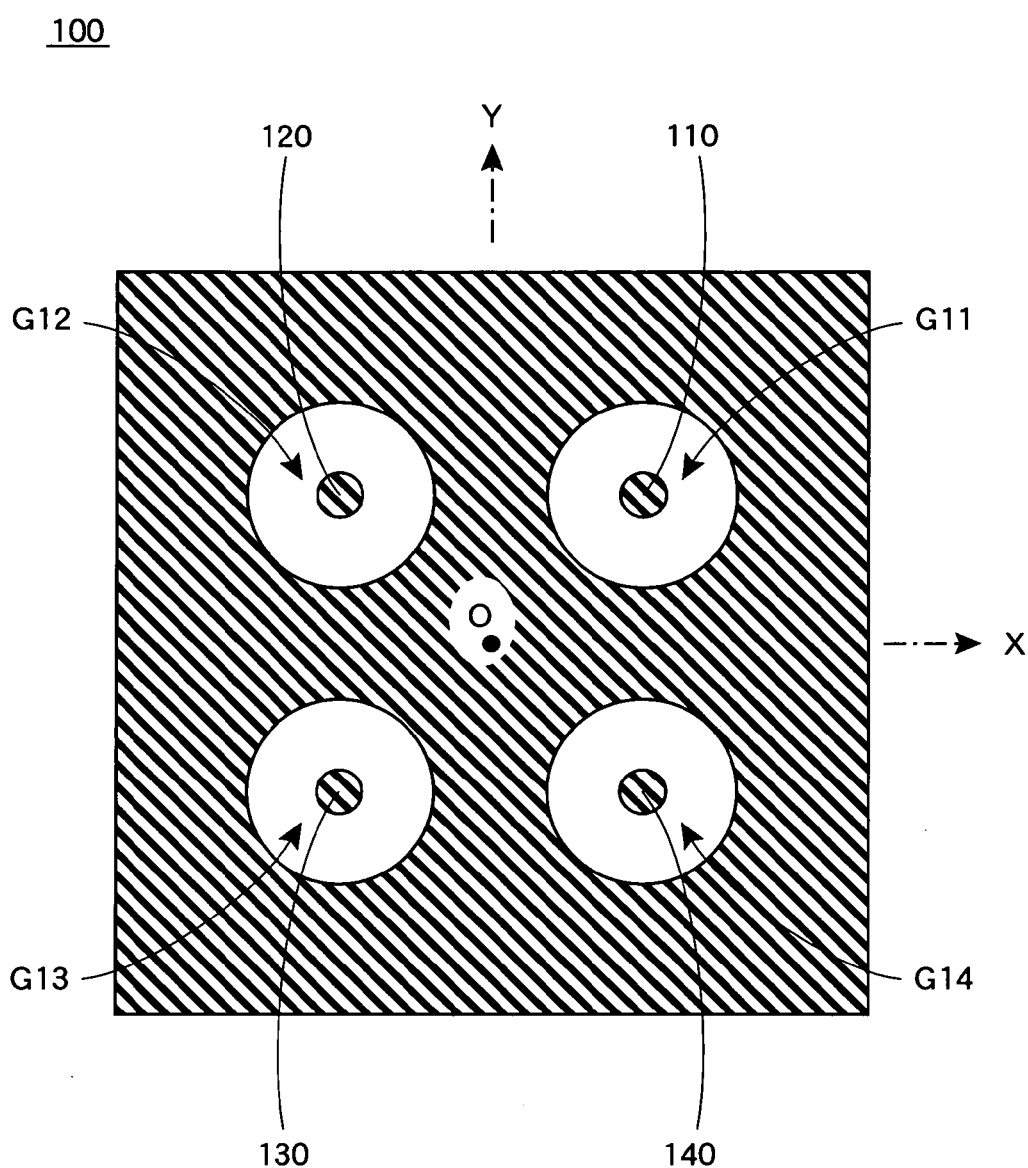
FIG. 12 is a transverse section across the XY plane of the force detection device of the first embodiment of this invention.

As shown in FIG. 9, force receiving member 100 is basically a plate-like member having a top surface with a square shape and has four cylindrical protruding parts 110, 120, 130, and 140 extending downwards from the bottom surface. FIG. 12 is a transverse section along the X-Y plane of force receiving member 100. Here, for the sake of description, an XYZ three-dimensional coordinate system is defined as illustrated by defining an origin O at a central position of force receiving member 100, and setting the X-axis in the right direction of the Figure, the Y-axis in the upward direction, and the Z-axis in the upward direction perpendicular to the paper surface. Each of force receiving member 100, intermediate member 200, and supporting member 300, formed of a plate-like member having a top surface of square shape, is positioned so that both the upper and lower surfaces are parallel to the XY plane and the respective edges are parallel to the X-axis or the Y-axis.

As shown in FIG. 12, annular groove parts G11, G12, G13, and G14 are formed at the circumferences of the base parts of four cylindrical protruding parts 110, 120, 130, and 140, and by the forming of these groove parts G11, G12, G13, and G14, thin parts 115, 125, 135, and 145 with flexibility are formed in plate-like force receiving member 100 as shown in FIG. 9, FIG. 10, and FIG. 11. The four cylindrical protruding parts 110, 120, 130, and 140 are thus connected to plate-like force receiving member 100 via thin parts 115, 125, 135, and 145. To be more detailed in regard to the positioning of the respective cylindrical protruding parts, cylindrical protruding parts 110, 120, 130, and 140 are positioned so that the positions of their respective central axes will be positioned at the four vertices of "a square, which is positioned at a position centered about the origin, is smaller in outline than force receiving member 100, and with which the vertical and transverse sides are parallel to the X-axis and Y-axis."

Figure 13:
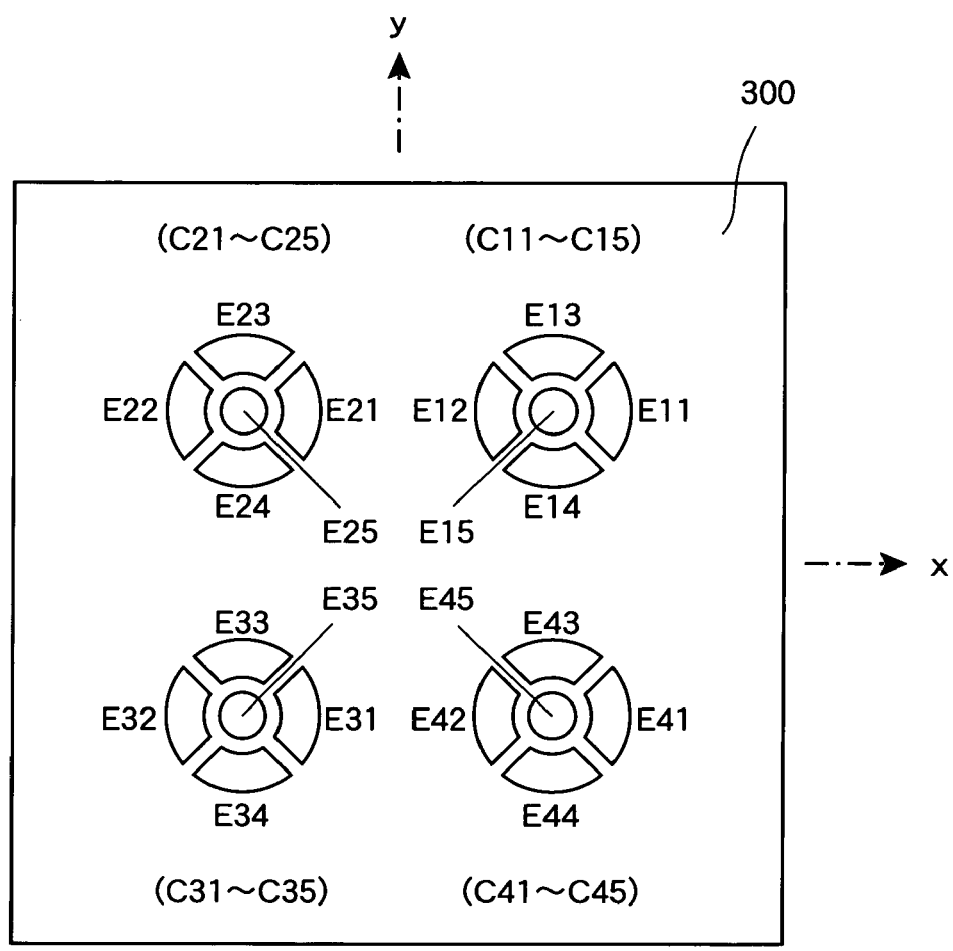
FIG. 13 is a top view of a supporting member 300 of the force detection device of the first embodiment of this invention.

Meanwhile, supporting member 300 is a completely plate-like member having a top surface with a square shape as shown in FIG. 13, and fixed electrodes E11 to E15, E21 to E25, E31 to E35, and E41 to E45 are disposed on the top surface thereof. Though intermediate member 200, which is joined to the top surface of this supporting member 300, is basically a plate-like member having a top surface with a square shape, four cylindrical protruding parts 210, 220, 230, and 240 extend upwards from the top surface as shown in FIG. 10 and FIG. 11. Annular groove parts G21, G22, G23, and G24 are formed at the circumferences of the base parts of these four cylindrical protruding parts 210, 220, 230, and 240 and furthermore, cylindrical groove parts G31, G32, G33, and G34 are formed in the bottom surface of intermediate member 200. Both sets of groove parts G21, G22, G23, and G24, which are provided in the top surface of intermediate member 200, and groove parts G31, G32, G33, and G34, which are provided in the bottom surface, have circular outlines of the same size centered about the positions of the central axes of cylindrical protruding parts 210, 220, 230, and 240. As shown in FIG. 10, a diaphragm 215 exists as a boundary wall between groove parts G21 and G31 and a diaphragm 225 exists as a boundary wall between groove parts G22 and G32. Also as shown in FIG. 11, a diaphragm 235 exists as a boundary wall between groove parts G23 and G33 and a diaphragm 245 exists as a boundary wall between groove parts G24 and G34.

The bottom surfaces of the four cylindrical protruding parts 110, 120, 130, and 140 that extend downward from the force receiving member 100 are joined to the top surfaces of the four cylindrical protruding parts 210, 220, 230, and 240 that extend upward from the intermediate member 200. Here, as shown in FIG. 10, the cylindrical structure that is formed by joining cylindrical protruding part 110 and cylindrical protruding part 210 shall be referred to as a first force transmitting member T1 and the cylindrical structure that is formed by joining cylindrical protruding part 120 and cylindrical protruding part 220 shall be referred to as a second force transmitting member T2. Also, as shown in FIG. 11, the cylindrical structure that is formed by joining cylindrical protruding part 130 and cylindrical protruding part 230 shall be referred to as a third force transmitting member T3 and the cylindrical structure that is formed by joining cylindrical protruding part 140 and cylindrical protruding part 240 shall be referred to as a fourth force transmitting member T4. As shown in the top view of FIG. 9, in considering the positioning of the four force transmitting members T1 to T4 in the XY two-dimensional coordinate system, first force transmitting member T1 is positioned in the first quadrant, second force transmitting member T2 is positioned in the second quadrant, third force transmitting member T3 is positioned in the third quadrant, fourth force transmitting member T4 is positioned in the fourth quadrant, and each of these is a cylindrical structure, with which the longitudinal direction is a direction parallel to the Z-axis.

Also as shown in FIG. 10, the upper end of first force transmitting member T1 is connected to force receiving member 100 with the flexible thin part 115 as a connecting member, the upper end of second force transmitting member T2 is connected to force receiving member 100 with the flexible thin part 125 as a connecting member, and as shown in FIG. 11, the upper end of third force transmitting member T3 is connected to force receiving member 100 with the flexible thin part 135 as a connecting member and the upper end of fourth force transmitting member T4 is connected to force receiving member 100 with the flexible thin part 145 as a connecting member.

Meanwhile, as shown in FIG. 10, the lower surface of first force transmitting member T1 is connected to the center of diaphragm 215, which functions as a connecting member, and the circumference of diaphragm 215 is connected via intermediate member 200 to supporting member 300, and the lower surface of second force transmitting member T2 is connected to the center of diaphragm 225, which functions as a connecting member, and the circumference of diaphragm 225 is connected via intermediate member 200 to supporting member 300. Likewise, as shown in FIG. 11, the lower surface of third force transmitting member T3 is connected to the center of diaphragm 235, which functions as a connecting member, and the circumference of diaphragm 235 is connected via intermediate member 200 to supporting member 300, and the lower surface of fourth force transmitting member T4 is connected to the center of diaphragm 245, which functions as a connecting member, and the circumference of diaphragm 245 is connected via intermediate member 200 to supporting member 300.

In the illustrated embodiment, force receiving member 100 is formed of an insulating substrate (for example, a ceramic substrate), intermediate member 200 is formed of a conductive substrate (for example, a substrate of stainless steel, aluminum, titanium, or other metal), and supporting member 300 is formed of an insulating substrate (for example, a ceramic substrate). Obviously, the materials of the respective parts are not restricted to the above and, for example, force receiving member 100 may be formed of a substrate of stainless steel, aluminum, titanium, or other metal instead. Thin parts 115, 125, 135, and 145 and diaphragms 215, 225, 235, and 245 are parts that are formed to have flexibility by being made thinner in thickness in comparison to other parts of a substrate.

In this embodiment, diaphragms 215, 225, 235, and 245 are formed of a conductive material, these have conductivity as well as flexibility and function in themselves as common displaceable electrodes. This is exactly the same as in the arrangement of the multi-axis force sensor shown in FIG. 3. That is, fixed electrodes E11 to E15, which are illustrated in the first quadrant in the xy two-dimensional coordinate system defined on the upper surface of supporting member 300 shown in FIG. 13, fixed electrodes E21 to E25, which are illustrated in the second quadrant, fixed electrodes E31 to E35, which are illustrated in the third quadrant, and fixed electrodes E41 to E45, which are illustrated in the fourth quadrant, are all components equivalent to the fixed electrodes E1 to E5, shown in FIG. 5, and diaphragms 215 and 225, shown in FIG. 10, and diaphragms 235 and 245, shown in FIG. 11, are all components equivalent to diaphragm 51 shown in FIG. 3. Consequently, sensors S1 and S2, each of which is equivalent in function to the multi-axis force sensor shown in FIG. 3, are arranged at the circumference of groove G31 and the circumference of groove G32 shown in FIG. 10, and also, sensors S3 and S4, each of which is equivalent in function to the multi-axis force sensor shown in FIG. 3, are thus arranged at the circumference of groove G33 and the circumference of groove G34, shown in FIG. 11.

Here, sensor S1 has the function of detecting an inclination degree in relation to the X-axis direction and an inclination degree in relation to the Y-axis direction of first force transmitting member T1 and a force in relation to the Z-axis direction that is applied to supporting member 300 from the entirety of first force transmitting member T1, sensor S2 has the function of detecting an inclination degree in relation to the X-axis direction and an inclination degree in relation to the Y-axis direction of second force transmitting member T2 and a force in relation to the Z-axis direction that is applied to supporting member 300 from the entirety of second force transmitting member T2, sensor S3 has the function of detecting an inclination degree in relation to the X-axis direction and an inclination degree in relation to the Y-axis direction of third force transmitting member T3 and a force in relation to the Z-axis direction that is applied to supporting member 300 from the entirety of third force transmitting member T3, and sensor S4 has the function of detecting an inclination degree in relation to the X-axis direction and an inclination degree in relation to the Y-axis direction of fourth force transmitting member T4 and a force in relation to the Z-axis direction that is applied to supporting member 300 from the entirety of fourth force transmitting member T4.

It can thus be understood that the force detection device of the first embodiment shown in FIG. 9 through FIG. 13 has substantially equivalent components as the force detection device shown in FIG. 1. That is, plate-like force receiving member 100 corresponds to force receiving member 10, plate-like supporting member 300 corresponds to supporting member 20, the respective force transmitting members T1 to T4 correspond to the respective force transmitting members 11 to 14, and the respective sensors S1 to S4 correspond to the respective sensors 21 to 24. Thus by further adding wiring and a circuit (to be described later), which function as detection circuit 30, to the structure shown in FIG. 9 through FIG. 13, the force detection device shown in FIG. 1 can be realized.

Next, the principles, by which the six force components of X-axis direction force Fx, Y-axis direction force Fy, Z-axis direction force Fz, moment Mx about the X-axis, moment My about the Y-axis, and moment Mz about the Z-axis that act on force receiving member 100 are detected independently by this force detection device of the first embodiment, shall now be described.

The twenty capacitance elements, formed by the twenty fixed electrodes E11 to E15, E21 to E25, E31 to E35, and E41 to E45, shown in FIG. 13, and the opposing common displaceable electrodes (diaphragms 215, 225, 235, and 245), shall be referred to respectively as C11 to C15, C21 to C25, C31 to C35, and C41 to C45. In FIG. 13, C11 to C45, which are indicated inside parenthesis, indicate the individual capacitance elements formed by the respective fixed electrodes. Also, an origin O is set at a predetermined position inside force receiving member 100 shown in FIG. 12 and an XYZ three-dimensional coordinate system is defined as illustrated. The variations of the static capacitance values of the twenty capacitance elements C11 to C45, which occur when a positive X-axis direction force +Fx, a positive Y-axis direction force +Fy, a positive Z-axis direction force +Fz, a positive direction moment +Mx about the X-axis, a positive direction moment +My about the Y-axis, and a positive direction moment +Mz about the Z-axis act respectively on force receiving member 100, shall now be considered.

FIG. 14A and FIG. 14B are tables indicating the modes of variation of the static capacitance values of the respective capacitance elements C11 to C45 that occur in the above cases, with "0" indicating no change, "+" indicating an increase, and "−" indicating a decrease. The reasons why the static capacitance values of the respective capacitance elements vary as shown in this table can be understood from the modes of deformation of the respective force transmitting members shown in FIG. 2A to FIG. 2C and the modes of deformation of the multi-axis force sensor shown in FIG. 6 to FIG. 8.

For example, when a positive X-axis direction force +Fx acts on force receiving member 100, since, as shown in FIG. 2B, the respective force transmitting members T1 to T4 become inclined towards the right side (in the positive X-axis direction) of FIG. 10 and FIG. 11, it can be understood from seeing the plan view of FIG. 13 that whereas capacitance elements C11, C21, C31, and C41 become narrower in electrode interval and increase in static capacitance value, capacitance elements C12, C22, C32, and C42 become wider in electrode interval and decrease in static capacitance value. With each of the other capacitance elements, since the electrode interval becomes wider at a part and narrower at another part, the static capacitance value does not change in total. The first rows (the rows of +Fx) of the tables of FIG. 14A and FIG. 14B show such variations of the static capacitance values for the respective capacitance elements C11 to C45.

Oppositely, when a negative X-axis direction force −Fx acts, since the respective force transmitting members T1 to T4 all become inclined towards the left side (in the negative X-axis direction) of FIG. 10 and FIG. 11, the increase/decrease relationships of the static capacitance values become reversed and results wherein the "+" and "−" of the first rows (rows of +Fx) of the tables of FIG. 14A and FIG. 14B are reversed are obtained.

Meanwhile, when a positive Y-axis direction force +Fy acts on force receiving member 100, phenomena, with which the modes of variation of the above-described case when a force +Fx acts are rotated by 90° as viewed from the top, occur. That is, as shown in the plan view of FIG. 13, whereas capacitance elements C13, C23, C33, and C43 become narrower in electrode interval and increase in static capacitance value, capacitance elements C14, C24, C34, and C44 become wider in electrode interval and decrease in static capacitance value. With each of the other capacitance elements, since the electrode interval becomes wider at a part and narrower at another part, the static capacitance value does not change in total. The second rows (the rows of +Fy) of the tables of FIG. 14A and FIG. 14B show such variations of the static capacitance values for the respective capacitance elements C11 to C45. Oppositely, when a negative Y-axis direction force −Fy acts, the increase/decrease relationships of the static capacitance values become reversed and results wherein the "+" and "−" are reversed are obtained.

Also, when a positive Z-axis direction force +Fz acts on force receiving member 100, since all of the respective force transmitting members T1 to T4 are made to apply a pulling force to the top surface of supporting member 300, all capacitance elements C11 to C45 become wider in electrode interval and decrease in static capacitance value. The third rows (rows of +Fz) of the tables of FIG. 14A and FIG. 14B indicate such variations. Oppositely, when a negative Z-axis direction force −Fz acts on force receiving member 100, since all of the respective force transmitting members T1 to T4 are made to apply a pressing force to the top surface of supporting member 300, all capacitance elements C11 to C45 become narrower in electrode interval and increase in static capacitance value. Results wherein the "+" and "−" of the third rows (rows of +Fz) of the tables of FIG. 14A and FIG. 14B are reversed are thus obtained.

Cases in which a moment acts on force receiving member 100 shall now be considered. FIG. 2C shows the modes of variation of the respective force transmitting members 11 and 12 when a positive direction moment +My about the Y-axis acts on force receiving member 10. That is, a downward pressing force −fz is applied from force transmitting member 11 to supporting member 20 and an upward pulling force +fz is applied from force transmitting member 12 to supporting member 20. Based on the occurrence of such modes of variation, when a positive direction moment +Mx about the X-axis acts on force receiving member 100, a force +fz in the direction perpendicularly upward from the paper surface acts on point P3 in the top view of FIG. 9 and a force −fz in the direction perpendicularly downward from the paper surface acts on point P4.

Thus in FIG. 10, a force +fz in the upward direction of the Figure acts on first force transmitting member T1 and second force transmitting member T2 and capacitance elements C11 to C25 become wider in electrode interval and decrease in capacitance value. Also in FIG. 11, a force −fz in the downward direction of the Figure acts on third force transmitting member T3 and fourth force transmitting member T4 and capacitance elements C31 to C45 become narrower in electrode interval and increase in capacitance value. The fourth rows (rows of +Mx) of the tables of FIG. 14A and FIG. 14B show such variations of the static capacitance values for the respective capacitance elements C11 to C45.

When a negative moment −Mx about the X-axis acts, the increase/decrease relationships become reversed and the results wherein the "+" and "−" are reversed are obtained.

Meanwhile, when a positive direction moment +My about the Y-axis acts on force receiving member 100, a force −fz in the direction perpendicularly downward from the paper surface acts on point P1 in the top view of FIG. 9 and a force +fz in the direction perpendicularly upward from the paper surface acts on point P2. Thus on first force transmitting member T1 of FIG. 10 and fourth force transmitting member T4 of FIG. 11, a force −fz in the downward direction of the respective Figures acts and capacitance elements C11 to C15 and C41 to C45 become narrower in electrode interval and increase in capacitance value. Also on second force transmitting member T2 of FIG. 10 and third force transmitting member T3 of FIG. 11, a force +fz in the upward direction of the respective Figures acts and capacitance elements C21 to C25 and C31 to C35 become wider in electrode interval and decrease in capacitance value. The fifth rows (rows of +My) of the tables of FIG. 14A and FIG. 14B show such variations of the static capacitance values for the respective capacitance elements C11 to C45. Oppositely, when a negative moment −My about the Y-axis acts, the increase/decrease relationships become reversed and the results wherein the "+" and "−" are reversed are obtained.

Lastly, a case where a moment Mz about the Z-axis acts on force receiving member 100 shall be considered. First, the directions in which the four force transmitting members T1 to T4 become inclined in a case where a positive direction moment +Mz about the Z-axis (which will be a counterclockwise moment in the plan view of FIG. 13) is applied to force receiving member 100 shall be considered with reference to FIG. 13.

Firstly, first force transmitting member T1 (positioned above fixed electrode E15 of the Figure), positioned in the first quadrant, becomes inclined in the upper left direction in FIG. 13 so that capacitance elements C12 and C13 become narrower in electrode interval and increase in static capacitance value while capacitance elements C1 and C14 become wider in electrode interval and decrease in static capacitance value. Also, second force transmitting member T2 (positioned above fixed electrode E25 of the Figure), positioned in the second quadrant, becomes inclined in the lower left direction in FIG. 13 so that capacitance elements C22 and C24 become narrower in electrode interval and increase in static capacitance value while capacitance elements C21 and C23 become wider in electrode interval and decrease in static capacitance value. Furthermore, third force transmitting member T3 (positioned above fixed electrode E35 of the Figure), positioned in the third quadrant, becomes inclined in the lower right direction in FIG. 13 so that capacitance elements C31 and C34 become narrower in electrode interval and increase in static capacitance value while capacitance elements C32 and C33 become wider in electrode interval and decrease in static capacitance value. Lastly, fourth force transmitting member T4 (positioned above fixed electrode E45 of the Figure), positioned in the fourth quadrant, becomes inclined in the upper right direction in FIG. 13 so that capacitance elements C41 and C43 become narrower in electrode interval and increase in static capacitance value while capacitance elements C42 and C44 become wider in electrode interval and decrease in static capacitance value. With the static capacitance value of each of capacitance elements C15, C25, C35, and C45, a change does not occur in total.

Thus when a positive direction moment +Mz about the Z-axis acts on force receiving member 100, the increase/decrease results shown in the sixth rows of FIG. 14A and FIG. 14B are obtained. When a negative direction moment −Mz about the Z-axis acts on force receiving member 100, the increase/decrease relationships become reversed and the results wherein the "+" and "−" are reversed are obtained.

Figure 15:
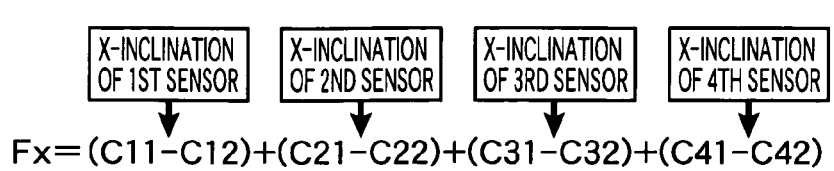
FIG. 15 is a diagram illustrating, by way of numerical equations, the principles of detection of the respective force components shown in FIG. 14A and FIG. 14B.
Figure 15:
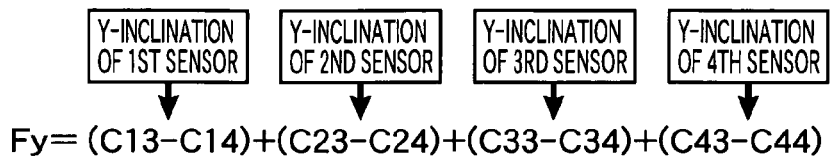
Figure 15:
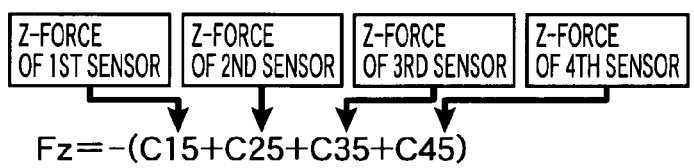
Figure 15:
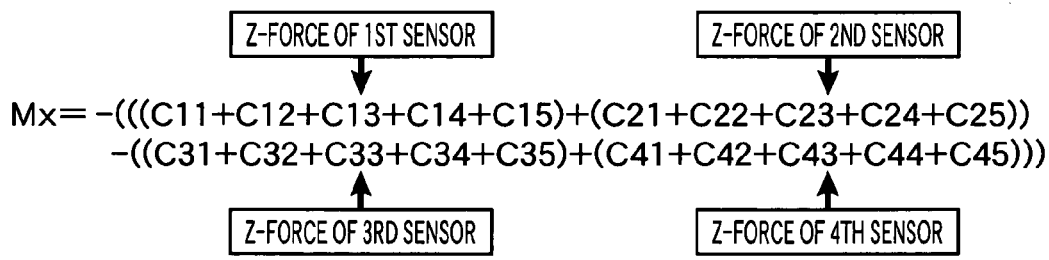
Figure 15:
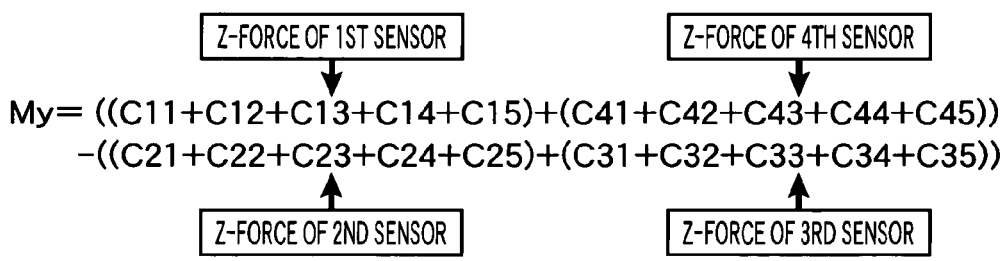
Figure 15:
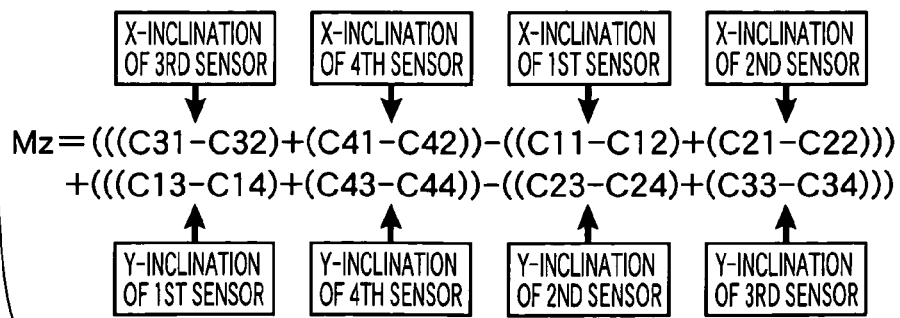

Based on the results shown in the tables of FIGS. 14A and 14B, it can be understood that the six components, Fx, Fy, Fz, Mx, My, and Mz, can be obtained by preparing as detection circuit 30, a circuit, which, uses the static capacitance values (here, the static capacitance values themselves shall be indicated by the same symbols, C11 to C45) of the twenty capacitance elements C11 to C45 to perform computations based on the equations shown in FIG. 15.

For example, the equation, Fx=(C11−C12)+(C21−C22)+(C31−C32)+(C41−C42), shown in FIG. 15, is based on the results of the first rows (rows of +Fx) of the tables of FIG. 14A and FIG. 14B and signifies that the X-axis direction component Fx of a force that acts on force receiving member 100 can be detected based on the sum of the inclination degrees in relation to the X-axis direction of the respective force transmitting members T1 to T4, which are detected by the first to fourth sensors. This is based on the detection principle illustrated in FIG. 2B.

Also, the equation, Fy=(C13−C14)+(C23−C24)+(C33−C34)+(C43−C44), shown in FIG. 15, is based on the results of the second rows (rows of +Fy) of the tables of FIG. 14A and FIG. 14B and signifies that the Y-axis direction component Fy of a force that acts on force receiving member 100 can be detected based on the sum of the inclination degrees in relation to the Y-axis direction of the respective force transmitting members T1 to T4, which are detected by the first to fourth sensors. This is also based on the detection principle illustrated in FIG. 2B.

Furthermore, the equation, Fz=−(C15+C25+C35+C45), shown in FIG. 15 is based on the results of the third rows (rows of +Fz) of the tables of FIG. 14A and FIG. 14B and signifies that the Z-axis direction component Fz of a force that acts on force receiving member 100 can be detected based on the sum of the forces in relation to the Z-axis direction of the respective force transmitting members T1 to T4, which are detected by the first to fourth sensors. The minus sign at the front of the equation is due to the manner in which the Z-axis direction is set.

Meanwhile, the equation, Mx=−(((C11+C12+C13+C14+C15)+(C21+C22+C23+C24+C25))−((C31+C32+C33+C34+C35)+(C41+C42+C43+C44+C45))), shown in FIG. 15, is based on the results of the fourth rows (rows of +Mx) of the tables of FIG. 14A and FIG. 14B and signifies that the moment Mx about the X-axis of a force that acts on force receiving member 100 can be detected based on the difference between the sum of the forces in relation to the Z-axis direction, which are detected by the first and second sensors, and the sum of the forces in relation to the Z-axis direction, which are detected by the third and fourth sensors. This detection corresponds to the case where the point P3 in the top view of FIG. 9 moves perpendicularly upwards with respect to the paper surface (in the positive Z-axis direction) and the point P4 moves perpendicularly downwards with respect to the paper surface (in the negative Z-axis direction) and is based on the detection principle shown in FIG. 2C. The minus sign at the front of the equation is due to the manner in which the direction of the moment is set.

Also, the equation, My=((C11+C12+C13+C14+C15)+(C41+C42+C43+C44+C45))−((C21+C22+C23+C24+C25)+(C31+C32+C33+C34+C35)), shown in FIG. 15, is based on the results of the fifth rows (rows of +My) of the tables of FIG. 14A and FIG. 14B and signifies that the moment My about the Y-axis of a force that acts on force receiving member 100 can be detected based on the difference between the sum of the forces in relation to the Z-axis direction, which are detected by the first and fourth sensors, and the sum of the forces in relation to the Z-axis direction, which are detected by the second and third sensors. This detection corresponds to the case where the point P1 in the top view of FIG. 9 moves perpendicularly downwards with respect to the paper surface (in the negative Z-axis direction) and the point P2 moves perpendicularly upwards with respect to the paper surface (in the positive Z-axis direction) and is based on the detection principle shown in FIG. 2C.

Lastly, the equation, Mz=(((C31−C32)+(C41−C42))−((C11−C12)+(C21−C22)))+(((C13−C14)+(C43−C44))−((C23−C24)+(C33−C34))), shown in FIG. 15, is based on the results of the sixth rows (rows of +Mz) of the tables of FIG. 14A and FIG. 14B and signifies that the moment Mz about the Z-axis of a force that acts on the force receiving member 100 can be detected by determining, as a first difference, the difference between the sum of the inclination degrees in relation to the X-axis direction that are detected by the third and fourth sensors and the sum of the inclination degrees in relation to the X-axis direction that are detected by the first and second sensors, determining, as a second difference, the difference between the sum of the inclination degrees in relation to the Y-axis direction that are detected by the first and fourth sensors and the sum of the inclination degrees in relation to the Y-axis direction that are detected by the second and third sensors, and based on the sum of the abovementioned first difference and the abovementioned second difference.

The meaning of this equation for Mz can be made more readily understood by rewriting the equation as follows:

$$Mz = (C12 + C13) - (C11 + C14) + (C22 + C24) - (C21 + C23) + (C31 + C34) - (C32 + C33) + (C41 + C43) - (C42 + C44).$$

That is when a positive direction moment +Mz about the Z-axis acts, first force transmitting member T1, which is positioned above fixed electrode E15 in FIG. 13, becomes tilted in the upper left direction in the Figure as mentioned above, and (C12+C13)−(C11+C14) in the above equation is the term for detecting such an inclination of first force transmitting member T1. Likewise, second force transmitting member T2, which is positioned above fixed electrode E25, becomes tilted in the lower left direction in the Figure, and (C22+C24)−(C21+C23) in the above equation is the term for detecting such an inclination of second force transmitting member T2. Also, third force transmitting member T3, which is positioned above fixed electrode E35, becomes tilted in the lower right direction in the Figure, and (C31+C34)−(C32+C33) in the above equation is the term for detecting such an inclination of third force transmitting member T3. Furthermore, fourth force transmitting member T4, which is positioned above fixed electrode E45, becomes tilted in the upper right direction in the Figure, and (C41+C43)−(C42+C44) in the above equation is the term for detecting such an inclination of fourth force transmitting member T4. The above equation thus indicates the sum of the detection values of the inclination degrees in predetermined directions of the four force transmitting members T1 to T4 in a case where a moment Mz about the Z-axis acts.

Whereas in the third equation (equation of Fz) in FIG. 15, C15, which is the static capacitance value of just one capacitance element, is used as the force in relation to the Z-axis direction of first force transmitting member T1 that is detected by the first sensor, in the fourth equation (equation of Mx) in FIG. 15, the sum, (C11+C12+C13+C14+C15), of the static capacitance values of five capacitance elements is used as the same force in relation to the Z-axis direction of first force transmitting member T1 that is detected by the first sensor. This indicates that, as mentioned in Section 2, there are a plurality of variations in the methods for determining the force in relation to the Z-axis direction using the multi-axis force sensor of the type shown in FIG. 3. Thus for example, Fz=−((C11+C12+C13+C14+C15)+(C21+C22+C23+C24+C25)+(C31+C32+C33+C34+C35)+(C41+C42+C43+C44+C45)) may be used as the third equation in FIG. 15. Likewise, Mx=((C15+C25)−(C35+C45)) may be used as the fourth equation in FIG. 15, and My=((C15+C45)−(C25+C35)) may be used as the fifth equation in FIG. 15. Needless to say, various other variations may also be used.

Of the six equations shown in FIG. 15, the equations concerning the forces Fx, Fy, and Fz are general equations that hold even when the four force transmitting members T1 to T4 are positioned at arbitrary positions, and in a case of arranging a force detection device that is to be used for detecting just the forces Fx, Fy, and Fz, the positioning of the four force transmitting members T1 to T4 do not necessarily have to be made the same as the positioning shown in the top view of FIG. 9. However, of the six equations shown in FIG. 15, the equations concerning the moments Mx, My, and Mz are premised on the four force transmitting members T1 to T4 being positioned in the first to fourth quadrants in the XY two-dimensional coordinate system as shown in the top view of FIG. 9.

What should be noted here is that the technical idea of the art of this invention differs completely from the art wherein "four priorly known multi-axis force sensors are simply used as shown in FIG. 3 to increase the precision of detection." Generally in making measurements using some form of measuring device, a method of "installing a plurality of the same measuring devices and determining the average of the results of the respective measuring devices to improve the precision of measurement" is a commonly practiced method and has been used in various fields from long ago.

However, the basic concepts of this invention that are illustrated in FIG. 2A to FIG. 2C do not lie in the technical idea of "using a plurality sensors to improve the precision of detection" but lie in the idea of "detecting forces of predetermined coordinate axis directions and moments about predetermined coordinate axes in an accurately distinguishing manner." A more detailed, supplementary description concerning this point shall now be given.

First, consider the case of detecting a force +fx in the positive x-axis direction using priorly known multi-axis force sensors as shown in FIG. 6. Generally known literatures, which disclose such a multi-axis force sensor, provide the description that, based on the principles shown in FIG. 6, "the x-axis direction force component fx of a force that acts on force transmitting member 60 can be determined by determining the difference (C1−C2) of the static capacitance value C1 of capacitance element C1 (fixed electrode E1 and diaphragm 51) and the static capacitance value C2 of capacitance element C2 (fixed electrode E2 and diaphragm 51)." However, this description is not correct in the strict sense. This is because the difference (C1−C2) of the static capacitance values is actually not the acting force fx but is the moment My about the y-axis that results from the acting force fx.

This can be readily understood by considering the output value that is obtained when two forces +fx and +fx' are applied to different positions of force transmitting member 60 as shown in FIG. 6. With the illustrated example, even if +fx=+fx', the output value obtained as the difference (C1−C2) of capacitance values will be greater in the case where +fx is applied than in the case where +fx' is applied. This is because a greater moment is applied to this detection system when +fx is applied. That is, with the sensor shown in FIG. 6, an x-axis direction force fx or a y-axis direction force fy cannot be detected directly but can only be detected as a moment My about the y-axis or a moment Mx about the x-axis.

However, if the position of force transmitting member 60 at which a force fx is to be made to act is set to be a constantly fixed position, a moment My about the y-axis may be handled as an x-axis direction force fx without problem. Thus in the case of an object of detection with which there is no need to distinguish between force and moment, there will be no major problems in practical use even if the force sensor shown in FIG. 6 is used to detect an x-axis direction force fx or a y-axis direction force fy.

However, in applications to the motion control of robots and industrial machines, the demand for force detection devices that can detect forces and moments in a clearly distinguishing manner is not necessarily low. This invention's force detection device can indeed be said to be a device suited for such applications. For example, to use the force detection device shown in FIG. 10 as a joint part between an arm and wrist of a robot, supporting member 300 is mounted to the arm side and force receiving member 100 is mounted to the wrist side. By doing so, forces and moments applied to the wrist side of the arm can be detected.

When, in the case where this force detection device of FIG. 10 is used, a certain force acts on force receiving member 100, predetermined variations occur in the positions and orientations of the four force transmitting members T1 to T4. By detecting the modes of these variations as variations of the static capacitance values of the plurality of capacitance elements that form sensors S1 to S4 and performing analysis based on the equations shown in FIG. 15, the forces Fx, Fy, and Fz in the respective axial directions and the moments Mx, My, and Mz about the respective axis can be detected independent of each other. This is an important characteristic of this invention.

<<<Section 4. Detection Circuits of the First Embodiment>>>

As was described in Section 3, with the force detection device of the first embodiment, fixed electrodes E11 to E15, E21 to E25, E31 to E35, and E41 to E45 are formed as shown in FIG. 13 on the top surface of supporting member 300, diaphragms 215, 225, 235, and 245, formed of conductive material and positioned above the respective fixed electrodes, function as displaceable electrodes, and a total of twenty capacitance elements C11 to C15 (sensor S1), C21 to C25 (sensor S2), C31 to C35 (sensor S3), and C41 to C45 (sensor S4) are formed. Since diaphragms 215, 225, 235, and 245 are a part of intermediate member 200 and, electrically speaking, function as a single equipotential member, all of the displaceable electrodes maintain an equal potential as a single common electrode.

Here, since the bottom surfaces of the respective diaphragms 215, 225, 235, and 245 form displaceable surface that respectively undergo characteristic displacements in accordance to the displacements of the lower parts of the respective force transmitting members T1 to T4, a force acting on force receiving member 100 can be detected according to the six components independently based on the principles illustrated by the respective equations of FIG. 15. Detection circuits that are necessary for performing such detection shall now be described.

As a method of determining the respective force components based on the respective computational equations shown in FIG. 15, a method, wherein the static capacitance value of each capacitance element is measured, computations are performed on such measured values using an analog or digital computing device, etc., and the results of computations are output, may be employed. However, the equations shown in FIG. 15 are basically additions and subtractions. Thus with the present invention, instead of performing additions of static capacitance values by a computing device, an approach is taken where a plurality of capacitance elements, which are to be the subject of addition of the capacitance values, are connected in parallel to each other to obtain results equivalent to addition computations. That is, a detection circuit is formed wherein capacitance elements C11 to C45, which form sensors S1 to S4, are divided into a plurality of groups, wiring are provided to connect the plurality of capacitance elements belonging to the same group in parallel to each other, and a force or moment that acts on force receiving member 100 is detected based on the difference between the overall static capacitance value of the set of capacitance elements belonging to one group and the overall static capacitance value of the set of capacitance elements belonging to another group.

Figure 16:
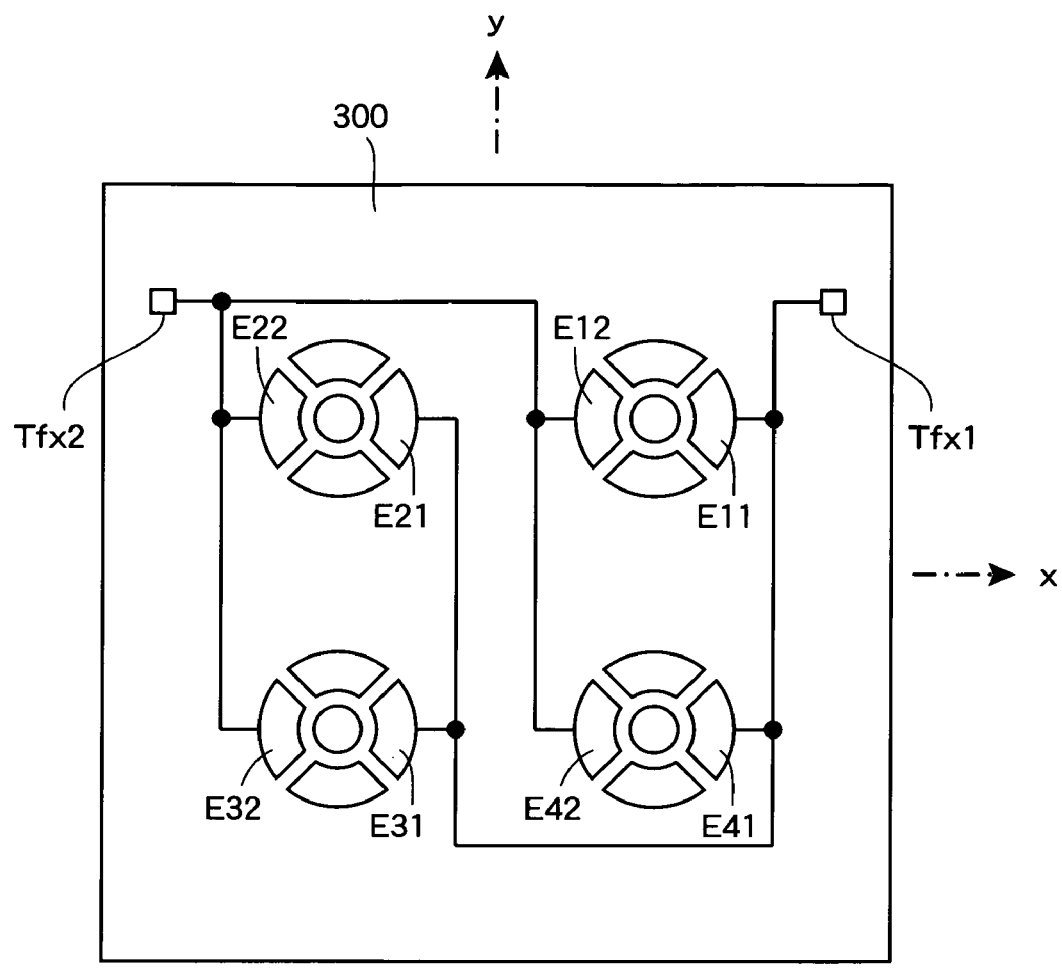
FIG. 16 is a top view of supporting member 300, showing the wiring for detecting a force Fx in an X-axis direction by the force detection device of the first embodiment of this invention.

First, detection circuits for detecting forces Fx, Fy, and Fz of the respective coordinate axis directions shall be described. For example, a detection circuit for detecting a force Fx based on the first equation shown in FIG. 15 can be arranged by providing wiring as illustrated in FIG. 16 for eight of the twenty fixed electrodes formed on supporting member 300. That is, the four fixed electrodes E11, E21, E31, and E41 are connected to a terminal Tfx1 as electrodes belonging to a first group and the four fixed electrodes E12, E22, E32, and E42 are connected to a terminal Tfx2 as electrodes belonging to a second group. Since the value of the static capacitance that arises between terminal Tfx1 and intermediate member 200 will be the sum of the static capacitance values of the four capacitance elements C11, C21, C31, and C41 belonging to the first group, and the value of the static capacitance that arises between terminal Tfx2 and intermediate member 200 will be the sum of the static capacitance values of the four capacitance elements C12, C22, C32, and C42 belonging to the second group, a force Fx can be detected by preparing a circuit that determines the difference between the two sums. The equation shown in the lower part of FIG. 16 (equivalent to the equation for a force Fx shown in FIG. 15) indicates that the detection of a force Fx is carried out based on the difference between the electrical signal taken out from terminal Tfx1 and the electrical signal taken out from terminal Tfx2.

Though a description of a specific circuit shall be omitted here, various circuits are known as circuits wherein wiring is provided to each of a pair of electrodes that form a capacitance element and the static capacitance value of each such capacitance element is detected upon conversion into a voltage value. By connecting such a circuit to terminals Tfx1 and Tfx2 and intermediate member 200 to determine the voltage value that indicates the sum of the static capacitance values of the four capacitance elements C11, C21, C31, and C41 belonging to the first group and the voltage value that indicates the sum of the static capacitance values of the four capacitance elements C12, C22, C32, and C42 belonging to the second group and using a circuit that outputs a voltage corresponding to the difference between the above voltages, a force Fx can be output as a voltage value.

The wiring shown in FIG. 16 can thus be regarded as wiring whereby X-axis inclination detection capacitance elements C11, C21, C31, and C41, positioned at positions at which the electrode intervals narrow when the respective force transmitting members T1 to T4 become inclined in the positive X-axis direction, are grouped as the first group, X-axis inclination detection capacitance elements C12, C22, C32, and C42, positioned at positions at which the electrode intervals oppositely widen under the same circumstances, are grouped as the second group, and the plurality of capacitance elements belonging to the same group are connected in parallel to each other. And by providing such wiring, an X-axis direction force Fx that acts on the force receiving member can be detected from the difference between the overall static capacitance value of the set of X-axis inclination detection capacitance elements belonging to the first group and the overall static capacitance value of the set of X-axis inclination detection capacitance elements belonging to the second group.

Figure 17:
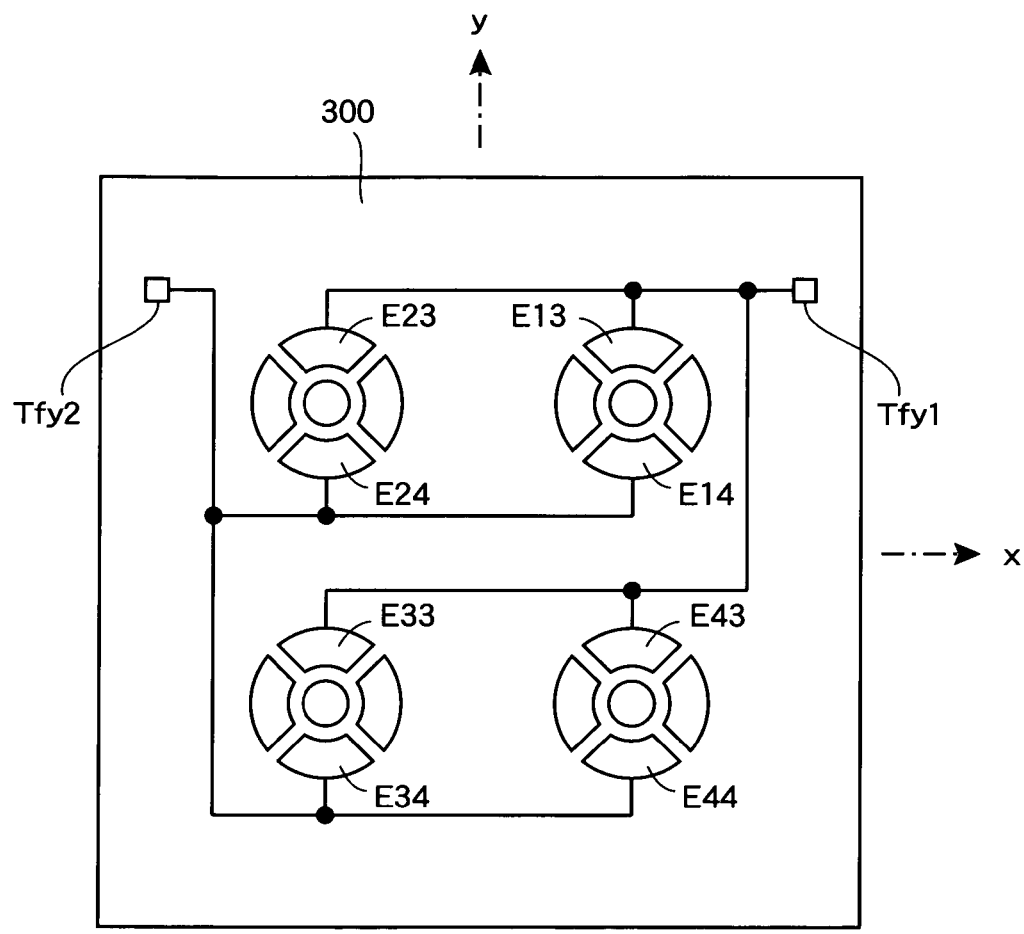
FIG. 17 is a top view of supporting member 300, showing the wiring for detecting a force Fy in a Y-axis direction by the force detection device of the first embodiment of this invention.

Likewise, a detection circuit for detecting a force Fy based on the second equation shown in FIG. 15 can be arranged by providing wiring as illustrated in FIG. 17 for eight of the twenty fixed electrodes formed on supporting member 300. That is, the four fixed electrodes E13, E23, E33, and E43 are connected to a terminal Tfy1 as electrodes belonging to a third group and the four fixed electrodes E14, E24, E34, and E44 are connected to a terminal Tfy2 as electrodes belonging to a fourth group. Since the value of the static capacitance that arises between terminal Tfy1 and intermediate member 200 will be the sum of the static capacitance values of the four capacitance elements C13, C23, C33, and C43 belonging to the third group, and the value of the static capacitance that arises between terminal Tfy2 and intermediate member 200 will be the sum of the static capacitance values of the four capacitance elements C14, C24, C34, and C44 belonging to the fourth group, a force Fy can be detected by preparing a circuit that determines the difference between the two sums. The equation shown in the lower part of FIG. 17 (equivalent to the equation for a force Fy shown in FIG. 15) indicates that the detection of a force Fy is carried out based on the difference between the electrical signal taken out from terminal Tfy1 and the electrical signal taken out from terminal Tfy2.

The wiring shown in FIG. 17 can thus be regarded as wiring whereby Y-axis inclination detection capacitance elements C13, C23, C33, and C43, positioned at positions at which the electrode intervals narrow when the respective force transmitting members T1 to T4 become inclined in the positive Y-axis direction, are grouped as the third group, Y-axis inclination detection capacitance elements C14, C24, C34, and C44, positioned at positions at which the electrode intervals oppositely widen under the same circumstances, are grouped as the fourth group, and the plurality of capacitance elements belonging to the same group are connected in parallel to each other. And by providing such wiring, a Y-axis direction force Fy that acts on the force receiving member can be detected from the difference between the overall static capacitance value of the set of Y-axis inclination detection capacitance elements belonging to the third group and the overall static capacitance value of the set of Y-axis inclination detection capacitance elements belonging to the fourth group.

Figure 18:
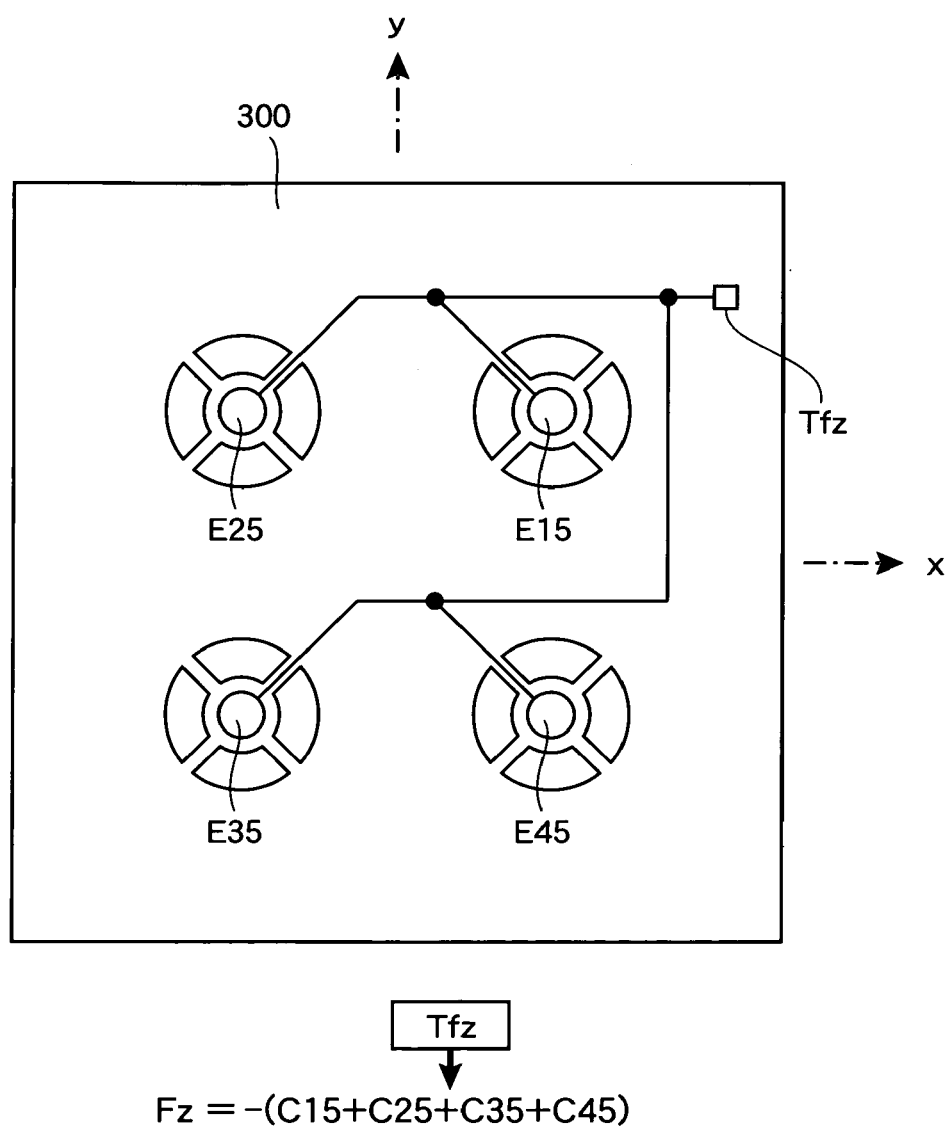
FIG. 18 is a top view of supporting member 300, showing the wiring for detecting a force Fz in a Z-axis direction by the force detection device of the first embodiment of this invention.

Also, a detection circuit for detecting a force Fz based on the third equation shown in FIG. 15 can be arranged by providing wiring as illustrated in FIG. 18 for four of the twenty fixed electrodes formed on supporting member 300. That is, the four fixed electrodes E15, E25, E35, and E45 are connected to a terminal Tfz as electrodes belonging to a fifth group. Since the value of the static capacitance that arises between terminal Tfz and intermediate member 200 will be the sum of the static capacitance values of the four capacitance elements C15, C25, C35, and C45 belonging to the fifth group, a force Fz can be detected by based on the value of this sum. The equation shown in the lower part of FIG. 18 (equivalent to the equation for a force Fz shown in FIG. 15) indicates that the detection of a force Fz is carried out based on the electrical signal taken out from terminal Tfz.

The wiring shown in FIG. 18 can thus be regarded as wiring whereby Z-axis displacement detection capacitance elements C15, C25, C35, and C45, positioned at positions of undergoing changes such that the electrode intervals either narrow or widen as a whole when the force transmitting members become displaced in the Z-axis direction and undergoing changes such that, with each capacitance element, a part of the electrode interval narrows while another part widens when the corresponding force transmitting member becomes inclined, are grouped as the fifth group and the plurality of capacitance elements belonging to the same group are connected in parallel to each other. And by providing such wiring, a Z-axis direction force Fz that acts on the force receiving member can be detected from the overall static capacitance value of the set of Z-axis displacement detection capacitance elements belonging to the fifth group.

As mentioned already, the capacitance elements that can be used as the Z-axis displacement detection capacitance elements are not limited to capacitance elements C15, C25, C35, and C45. For example, the condition for a Z-axis displacement detection capacitance element that can be used in sensor S1 is that it is positioned at a position such that when force transmitting member T1 becomes displaced in the Z-axis direction, the capacitance element undergoes a change wherein the electrode interval either narrows or widens as a whole and when force transmitting member T1 becomes inclined, the capacitance element undergoes a change wherein a part of the electrode interval narrows while another part widens. Needless to say, capacitance element C15 meets this condition. However, if, for example, the collection of capacitance elements C11 to C14 is considered as a single capacitance element, such a collection also meets the above condition and can thus be used as a Z-axis displacement detection capacitance element. Needless to say, a capacitance element formed by the collection of capacitance elements C11 to C15 also satisfies the above condition and can thus be used as a Z-axis displacement detection capacitance element.

Thus in principle, if use is to be made only as a one-dimensional force detection device that can detect only a force Fz, all twenty fixed electrodes E11 to E45 may be connected as the same single group to terminal Tfz to thereby connect all twenty capacitance elements C11 to C45 in parallel. However, in the case of use as a multi-dimensional force detection device, since specific forces must be allocated as objects of detection to individual capacitance elements, it is preferable to use capacitance elements C15, C25, C35, and C45, selected by selecting one capacitance element from each of sensors S1 to S4, as Z-axis displacement detection capacitance elements and allocate these to the detection of a force Fz as in the example shown in FIG. 18.

Figure 19:
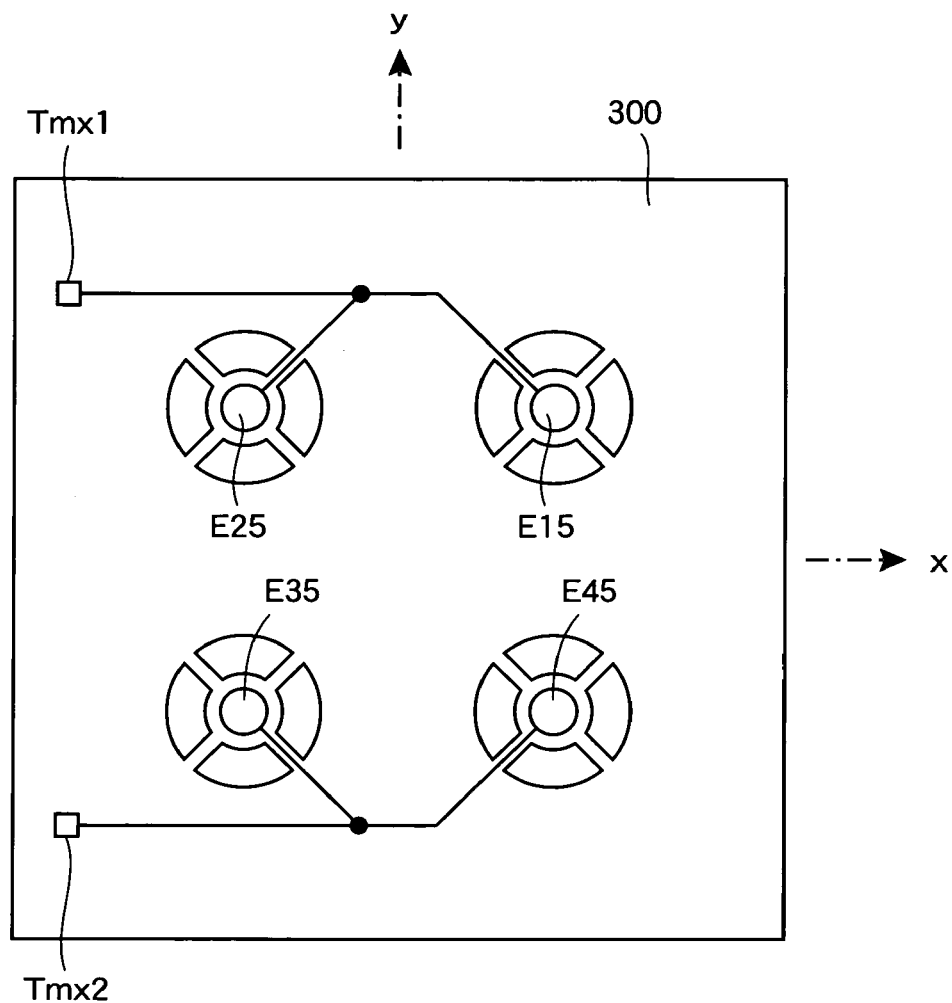
FIG. 19 is a top view of supporting member 300, showing the wiring for detecting a moment Mx about the X-axis by the force detection device of the first embodiment of this invention.

Detection circuits for forces Fx, Fy, and Fz have been described above, and detection circuits for detecting moments Mx, My, and Mz shall now be considered. First, a detection circuit for detecting a moment Mx based on the fourth equation shown in FIG. 15 can be arranged by providing wiring as illustrated in FIG. 19 for four of the twenty fixed electrodes formed on supporting member 300. That is, the two fixed electrodes E15 and E25 are connected to a terminal Tmx1 as electrodes belonging to a first group and the two fixed electrodes E35 and E45 are connected to a terminal Tmx2 as electrodes belonging to a second group. Since the value of the static capacitance that arises between terminal Tmx1 and intermediate member 200 will be the sum of the static capacitance values of the two capacitance elements C15 and C25 belonging to the first group, and the value of the static capacitance that arises between terminal Tmx2 and intermediate member 200 will be the sum of the static capacitance values of the two capacitance elements C35 and C45 belonging to the second group, a moment Mx can be detected by preparing a circuit that determines the difference between the two sums. The equation shown in the lower part of FIG. 19 indicates that the detection of a moment Mx is carried out based on the difference between the electrical signal taken out from terminal Tmx1 and the electrical signal taken out from terminal Tmx2.

The equation shown in the lower part of FIG. 19 differs from the equation for Mx shown in FIG. 15. This is because whereas with the equation for Mx shown in FIG. 15, all five capacitance elements in each of sensors S1 to S4 are used as Z-axis displacement detection capacitance elements, with the equation shown in the lower part of FIG. 19, only the single capacitance element positioned at the center is used as a Z-axis displacement capacitance element. If the force detection device is to be used just as a one-dimensional force detection device that can detect only a moment Mx, the ten fixed electrodes E11 to E25 may be connected to terminal Tmx1 as the first group and the ten fixed electrodes E31 to E45 may be connected to terminal Tmx2 as the second group to thereby connect in parallel the ten capacitance elements C11 to C25, belonging to the first group, and connect in parallel the ten capacitance elements C31 to C45, belonging to the second group, based on the equation for Mx shown in FIG. 15. However, in the case of use as a multi-dimensional force detection device, since specific forces must be allocated as objects of detection to individual capacitance elements, it is preferable to use capacitance elements C15, C25, C35, and C45, selected by selecting one capacitance element from each of sensors S1 to S4, as Z-axis displacement detection capacitance elements and allocate these to the detection of a moment Mx as in the example shown in FIG. 19.

The wiring shown in FIG. 19 can thus be regarded as wiring whereby Z-axis displacement detection capacitance elements C15 and C25, positioned at positions of undergoing changes such that the electrode intervals either narrow or widen as a whole when force transmitting members T1 and T2 become displaced in the Z-axis direction and undergoing changes such that, with each capacitance element, a part of the electrode interval narrows while another part widens when the corresponding force transmitting member T1 or T2 becomes inclined, are grouped as the first group, Z-axis displacement detection capacitance elements C35 and C45, positioned at positions of undergoing changes such that the electrode intervals either narrow or widen as a whole when force transmitting members T3 and T4 become displaced in the Z-axis direction and undergoing changes such that, with each capacitance element, a part of the electrode interval narrows while another part widens when the corresponding force transmitting members T3 or T4 becomes inclined, are grouped as the second group, and the plurality of capacitance elements belonging to the same group are connected in parallel to each other. And by providing such wiring, a moment Mx about the X-axis that acts on the force receiving member can be detected from the difference between the overall static capacitance value of the set of Z-axis displacement detection capacitance elements belonging to the first group and the overall static capacitance value of the set of Z-axis displacement detection capacitance elements belonging to the second group.

Figure 20:
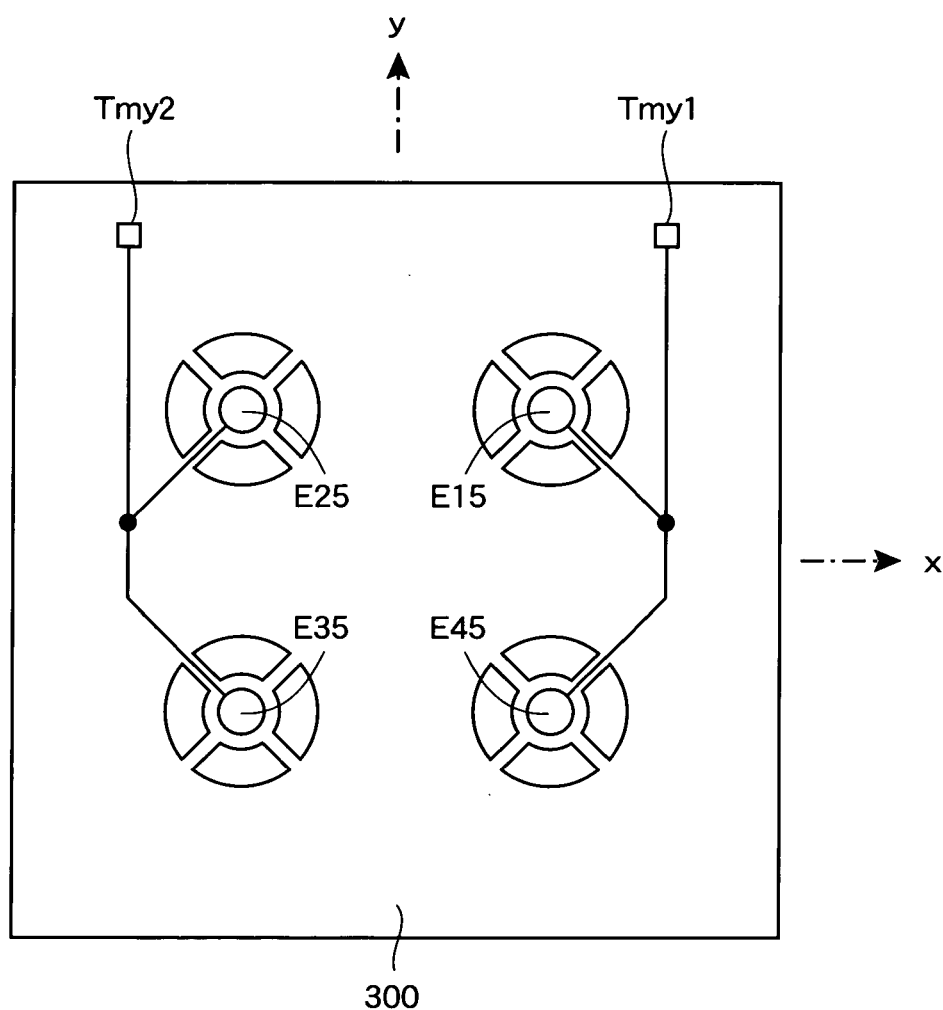
FIG. 20 is a top view of supporting member 300, showing the wiring for detecting a moment My about the Y-axis by the force detection device of the first embodiment of this invention.

Meanwhile, a detection circuit for detecting a moment My based on the fifth equation shown in FIG. 15 can be arranged by providing wiring as illustrated in FIG. 20 for four of the twenty fixed electrodes formed on supporting member 300. That is, the two fixed electrodes E15 and E45 are connected to a terminal Tmy1 as electrodes belonging to a third group and the two fixed electrodes E25 and E35 are connected to a terminal Tmy2 as electrodes belonging to a fourth group. Since the value of the static capacitance that arises between terminal Tmy1 and intermediate member 200 will be the sum of the static capacitance values of the two capacitance elements C15 and C45 belonging to the third group, and the value of the static capacitance that arises between terminal Tmy2 and intermediate member 200 will be the sum of the static capacitance values of the two capacitance elements C25 and C35 belonging to the fourth group, a moment My can be detected by preparing a circuit that determines the difference between the two sums. The equation shown in the lower part of FIG. 20 indicates that the detection of a moment My is carried out based on the difference between the electrical signal taken out from terminal Tmy1 and the electrical signal taken out from terminal Tmy2.

The equation shown in the lower part of FIG. 20 differs from the equation for My shown in FIG. 15. This is because, as with the reason why the equations for Mx differ, whereas with the equation for My shown in FIG. 15, all five capacitance elements in each of sensors S1 to S4 are used as Z-axis displacement detection capacitance elements, with the equation shown in the lower part of FIG. 20, only the single capacitance element positioned at the center is used as a Z-axis displacement capacitance element in consideration of use as a multi-dimensional force detection device.

The wiring shown in FIG. 20 can thus be regarded as wiring whereby Z-axis displacement detection capacitance elements C15 and C45, positioned at positions of undergoing changes such that the electrode intervals either narrow or widen as a whole when force transmitting members T1 and T4 become displaced in the Z-axis direction and undergoing changes such that, with each capacitance element, a part of the electrode interval narrows while another part widens when the corresponding force transmitting member among T1 to T4 becomes inclined, are grouped as the third group, Z-axis displacement detection capacitance elements C25 and C35, positioned at positions of undergoing changes such that the electrode intervals either narrow or widen as a whole when force transmitting members T2 and T3 become displaced in the Z-axis direction and undergoing changes such that, with each capacitance element, a part of the electrode interval narrows while another part widens when the corresponding force transmitting member T2 or T3 become inclined, are grouped as the fourth group, and the plurality of capacitance elements belonging to the same group are connected in parallel to each other. And by providing such wiring, a moment My about the Y-axis that acts on the force receiving member can be detected from the difference between the overall static capacitance value of the set of Z-axis displacement detection capacitance elements belonging to the third group and the overall static capacitance value of the set of Z-axis displacement detection capacitance elements belonging to the fourth group.

Figure 21:
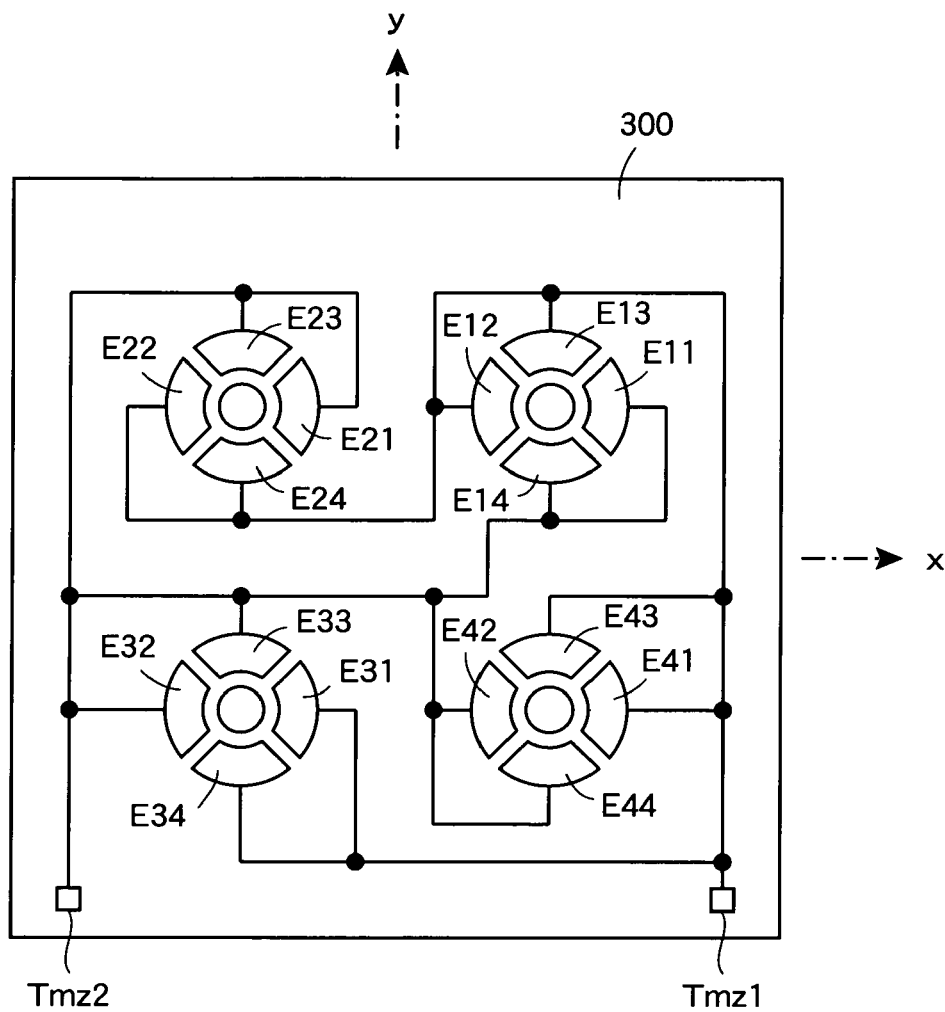
FIG. 21 is a top view of supporting member 300, showing the wiring for detecting a moment Mz about the Z-axis by the force detection device of the first embodiment of this invention.

A detection circuit for detecting a moment Mz based on the sixth equation shown in FIG. 15 can be arranged by providing wiring as illustrated in FIG. 21 for sixteen of the twenty fixed electrodes formed on supporting member 300. That is, the eight fixed electrodes E12, E13, E22, E24, E31, E34, E41, and E43 are connected to a terminal Tmz1 as electrodes belonging to a first group and the eight fixed electrodes E11, E14, E21, E23, E32, E33, E42 and E44 are connected to a terminal Tmz2 as electrodes belonging to a second group. Since the value of the static capacitance that arises between terminal Tmz1 and intermediate member 200 will be the sum of the static capacitance values of the eight capacitance elements C12, C13, C22, C24, C31, C34, C41, and C43 belonging to the first group, and the value of the static capacitance that arises between terminal Tmz2 and intermediate member 200 will be the sum of the static capacitance values of the eight capacitance elements C11, C14, C21, C23, C32, C33, C42, and C44 belonging to the second group, a moment Mz can be detected by preparing a circuit that determines the difference between the two sums. The equation shown in the lower part of FIG. 21 (equivalent to the equation for moment Mz shown in FIG. 15) indicates that the detection of a moment Mz is carried out based on the difference between the electrical signal taken out from terminal Tmz1 and the electrical signal taken out from terminal Tmz2.

Thus with the wiring shown in FIG. 20, the capacitance elements belonging to the first group are: "X-axis inclination detection capacitance element C12, which is positioned at a position at which the electrode interval widens when force transmitting member T1 becomes inclined in the positive X-axis direction," "Y-axis inclination detection capacitance element C13, which is positioned at a position at which the electrode interval narrows when force transmitting member T1 becomes inclined in the positive Y-axis direction," "X-axis inclination detection capacitance element C22, which is positioned at a position at which the electrode interval widens when force transmitting member T2 becomes inclined in the positive X-axis direction," "Y-axis inclination detection capacitance element C24, which is positioned at a position at which the electrode interval widens when force transmitting member T2 becomes inclined in the positive Y-axis direction," "X-axis inclination detection capacitance element C31, which is positioned at a position at which the electrode interval narrows when force transmitting member T3 becomes inclined in the positive X-axis direction," "Y-axis inclination detection capacitance element C34, which is positioned at a position at which the electrode interval widens when force transmitting member T3 becomes inclined in the positive Y-axis direction," "X-axis inclination detection capacitance element C41, which is positioned at a position at which the electrode interval narrows when force transmitting member T4 becomes inclined in the positive X-axis direction," and "Y-axis inclination detection capacitance element C43, which is positioned at a position at which the electrode interval narrows when force transmitting member T4 becomes inclined in the positive Y-axis direction." Also, the capacitance elements belonging to the second group are: "X-axis inclination detection capacitance element C11, which is positioned at a position at which the electrode interval narrows when force transmitting member T1 becomes inclined in the positive X-axis direction," "Y-axis inclination detection capacitance element C14, which is positioned at a position at which the electrode interval widens when force transmitting member T1 becomes inclined in the positive Y-axis direction," "X-axis inclination detection capacitance element C21, which is positioned at a position at which the electrode interval narrows when force transmitting member T2 becomes inclined in the positive X-axis direction," "Y-axis inclination detection capacitance element C23, which is positioned at a position at which the electrode interval narrows when force transmitting member T2 becomes inclined in the positive Y-axis direction," "X-axis inclination detection capacitance element C32, which is positioned at a position at which the electrode interval widens when force transmitting member T3 becomes inclined in the positive X-axis direction," "Y-axis inclination detection capacitance element C33, which is positioned at a position at which the electrode interval narrows when force transmitting member T3 becomes inclined in the positive Y-axis direction," "X-axis inclination detection capacitance element C42, which is positioned at a position at which the electrode interval widens when force transmitting member T4 becomes inclined in the positive X-axis direction," and "Y-axis inclination detection capacitance element C44, which is positioned at a position at which the electrode interval widens when force transmitting member T4 becomes inclined in the positive Y-axis direction."

The wiring necessary for detecting all of the six types of force components, Fx, Fy, Fz, Mx, My, and Mz were described above with reference to FIG. 16 to FIG. 21. In order to realize a force detection device having functions of respectively detecting a plurality of force components, the necessary wiring may be provided so as to overlap suitably. For example, to realize a force detection device having the functions of detecting the three force components of Fx, Fy, and Fz, the wiring shown in FIG. 16, the wiring shown in FIG. 17, and the wiring shown in FIG. 18 may be provided so as to overlap. By doing so, the total of twenty fixed electrodes E11 to E45 are classified and wired into a total of five groups so that a force Fx can be detected using terminals Tfx1 and Tfx2, a force Fy can be detected using terminals Tfy1 and Tfy2, and a force Fz can be detected using terminal Tfz. Or, to realize a force detection device having the functions of detecting the three force components of Fx, Fy, and My, the wiring shown in FIG. 16, the wiring shown in FIG. 17, and the wiring shown in FIG. 20 may be provided so as to overlap, or to realize a force detection device having the functions of detecting the two force components of Fz and Mz, the wiring shown in FIG. 18 and the wiring shown in FIG. 21 may be provided so as to overlap.

However, there exist combinations that cannot be realized with just the total of twenty fixed electrodes E11 to E45 positioned as shown in FIG. 13. For example, in order to realize a force detection device having the functions of detecting the two force components of Fz and Mx, the wiring shown in FIG. 18 and the wiring shown in FIG. 20 must be provided so as to overlap. However, since both of these wiring are wiring using the fixed electrodes E15, E25, E35, and E45, they cannot be provided at the same time. For example, if the wiring of FIG. 18 is formed, fixed electrodes E15, E25, E35, and E45 will be electrodes of equal potential that are all connected to terminal Tfz, and there will be no meaning to providing wiring by which these electrodes are divided into two groups as shown in FIG. 20. Likewise, though in order to realize a force detection device having the functions of detecting the three force components of Fx, Fy, and Mz, the wiring shown in FIG. 16, the wiring shown in FIG. 17, and the wiring shown in FIG. 21 must be provided so as to overlap, this is also impossible to realize. That is, though the wiring shown in FIG. 16 and the wiring shown in FIG. 17 can be provided at the same time since these wiring are provided across different sets of fixed electrodes, the wiring shown in FIG. 21 cannot be overlapped with these wiring.

When such a problem in terms of wiring arises, some of the total of twenty fixed electrodes E11 to E45 shown in FIG. 13 may be split into a plurality of physically independent electrodes. For example, fixed electrode E15 shown in FIG. 13 is used in three types of wiring, that is, the wiring shown in FIG. 18 for detection of a force Fz, the wiring shown in FIG. 19 for detection of a moment Mx, and the wiring shown in FIG. 20 for detection of a moment My. Thus in order to realize a force detection device having the function of detecting these three force components Fz, Mx, and My, fixed electrode E15 is split into three physically independent electrodes E15(Fz), E15(Mx), and E15(My). Here electrode E15(Fz) is an electrode used for Fz detection, electrode E15(Mx) is an electrode used for Mx detection, and electrode E15(My) is an electrode used for My detection.

Since the twenty fixed electrodes shown in FIG. 13 do respectively serve the roles of forming capacitance elements for detecting displacements and inclinations of specific force transmitting members, the shapes and positions thereof need to satisfy predetermined conditions. Thus even when these fixed electrodes are split into a plurality of physically independent electrodes, considerations must be so that each split electrode will satisfy these conditions.

Firstly, capacitance elements C15, C25, C35, and C45, formed by the fixed electrodes E15, E25, E35, and E45 shown in FIG. 13, are all Z-axis displacement detection capacitance elements and therefore must be positioned at positions such that when the force transmitting members become displaced in the Z-axis direction, the capacitance elements undergo changes wherein the electrode intervals either narrow or widen as a whole and when the force transmitting members become inclined, each capacitance element undergoes a change wherein a part of the electrode interval narrows while another part widens. In other words, each of these capacitance elements must have the property of changing in static capacitance value when the force transmitting members become displaced in the Z-axis direction but not changing in static capacitance value when the force transmitting members simply become inclined. An ideal electrode for forming a Z-axis displacement detection capacitance element with such a property is a circular or annular electrode that is centered about the longitudinal direction axis of a force transmitting member. Though with the example shown in FIG. 13, all of the fixed electrodes E15, E25, E35, and E45 are circular electrodes, these may instead be annular electrodes that are centered about the longitudinal direction axes of the force transmitting members. Thus in order to form a plurality of Z-axis displacement detection capacitance elements for the same force transmitting member, it is preferable to provide a plurality of electrodes of circular or annular forms that are positioned concentrically on the same plane.

Meanwhile, capacitance elements C11, C21, C31, and C41, formed by fixed electrodes E11, E21, E31, and E41 shown in FIG. 13, are all X-axis inclination detection capacitance elements that are positioned at positions at which the electrode intervals narrow when the force transmitting members become inclined in the positive X-axis direction, and capacitance elements C12, C22, C32, and C42, formed by fixed electrodes E12, E22, E32, and E42 are all X-axis inclination detection capacitance elements that are positioned at positions at which the electrode intervals widen when the force transmitting members become inclined in the positive X-axis direction. Needless to say, when the force transmitting members become inclined in the negative X-axis direction, the widening/narrowing of the electrode intervals are reversed. As electrodes for forming a pair of such X-axis inclination detection capacitance elements with such a property, it is preferable to use a pair of electrodes, which, when an xy two-dimensional coordinate system, having an origin on the longitudinal direction axis of a force transmitting member, an x-axis parallel to the X-axis, and a y-axis parallel to the Y-axis (a local xy coordinate system, having an origin at the center position of electrodes E15, E25, E35, or E45), is defined, are respectively positioned at a positive part and a negative part of the x-axis.

In particular, in order to avoid interference of other axial force components that are not objects of detection, it is preferable to use electrodes of the same size and same shape that are positioned at positions that are equal in distance from the origin and to also use electrodes of shapes that are line symmetrical with respect to the x-axis or the y-axis. With the example shown in FIG. 13, the eight fixed electrodes E11, E21, E31, E41, E12, E22, E32, and E42 that form the X-axis inclination detection capacitance elements are all fan-shaped electrodes of the same size and same shape and have a shape that is line symmetrical with respect to the x-axis or y-axis of the corresponding local coordinate system.

Also, capacitance elements C13, C23, C33, and C43, formed by fixed electrodes E13, E23, E33, and E43 shown in FIG. 13, are all Y-axis inclination detection capacitance elements that are positioned at positions at which the electrode intervals narrow when the force transmitting members become inclined in the positive Y-axis direction, and capacitance elements C14, C24, C34, and C44, formed by fixed electrodes E14, E24, E34, and E44 are all Y-axis inclination detection capacitance elements that are positioned at positions at which the electrode intervals widen when the force transmitting members become inclined in the positive Y-axis direction. Needless to say, when the force transmitting members become inclined in the negative Y-axis direction, the widening/narrowing of the electrode intervals are reversed. As electrodes for forming a pair of such Y-axis inclination detection capacitance elements with such a property, it is preferable to use a pair of electrodes, which, when an xy two-dimensional coordinate system, having an origin on the longitudinal direction axis of a force transmitting member, an x-axis parallel to the X-axis, and a y-axis parallel to the Y-axis (a local xy coordinate system, having an origin at the center position of electrodes E15, E25, E35, or E45), is defined, are respectively positioned at a positive part and a negative part of the y-axis.

Here also, in order to avoid interference of other axial force components that are not objects of detection, it is preferable to use electrodes of the same size and same shape that are positioned at positions that are equal in distance from the origin and to also use electrodes of shapes that are line symmetrical with respect to the x-axis or the y-axis. With the example shown in FIG. 13, the eight fixed electrodes E13, E23, E33, E43, E14, E24, E34, and E44 that form the Y-axis inclination detection capacitance elements are all fan-shaped electrodes of the same size and same shape and have a shape that is line symmetrical with respect to the x-axis or y-axis of the corresponding local coordinate system.

Figure 22:
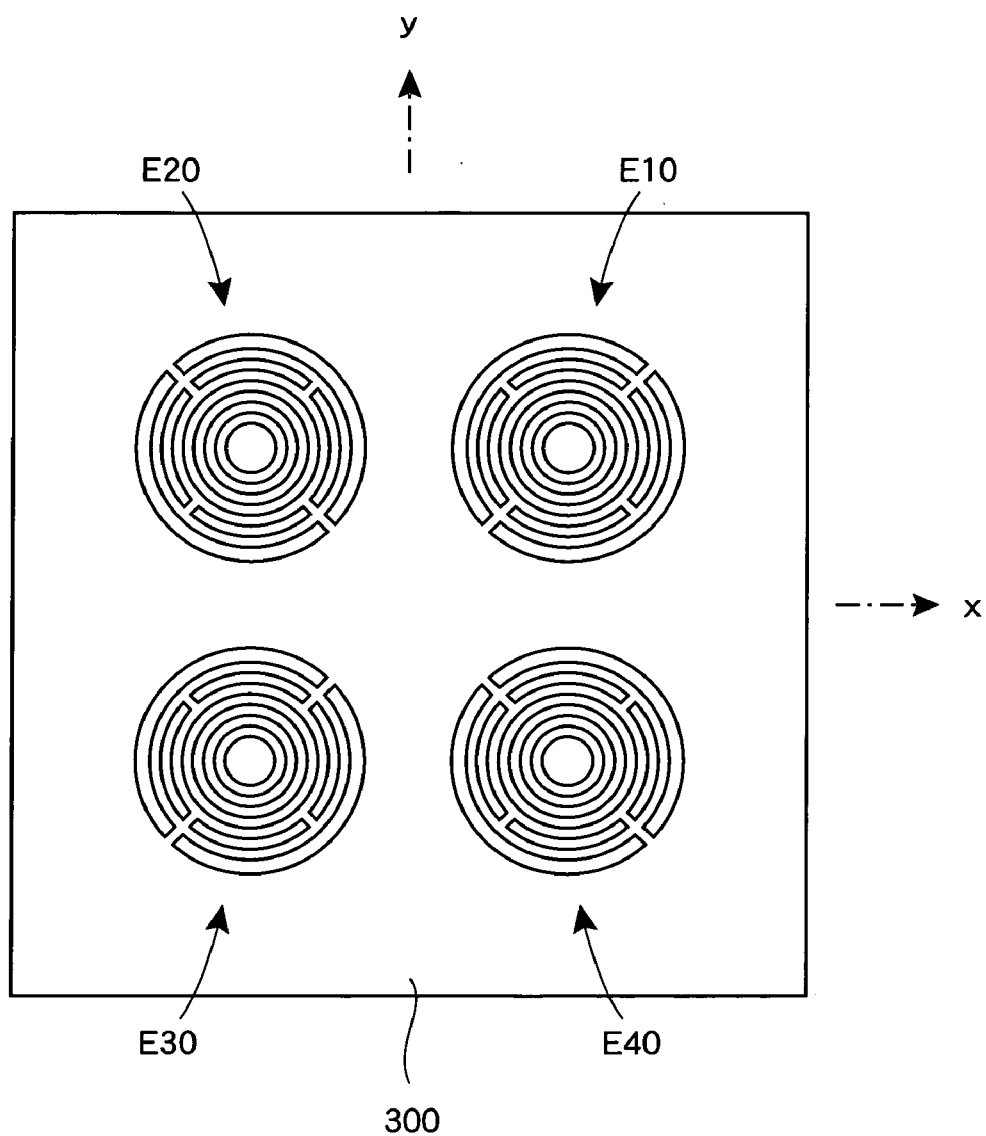
FIG. 22 is a top view of supporting member 300, showing an electrode configuration suited for detecting all six force components by the force detection device of the first embodiment of this invention.

The top view of FIG. 22 (top view of supporting member 300) shows an example of fixed electrodes to be formed on a force detection device that can detect all six components of Fx, Fy, Fz, Mx, My, and Mz in consideration of the abovementioned points. A fixed electrode set E10 is formed of nine fixed electrodes that form sensor S1, a fixed electrode set E20 is formed of nine fixed electrodes that form sensor S2, a fixed electrode set E30 is formed of nine fixed electrodes that form sensor S3, and a fixed electrode set E40 is formed of nine fixed electrodes that form sensor S4. Whereas each of the fixed electrode sets of the respective sensors in the example shown in FIG. 13 comprises five fixed electrodes, each of the fixed electrode sets of the respective sensors in the example shown in FIG. 22 comprises nine fixed electrodes, and this is due to the splitting of specific fixed electrodes according to use in order to detect all six force components independent of each other.

Enlarged views of the fixed electrode sets E10, E20, E30, and E40, shown in FIG. 22, are shown in FIG. 23, FIG. 24, FIG. 25, and FIG. 26, respectively. In each of these enlarged views, the gray hatching are provided to illustrate the electrode shapes clearly and do not indicate cross sections. As illustrated in these Figures, fixed electrodes E15, E25, E35, and E45, which respectively form Z-axis displacement detection capacitance elements, are formed at the central parts of the respective four fixed electrode sets E10, E20, E30, and E40. However, each of these fixed electrodes is split into three independent split electrodes for Fz detection, Mx detection, and My detection. For example, in the case of the example shown in FIG. 23, fixed electrode E15 is comprised of the three electrodes of an annular Fz detection electrode E15(Fz), an annular Mx detection electrode E15(Mx), which is disposed at the inner side of annular Fz detection electrode E15(Fz), and a circular My detection electrode E15(My), which is disposed further at the inner side of annular Mx detection electrode E15(Mx).

Here, the wiring shown in FIG. 18 for detection of a force Fz is provided to annular Fz detection electrodes E15(Fz), E25(Fz), E35(Fz), and E45(Fz) shown in FIG. 23 to FIG. 26. Also, the wiring shown in FIG. 19 for detection of a moment Mx is provided to annular Mx detection electrodes E15(Mx), E25(Mx), E35(Mx), and E45(Mx) shown in FIG. 23 to FIG. 26, and the wiring shown in FIG. 20 for detection of a moment My is provided to circular My detection electrodes E15(My), E25(My), E35(My), and E45(My) shown in FIG. 23 to FIG. 26.

Needless to say, which of the detection elements are to be positioned at the inner side, intermediate position, and outer side is arbitrary and the illustrated example is simply a single example. The employing of a form, in which the innermost electrode is made circular in shape and the annular electrodes at the outer side of the innermost electrode are positioned concentrically, enables the forming of an optimal and efficient electrode configuration for arranging Z-axis displacement detection capacitance elements as described above.

Meanwhile, electrodes E11, E12, E21, E22, E31, E32, E41, and E42, shown in FIG. 23 to FIG. 26, are all fixed electrodes that form X-axis inclination detection capacitance elements and are used only in the wiring shown in FIG. 16 for detecting a force Fx. Likewise, electrodes E13, E14, E23, E24, E33, E34, E43, and E44, shown in FIG. 23 to FIG. 26, are all fixed electrodes that form Y-axis inclination detection capacitance elements and are used only in the wiring shown in FIG. 17 for detecting a force Fy.

Lastly, the eight electrodes E11/14, E12/13, E21/23, E22/24, E31/34, E32/33, E41/43, and E42/44, shown in FIG. 23 to FIG. 26, shall be described. These electrodes are all used only in the wiring shown in FIG. 21 for detecting a moment Mz. Each of the electrodes indicated here by a symbol containing a slash is actually a linked electrode, in which two adjacent electrodes are linked. For example, electrode E11/14, shown in FIG. 23, functions as an electrode having the functions of both electrode E11 and electrode E14, and electrode E12/13 functions as an electrode having the functions of both electrode E12 and electrode E13.

Figure 23:
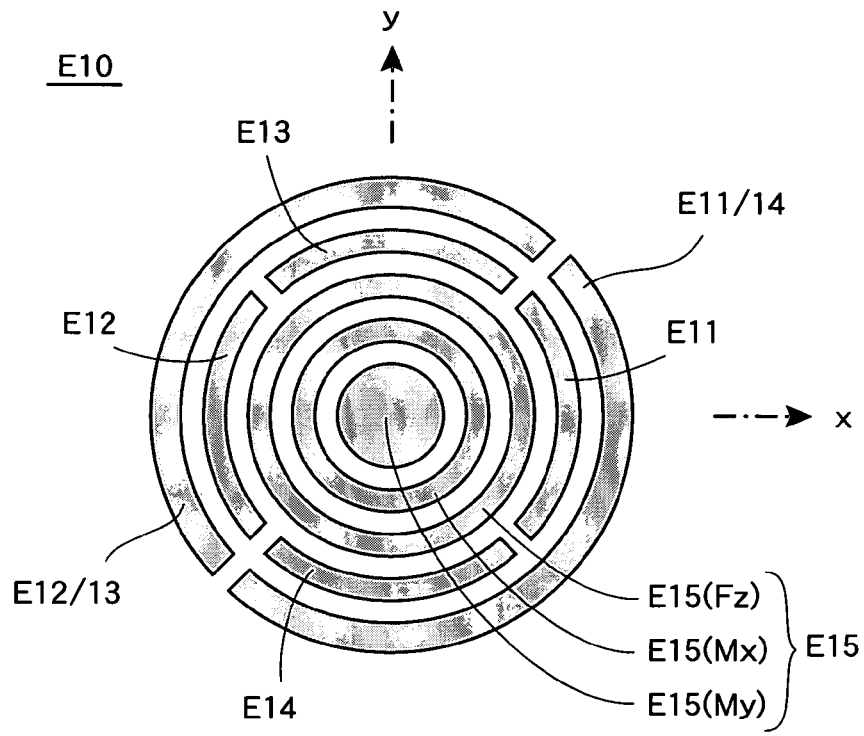
FIG. 23 is an enlarged plan view of a fixed electrode set E10 shown in FIG. 22 (the gray hatching are provided to illustrate the electrode shapes clearly and do not indicate cross sections).
Figure 24:
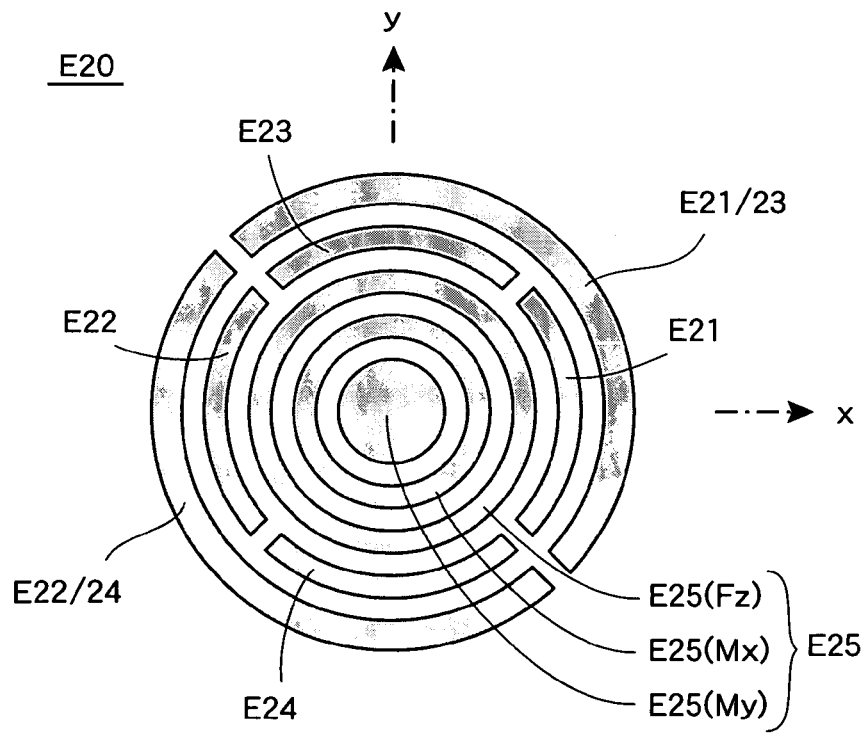
FIG. 24 is an enlarged plan view of a fixed electrode set E20 shown in FIG. 22 (the gray hatching are provided to illustrate the electrode shapes clearly and do not indicate cross sections).
Figure 25:
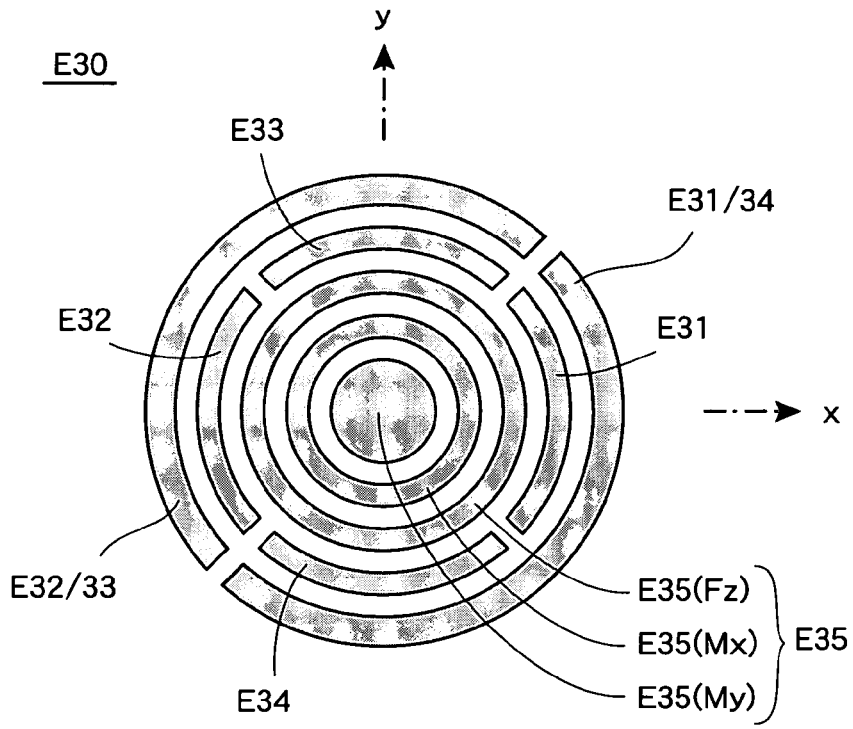
FIG. 25 is an enlarged plan view of a fixed electrode set E30 shown in FIG. 22 (the gray hatching are provided to illustrate the electrode shapes clearly and do not indicate cross sections).
Figure 26:
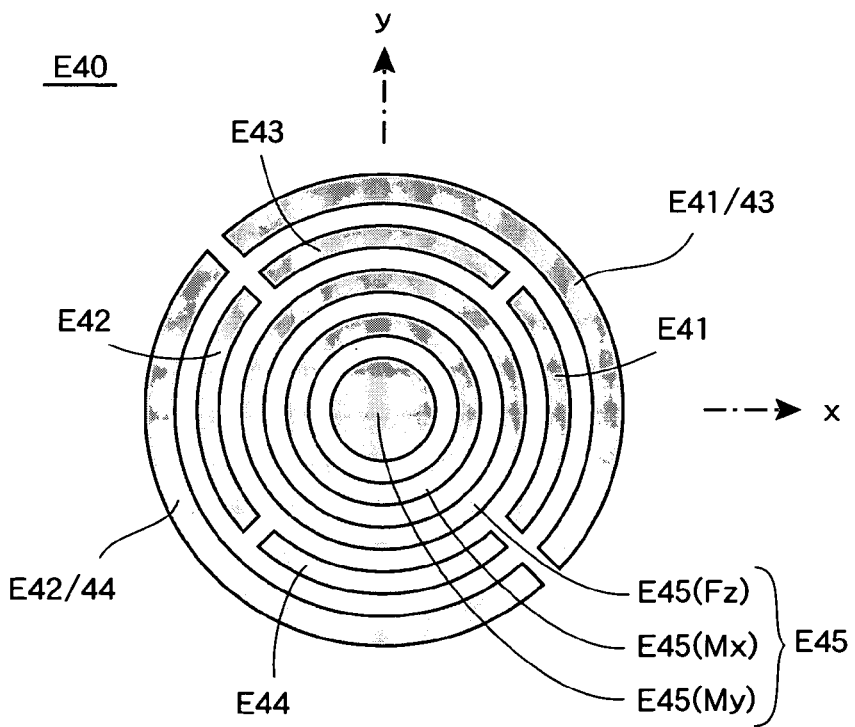
FIG. 26 is an enlarged plan view of a fixed electrode set E40 shown in FIG. 22 (the gray hatching are provided to illustrate the electrode shapes clearly and do not indicate cross sections).

The reason for forming such linked electrodes, with which two adjacent electrodes are linked, can be understood readily from the wiring shown in FIG. 21 for detecting a moment Mz. For example in FIG. 21, electrode E12 and electrode E13 are both connected to terminal Tmz1 as electrodes belonging to the first group. These two electrodes may thus be linked mutually and arranged physically as a single linked electrode E12/13. Likewise, in FIG. 21, electrode E11 and electrode E14 are both connected to terminal Tmz2 as electrodes belonging to the second group. These two electrodes may thus also be linked mutually and arranged physically as a single linked electrode E11/14. Linked electrodes E12/13 and E11/14, shown in FIG. 23, are thus linked electrodes that have been formed under such intentions. By using such linked electrodes, since just a single wiring needs to be drawn from electrode E12/13 to terminal Tmz1 and just a single wiring needs to be drawn from electrode E11/14 to terminal Tmz2, the wiring can be simplified.

The wiring to be provided to the respective electrodes E11 to E14, E21 to E24, E31 to E34, and E41 to E44, shown in FIG. 21, thus need to be provided to just the eight linked electrodes E11/14, E12/13, E21/23, E22/24, E31/34, E32/33, E41/43, and E42/44, shown in FIG. 23 to FIG. 26.

The use of such linked electrodes thus means that sets of two adjacent capacitance elements can be comprised physically as single capacitance elements. Specifically, X-axis inclination detection capacitance element C12, which belongs to the first group that forms first sensor S1, and Y-axis inclination detection capacitance element C13, which belongs to the first group that forms first sensor S1, are comprised as a physically single capacitance element C12/13, X-axis inclination detection capacitance element C11, which belongs to the second group that forms first sensor S1, and Y-axis inclination detection capacitance element C14, which belongs to the second group that forms first sensor S1, are comprised as a physically single capacitance element C11/14, X-axis inclination detection capacitance element C22, which belongs to the first group that forms second sensor S2, and Y-axis inclination detection capacitance element C24, which belongs to the first group that forms second sensor S2, are comprised as a physically single capacitance element C22/24, X-axis inclination detection capacitance element C21, which belongs to the second group that forms second sensor S2, and Y-axis inclination detection capacitance element C23, which belongs to the second group that forms second sensor S2, are comprised as a physically single capacitance element C21/23, X-axis inclination detection capacitance element C31, which belongs to the first group that forms third sensor S3, and Y-axis inclination detection capacitance element C34, which belongs to the first group that forms third sensor S3, are comprised as a physically single capacitance element C31/34, X-axis inclination detection capacitance element C32, which belongs to the second group that forms third sensor S3, and Y-axis inclination detection capacitance element C33, which belongs to the second group that forms third sensor S3, are comprised as a physically single capacitance element C32/33, X-axis inclination detection capacitance element C41, which belongs to the first group that forms fourth sensor S4, and Y-axis inclination detection capacitance element C43, which belongs to the first group that forms fourth sensor S4, are comprised as a physically single capacitance element C41/43, X-axis inclination detection capacitance element C42, which belongs to the second group that forms fourth sensor S4, and Y-axis inclination detection capacitance element C44, which belongs to the second group that forms fourth sensor S4, are comprised as a physically single capacitance element C42/44.

Thus by preparing a total of thirty six fixed electrodes that form the fixed electrode sets E10, E20, E30, and E40, such as shown in FIG. 22, all of the wiring of FIG. 16 to FIG. 21 can be provided in an overlapped manner and a force detection device that can detect all six components of Fx, Fy, Fz, Mx, My, and Mz can be realized.

<<<Section 5. Structure and Arrangement of a Second Embodiment>>>

A force detection device of a second embodiment of this invention shall now be described. Like the above-described force detection device of the first embodiment, the force detection device of the second embodiment performs detection using four columnar force transmitting members and four sensors S1 to S4. However, the present embodiment differs slightly in the positioning of the four columnar force transmitting members. A description shall now be provided concerning just this difference.

Figure 27:
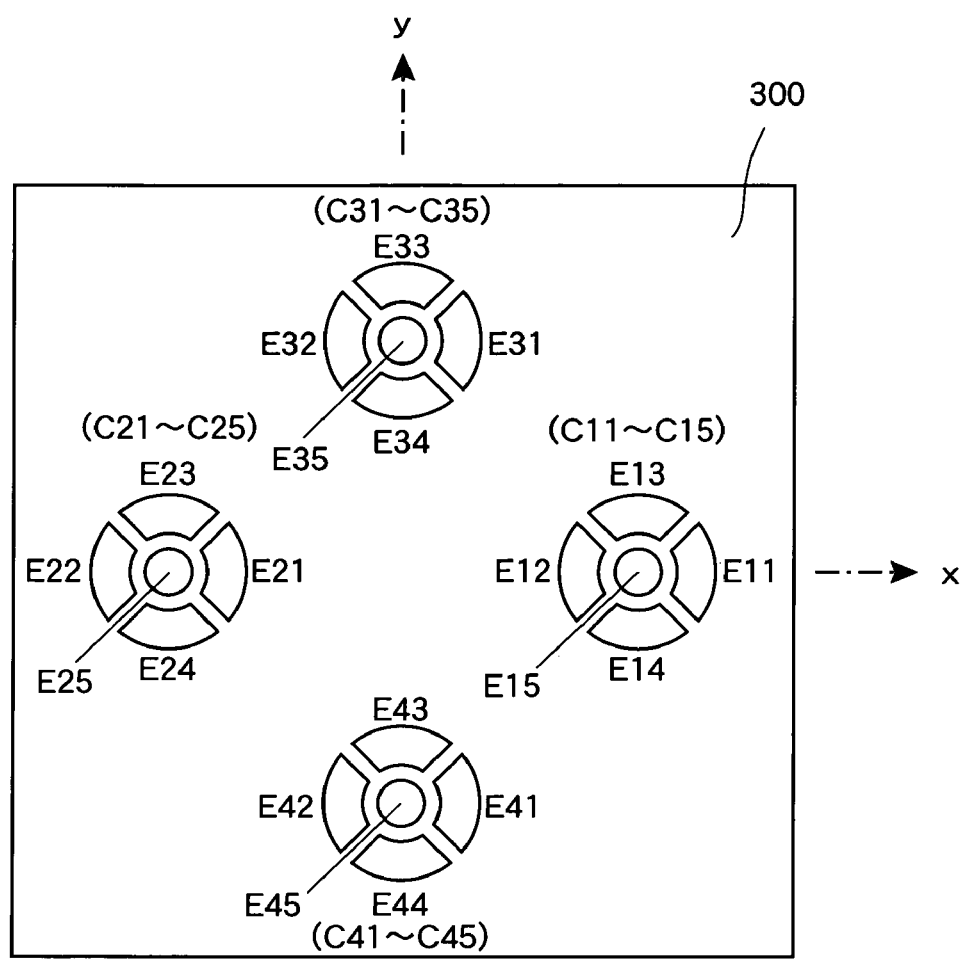
FIG. 27 is a top view of a supporting member 300 of a force detection device of a second embodiment of this invention.

FIG. 27 is a top view of a supporting member 300 used in the force detection device of the second embodiment. A comparison with FIG. 13, which is a top view of supporting member 300 used in the above-described force detection device of the first embodiment, makes clear the differences between the two. That is, as shown in FIG. 13, with the first embodiment, fixed electrodes E11 to E15, E21 to E25, E31 to E35, and E41 to E45, which are components of the four sensors S1 to S4, are respectively positioned at the first to fourth quadrants of the xy coordinate system and the first to fourth force transmitting members are respectively positioned at the first to fourth quadrants of the XY two-dimensional coordinate system.

Meanwhile, with the force detection device of the second embodiment that is shown in FIG. 27, fixed electrodes E11 to E15, E21 to E25, E31 to E35, and E41 to E45, which are components of the four sensors S1 to S4, are respectively positioned at a positive part of the x-axis, a negative part of the x-axis, a positive part of the y-axis, and a negative part of the y-axis. And though the embodiments are the same in that first to fourth force transmitting members T1 to T4 are respectively comprised as structures with which the longitudinal direction is a direction parallel to the Z-axis, with the present embodiment, these longitudinal direction axes are positioned so as to intersect a positive part of the X-axis, a negative part of the X-axis, a positive part of the Y-axis, and a negative part of the Y-axis of the XY two-dimensional coordinate system. The point that capacitance elements C11 to C15, C21 to C25, C31 to C35, and C41 to C45 are formed by the respective fixed electrodes E11 to E15, E21 to E25, E31 to E35, and E41 to E45 and conductive diaphragms (common displaceable electrodes) positioned above the fixed electrodes is the same as the above-described first embodiment. However, since the positioning of the force transmitting members and the sensors differ, the detection processes of detection circuit 30 differ somewhat.

FIG. 28A and FIG. 28B show tables indicating the modes of variation of the static capacitance values of the respective capacitance elements C11 to C45 of the force detection device of the second embodiment. Here again, "0" indicates no change, "+" indicates an increase, and "−" indicates a decrease. Also, though these tables again show only cases where the values of the six force components, Fx, Fy, Fz, Mx, My, and Mz, are positive, the increase/decrease relationships simply become reversed in the case of negative values. A comparison of the tables shown in FIG. 28A and FIG. 28B with the tables shown in FIG. 14A and FIG. 14B shows the modes of variation of the static capacitance values of the respective capacitance elements in cases where force components Fx, Fy, and Fz of the respective axial directions act to be exactly the same in both cases. This is because, as was mentioned above, in detecting force components Fx, Fy, and Fz, there are no special conditions concerning the positioning of the respective force transmitting members. The principles of detection related to force components Fx, Fy, and Fz of the respective axial directions are thus the same as those described above for the first embodiment.

However, the modes of variation of the static capacitance values of the respective capacitance elements in cases where moments Mx, My, and Mz about the respective axes act differ slightly and the principles of detection of these moments differ from those described above for the first embodiment. This point shall now be described briefly.

First, when a moment Mx about the X-axis acts, a pulling force (+fz) acts on supporting member 300 from third force transmitting member T3, positioned at the positive part of the Y-axis, and a pressing force (−fz) acts on supporting member 300 from fourth force transmitting member T4, positioned at the negative part of the Y-axis. In this case, there is no significant action of force on supporting member 300 from first force transmitting member T1, positioned at the positive part of the X-axis, and second force transmitting member T2, positioned at the negative part of the X-axis. Though actually forces in relation to the Z-axis act partially, since these are slight in comparison to the forces transmitted from the third and fourth force transmitting members, it shall be considered here that the variations of the capacitance elements C11 to C15 and C21 to C25 are "0." Results such as those shown in the fourth rows (rows of +Mx) of FIG. 28A and FIG. 28B are thus obtained.

Meanwhile, when a moment My about the Y-axis acts, a pressing force (−fz) acts on supporting member 300 from first force transmitting member T1, positioned at the positive part of the X-axis, and a pulling force (+fz) acts on supporting member 300 from second force transmitting member T2, positioned at the negative part of the X-axis. In this case, there is no significant action of force on supporting member 300 from third force transmitting member T3, positioned at the positive part of the Y-axis, and fourth force transmitting member T4, positioned at the negative part of the Y-axis. Results such as those shown in the fifth rows (rows of +My) of FIG. 28A and FIG. 28B are thus obtained.

Next, in reference to FIG. 27, the directions of inclinations of the four force transmitting members T1 to T4 in a case where a positive moment +Mz about the Z-axis (a counterclockwise moment in the plan view of FIG. 27) is applied to force receiving member 100 shall be described.

Firstly, first force transmitting member T1 (positioned above fixed electrode E15 of the Figure), positioned at the positive part of the X-axis, becomes inclined in the upward direction (positive y-axis direction) in FIG. 27 so that capacitance element C13 narrows in electrode interval and increases in static capacitance value while capacitance element C14 widens in electrode interval and decreases in static capacitance value. Also, second force transmitting member T2 (positioned above fixed electrode E25 of the Figure), positioned at the negative part of the X-axis, becomes inclined in the downward direction (negative y-axis direction) in FIG. 27 so that capacitance element C24 narrows in electrode interval and increases in static capacitance value while capacitance element C23 widens in electrode interval and decreases in static capacitance value. Furthermore, third force transmitting member T3 (positioned above fixed electrode E35 of the Figure), positioned at the positive part of the Y-axis, becomes inclined in the leftward direction (negative x-axis direction) in FIG. 27 so that capacitance element C32 narrows in electrode interval and increases in static capacitance value while capacitance element C31 widens in electrode interval and decreases in static capacitance value. Lastly, fourth force transmitting member T4 (positioned above fixed electrode E45 of the Figure), positioned at the negative part of the Y-axis, becomes inclined in the rightward direction (positive x-axis direction) in FIG. 27 so that capacitance element C41 narrows in electrode interval and increases in static capacitance value while capacitance element C42 widens in electrode interval and decrease in static capacitance value. With the static capacitance value of each of the other capacitance elements, a change does not occur in total.

Thus when a positive direction moment +Mz about the Z-axis acts on force receiving member 100, the increase/decrease results shown in the sixth rows of FIG. 28A and FIG. 28B are obtained. Obviously when a negative direction moment −Mz about the Z-axis acts on force receiving member 100, results with which the negative/positive relationships are reversed will be obtained.

Figure 29:
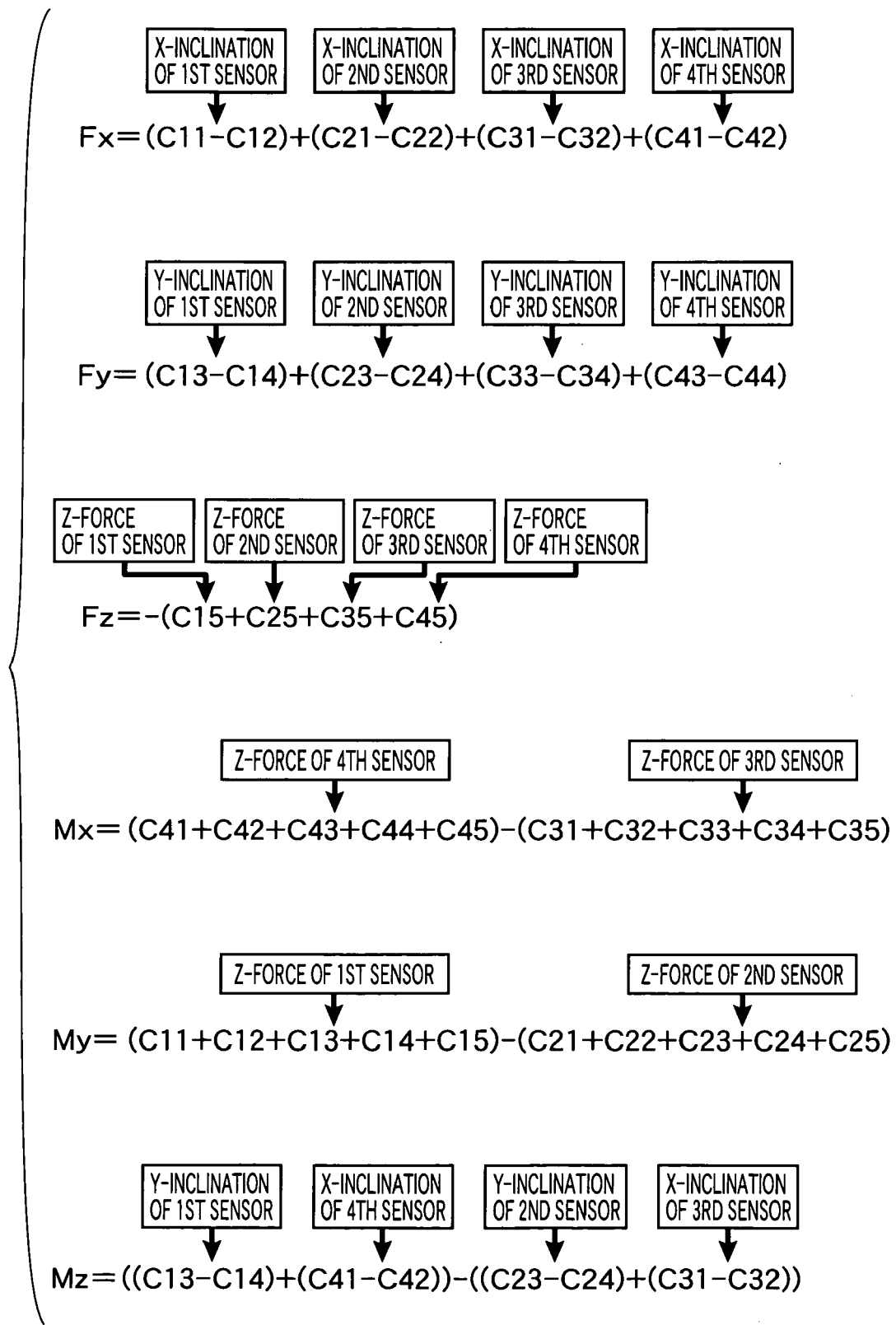
FIG. 29 is a diagram illustrating, by way of numerical equations, the principles of detection of the respective force components shown in FIG. 28A and FIG. 28B.

Thus based on the results shown in the tables of FIG. 28A and FIG. 28B, it can be understood that the six components, Fx, Fy, Fz, Mx, My, and Mz, can be obtained by preparing as detection circuit 30, a circuit, which performs computations based on the equations shown in FIG. 29 using the static capacitance values of the twenty capacitance elements C11 to C45 (here, the static capacitance values themselves shall also be indicated by the same symbols, C11 to C45). The equations for Fz, Fy, and Fz shown in FIG. 29 are exactly the same as those shown in FIG. 15.

The equation, Mx=(C41+C42+C43+C44+C45)−(C31+C32+C33+C34+C35), shown in FIG. 29, is based on the results of the fourth rows (rows of +Mx) of the tables of FIG. 28A and FIG. 28B and signifies that the moment Mx about the X-axis of a force that acts on the force receiving member can be detected based on the difference between the force in relation to the Z-axis direction, which is detected by the fourth sensor, and the force in relation to the Z-axis direction, which is detected by the third sensor.

Also, the equation, My=(C11+C12+C13+C14+C15)−(C21+C22+C23+C24+C25), shown in FIG. 29, is based on the results of the fifth rows (rows of +My) of the tables of FIG. 28A and FIG. 28B and signifies that the moment My about the Y-axis of a force that acts on the force receiving member can be detected based on the difference between the force in relation to the Z-axis direction, which is detected by the first sensor, and the force in relation to the Z-axis direction, which is detected by the second sensor.

Lastly, the equation, Mz=((C13−C14)+(C41−C42))−((C23−C24)+(C31−C32)), shown in FIG. 29, is based on the results of the sixth rows (rows of +Mz) of the tables of FIG. 28A and FIG. 28B and signifies that the moment Mz about the Z-axis of a force that acts on the force receiving member can be detected by determining the difference between the sum of the inclination degree in relation to the Y-axis direction detected by the first sensor and the inclination degree in relation to the X-axis direction detected by the fourth sensor and the sum of the inclination degree in relation to the Y-axis direction detected by the second sensor and the inclination degree in relation to the X-axis direction detected by the third sensor.

As was described above, there are a plurality of variations in the methods for determining forces in relation to the Z-axis direction of the respective force transmitting members T1 to T4 and these variations may also be applied to the equations shown in FIG. 29. In an actual case of a force detection device for detecting multiple components, the detection of moment Mx is preferably carried out using only the capacitance elements that are positioned at the centers and performing the computation of Mx=C45−C35, and the detection of moment My is preferably carried out using only the capacitance elements that are positioned at the centers and performing the computation of My=C15−C25.

<<<Section 6. Detection Circuits of the Second Embodiment>>>

The detection circuits used in the force detection device of the second embodiment, which was described in Section 5, shall now be described. First in regard to the detection circuits for detecting forces Fx, Fy, and Fz of the respective coordinate axis directions, these are basically the same as the detection circuits used in the first embodiment.

Figure 30:
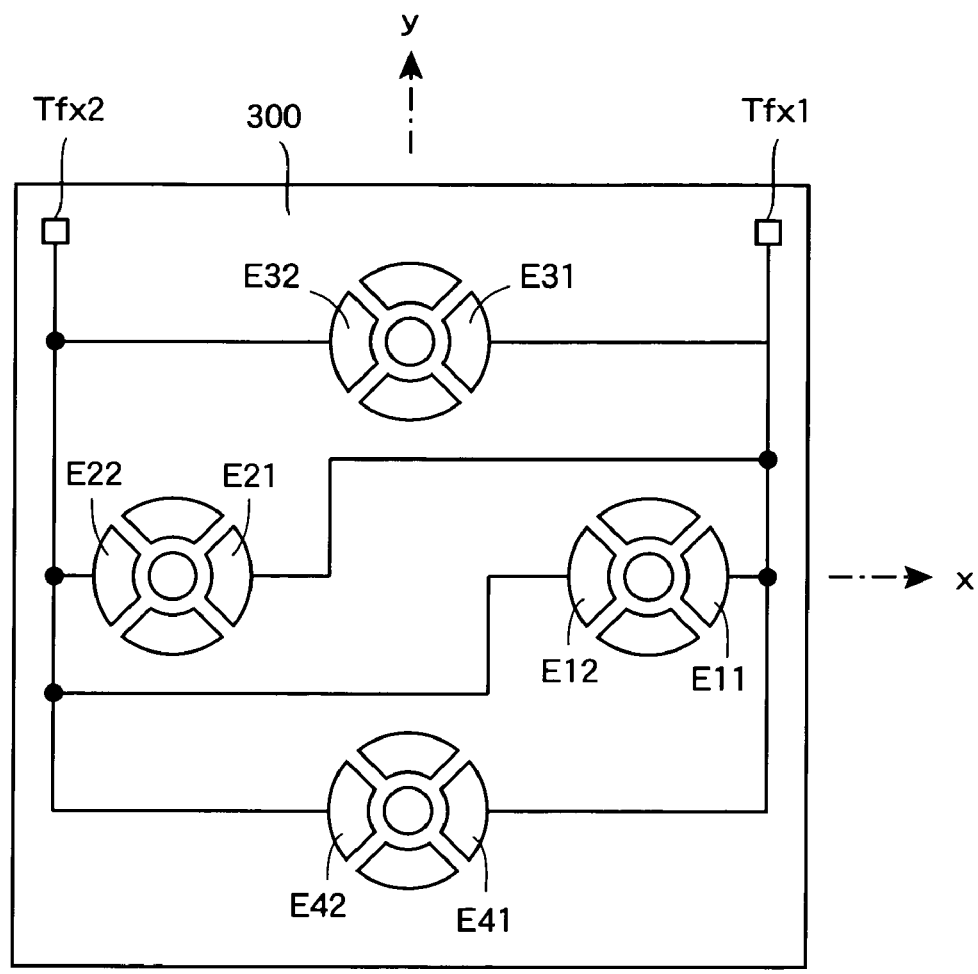
FIG. 30 is a top view of supporting member 300, showing the wiring for detecting a force Fx in an X-axis direction by the force detection device of the second embodiment of this invention.

For example, the detection circuit for detecting a force Fx based on the first equation shown in FIG. 29 can be arranged by providing the wiring illustrated in FIG. 30 for eight of the twenty fixed electrodes formed on supporting member 300. In comparison to the wiring of the first embodiment shown in FIG. 16, though the individual fixed electrodes differ in their positions, the practical wiring details are exactly the same. The equation shown in the lower part of FIG. 30 (equivalent to the equation for a force Fx shown in FIG. 29) indicates that the detection of a force Fx is carried out based on the difference between the electrical signal taken out from terminal Tfx1 and the electrical signal taken out from terminal Tfx2.

Figure 31:
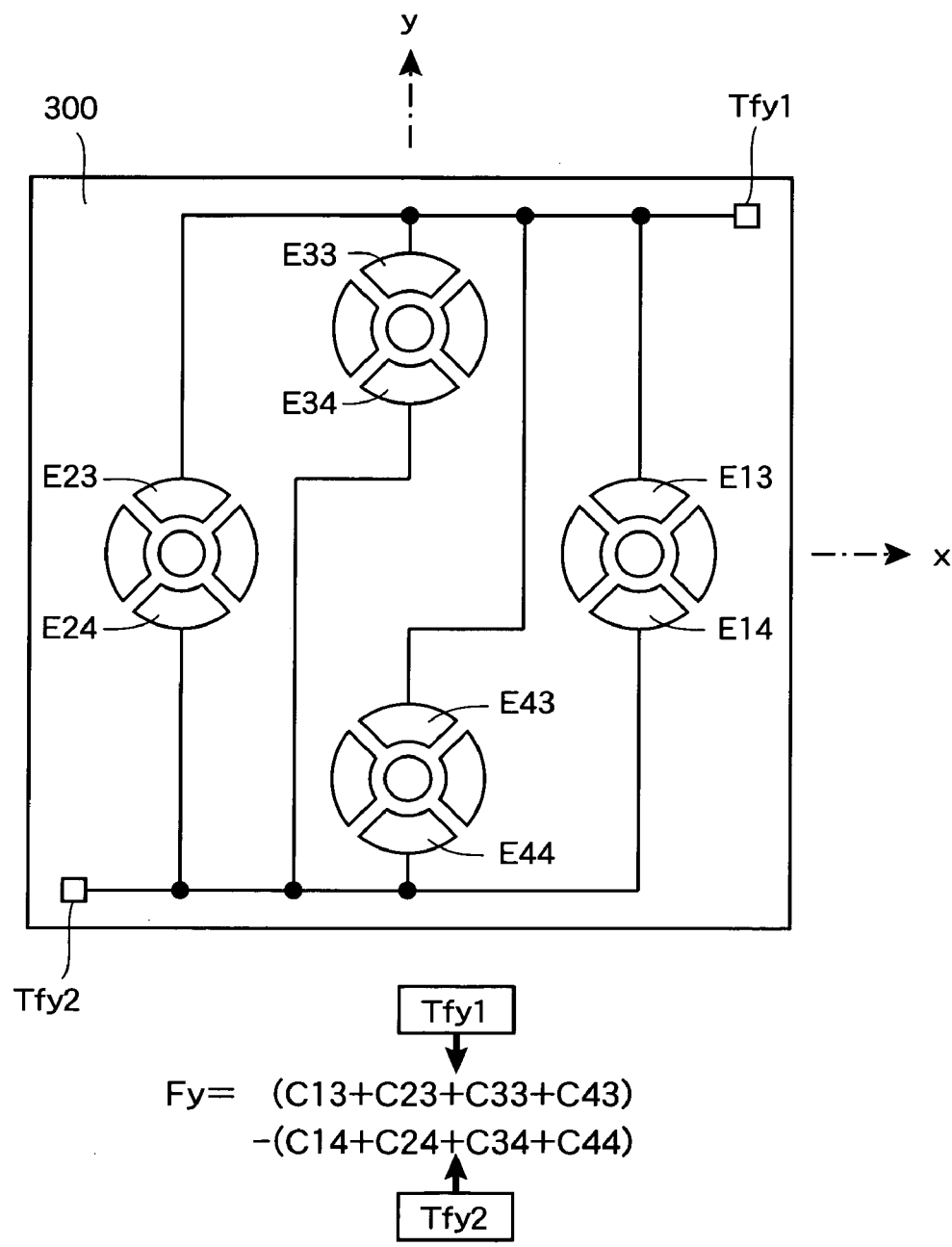
FIG. 31 is a top view of supporting member 300, showing the wiring for detecting a force Fy in a Y-axis direction by the force detection device of the second embodiment of this invention.

Likewise, the detection circuit for detecting a force Fy based on the second equation shown in FIG. 29 can be arranged by providing the wiring illustrated in FIG. 31 for eight of the twenty fixed electrodes formed on supporting member 300. In comparison to the wiring of the first embodiment shown in FIG. 17, though the individual fixed electrodes differ in their positions, the practical wiring details are exactly the same. The equation shown in the lower part of FIG. 31 (equivalent to the equation for a force Fy shown in FIG. 29) indicates that the detection of a force Fy is carried out based on the difference between the electrical signal taken out from terminal Tfy1 and the electrical signal taken out from terminal Tfy2.

Figure 32:
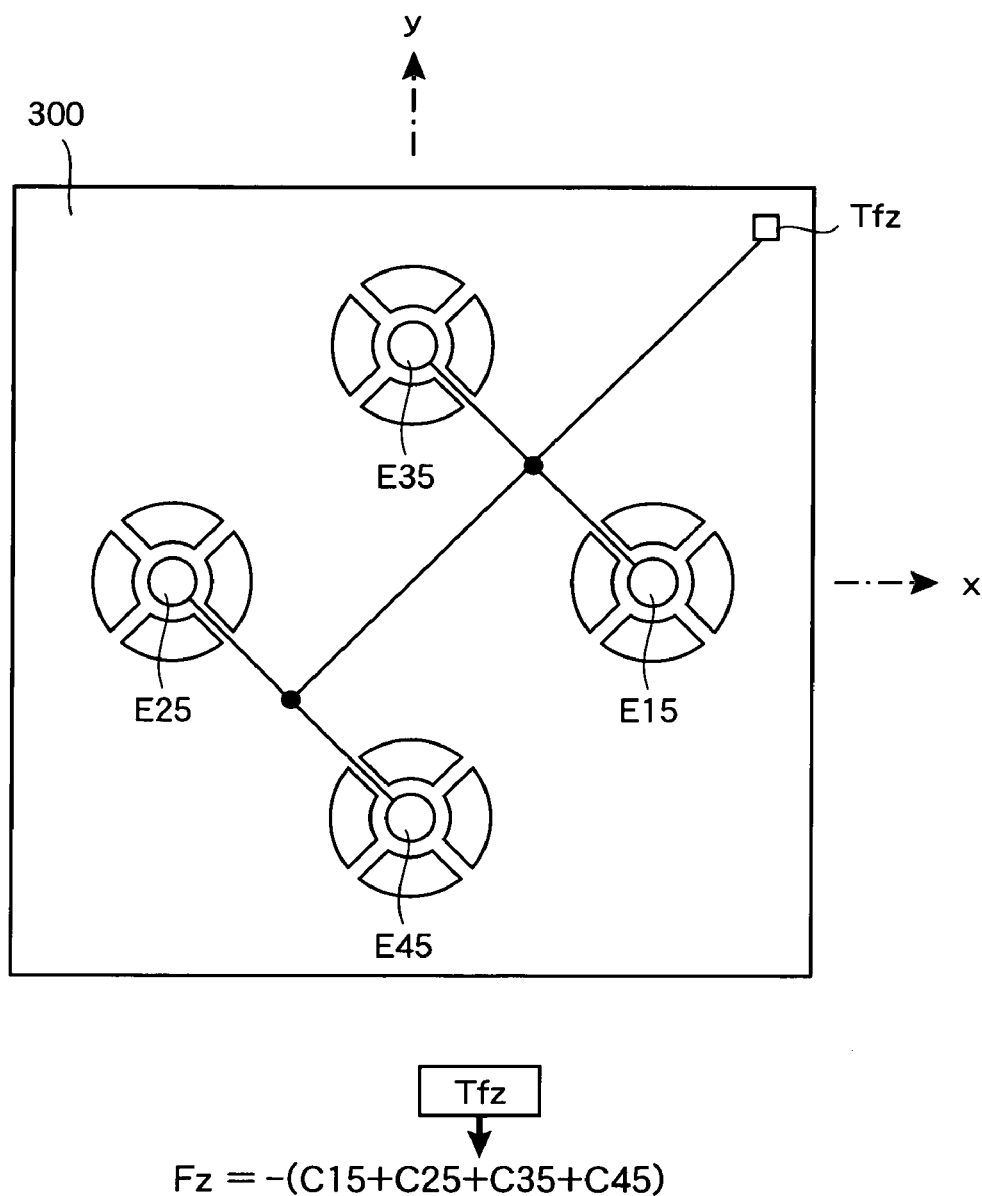
FIG. 32 is a top view of supporting member 300, showing the wiring for detecting a force Fz in a Z-axis direction by the force detection device of the second embodiment of this invention.

Also, the detection circuit for detecting a force Fz based on the third equation shown in FIG. 29 can be arranged by providing the wiring illustrated in FIG. 32 for four of the twenty fixed electrodes formed on supporting member 300. In comparison to the wiring of the first embodiment shown in FIG. 18, though the individual fixed electrodes differ in their positions, the practical wiring details are exactly the same. The equation shown in the lower part of FIG. 32 (equivalent to the equation for a force Fz shown in FIG. 29) indicates that the detection of a force Fz is carried out based on the electrical signal taken out from terminal Tfz.

Figure 33:
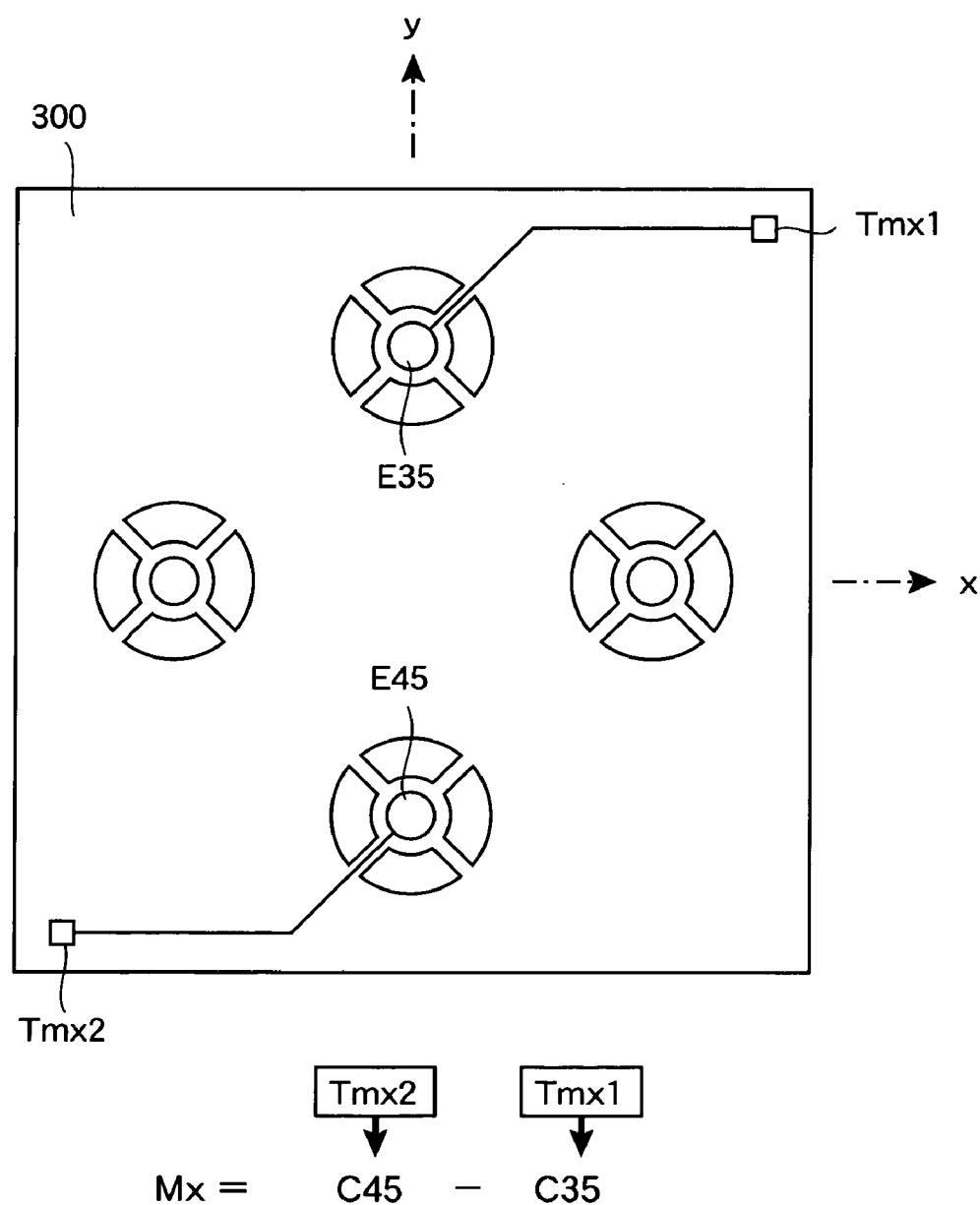
FIG. 33 is a top view of supporting member 300, showing the wiring for detecting a moment Mx about the X-axis by the force detection device of the second embodiment of this invention.

Detection circuits for detecting moments Mx, My, and Mz shall now be considered. First, a detection circuit for detecting a moment Mx based on the fourth equation shown in FIG. 29 can be arranged by providing wiring as illustrated in FIG. 33 for two of the twenty fixed electrodes formed on supporting member 300. That is, fixed electrode E35 is connected to a terminal Tmx1 and fixed electrode E45 is connected to a terminal Tmx2. Since the value of the static capacitance that arises between terminal Tmx1 and intermediate member 200 will be the static capacitance value of capacitance element C35 and the value of the static capacitance that arises between terminal Tmx2 and intermediate member 200 will be the static capacitance value of capacitance element C45, a moment Mx can be detected by preparing a circuit that determines the difference between the two. The equation shown in the lower part of FIG. 33 indicates that the detection of a moment Mx is carried out based on the difference between the electrical signal taken out from terminal Tmx1 and the electrical signal taken out from terminal Tmx2. Though the equation shown in the lower part of FIG. 33 differs from the equation for Mx shown in FIG. 29, this is because only the capacitance element positioned at the center of each sensor is used as a Z-axis displacement detection capacitance element.

Figure 34:
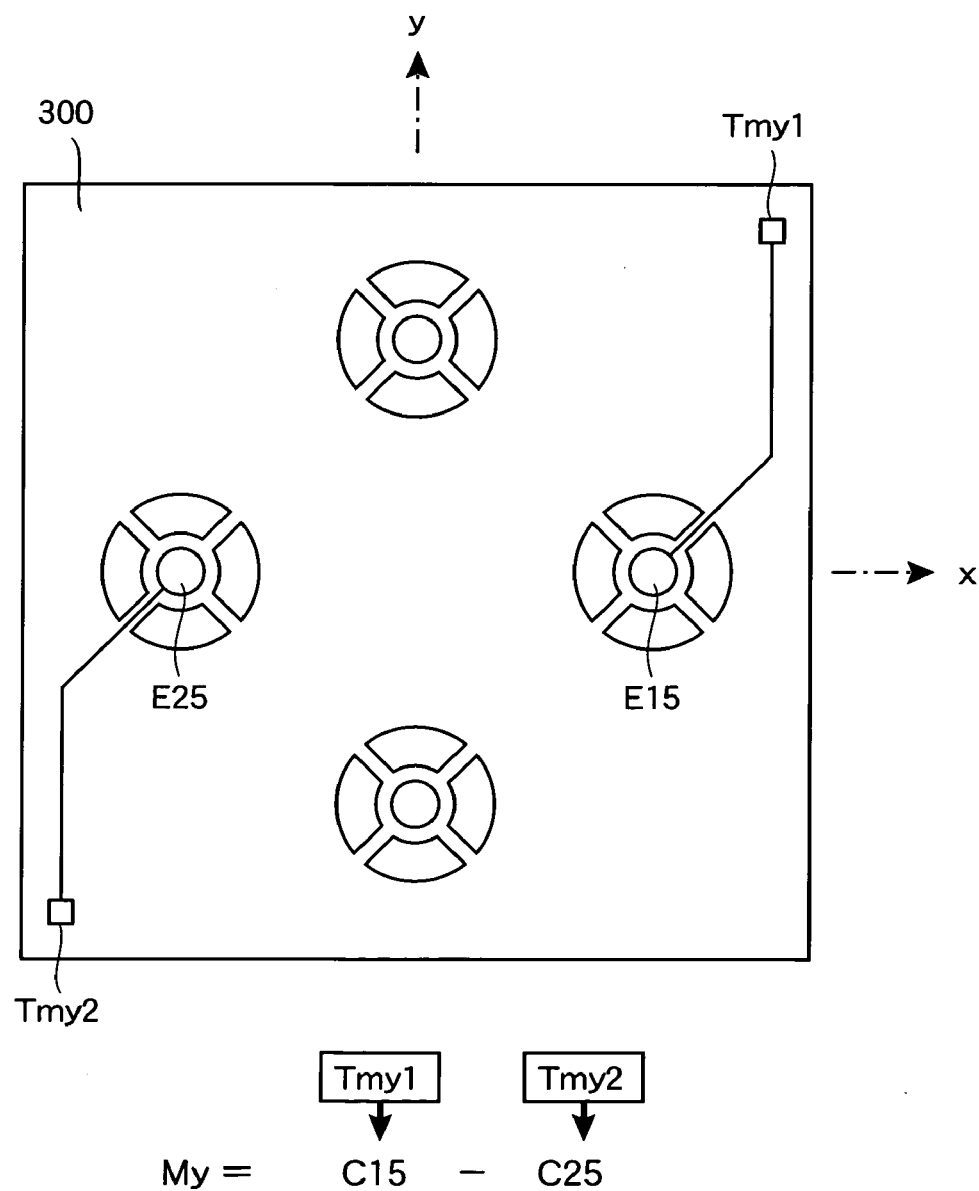
FIG. 34 is a top view of supporting member 300, showing the wiring for detecting a moment My about the Y-axis by the force detection device of the second embodiment of this invention.

Meanwhile, a detection circuit for detecting a moment My based on the fifth equation shown in FIG. 29 can be arranged by providing wiring as illustrated in FIG. 34 for two of the twenty fixed electrodes formed on supporting member 300. That is, fixed electrode E15 is connected to a terminal Tmy1 and fixed electrode E25 is connected to a terminal Tmy2. Since the value of the static capacitance that arises between terminal Tmy1 and intermediate member 200 will be the static capacitance value of capacitance element C15 and the value of the static capacitance that arises between terminal Tmy2 and intermediate member 200 will be the static capacitance value of capacitance element C25, a moment My can be detected by preparing a circuit that determines the difference between the two. The equation shown in the lower part of FIG. 34 indicates that the detection of a moment My is carried out based on the difference between the electrical signal taken out from terminal Tmy1 and the electrical signal taken out from terminal Tmy2. Though the equation shown in the lower part of FIG. 34 differs from the equation for My shown in FIG. 29, this is because only the capacitance element positioned at the center of each sensor is used as a Z-axis displacement detection capacitance element.

Figure 35:
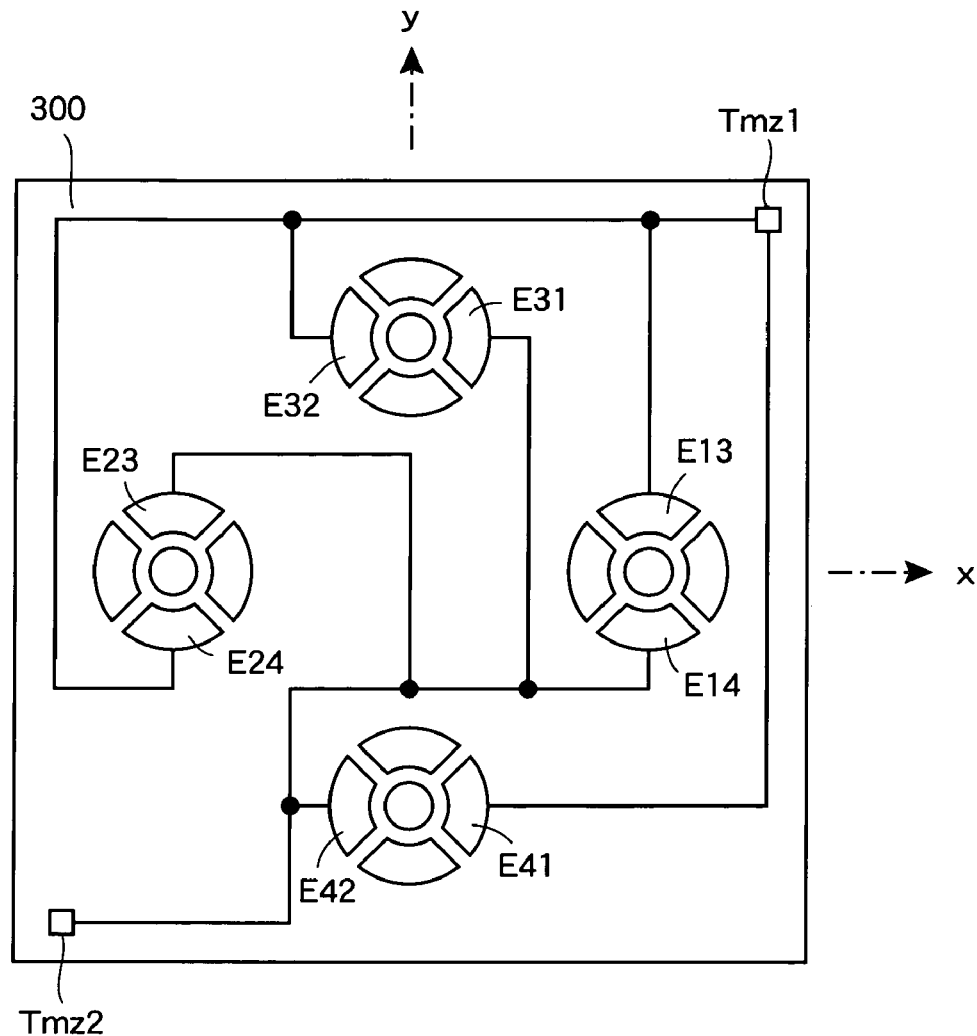
FIG. 35 is a top view of supporting member 300, showing the wiring for detecting a moment Mz about the Z-axis by the force detection device of the second embodiment of this invention.

Lastly, a detection circuit for detecting a moment Mz based on the sixth equation shown in FIG. 29 can be arranged by providing wiring as illustrated in FIG. 35 for eight of the twenty fixed electrodes formed on supporting member 300. That is, the four fixed electrodes E13, E24, E32, and E41 are connected to a terminal Tmz1 as electrodes belonging to a first group and the four fixed electrodes E14, E23, E31, and E42 are connected to a terminal Tmz2 as electrodes belonging to a second group. Since the value of the static capacitance that arises between terminal Tmz1 and intermediate member 200 will be the sum of the static capacitance values of the four capacitance elements C13, C24, C32, and C41 belonging to the first group, and the value of the static capacitance that arises between terminal Tmz2 and intermediate member 200 will be the sum of the static capacitance values of the four capacitance elements C14, C23, C31, and C42 belonging to the second group, a moment Mz can be detected by preparing a circuit that determines the difference between the two sums. The equation shown in the lower part of FIG. 35 (equivalent to the equation for a moment Mz shown in FIG. 29) indicates that the detection of a moment Mz is carried out based on the difference between the electrical signal taken out from terminal Tmz1 and the electrical signal taken out from terminal Tmz2.

Thus with the wiring shown in FIG. 35, the capacitance elements belonging to the first group are: "Y-axis inclination detection capacitance element C13, which is positioned at a position at which the electrode interval narrows when force transmitting member T1 becomes inclined in the positive Y-axis direction," "Y-axis inclination detection capacitance element C24, which is positioned at a position at which the electrode interval widens when force transmitting member T2 becomes inclined in the positive Y-axis direction," "X-axis inclination detection capacitance element C32, which is positioned at a position at which the electrode interval narrows when force transmitting member T3 becomes inclined in the negative X-axis direction," and "X-axis inclination detection capacitance element C41, which is positioned at a position at which the electrode interval narrows when force transmitting member T4 becomes inclined in the positive X-axis direction." Also, the capacitance elements belonging to the second group are: "Y-axis inclination detection capacitance element C14, which is positioned at a position at which the electrode interval widens when force transmitting member T1 becomes inclined in the positive Y-axis direction," "Y-axis inclination detection capacitance element C23, which is positioned at a position at which the electrode interval narrows when force transmitting member T2 becomes inclined in the positive Y-axis direction," "X-axis inclination detection capacitance element C31, which is positioned at a position at which the electrode interval narrows when force transmitting member T3 becomes inclined in the positive X-axis direction," and "X-axis inclination detection capacitance element C42, which is positioned at a position at which the electrode interval widens when force transmitting member T4 becomes inclined in the positive X-axis direction."

The wiring necessary for detecting all of the six types of force components, Fx, Fy, Fz, Mx, My, and Mz were described above with reference to FIG. 30 to FIG. 35. In order to realize a force detection device having functions of respectively detecting a plurality of force components, the necessary wiring may be provided so as to overlap suitably. Also in the cases where the same electrode is used for detecting different force components, specific electrodes may be split into a plurality of physically independent electrodes in the same manner as in the first embodiment.

Figure 36:
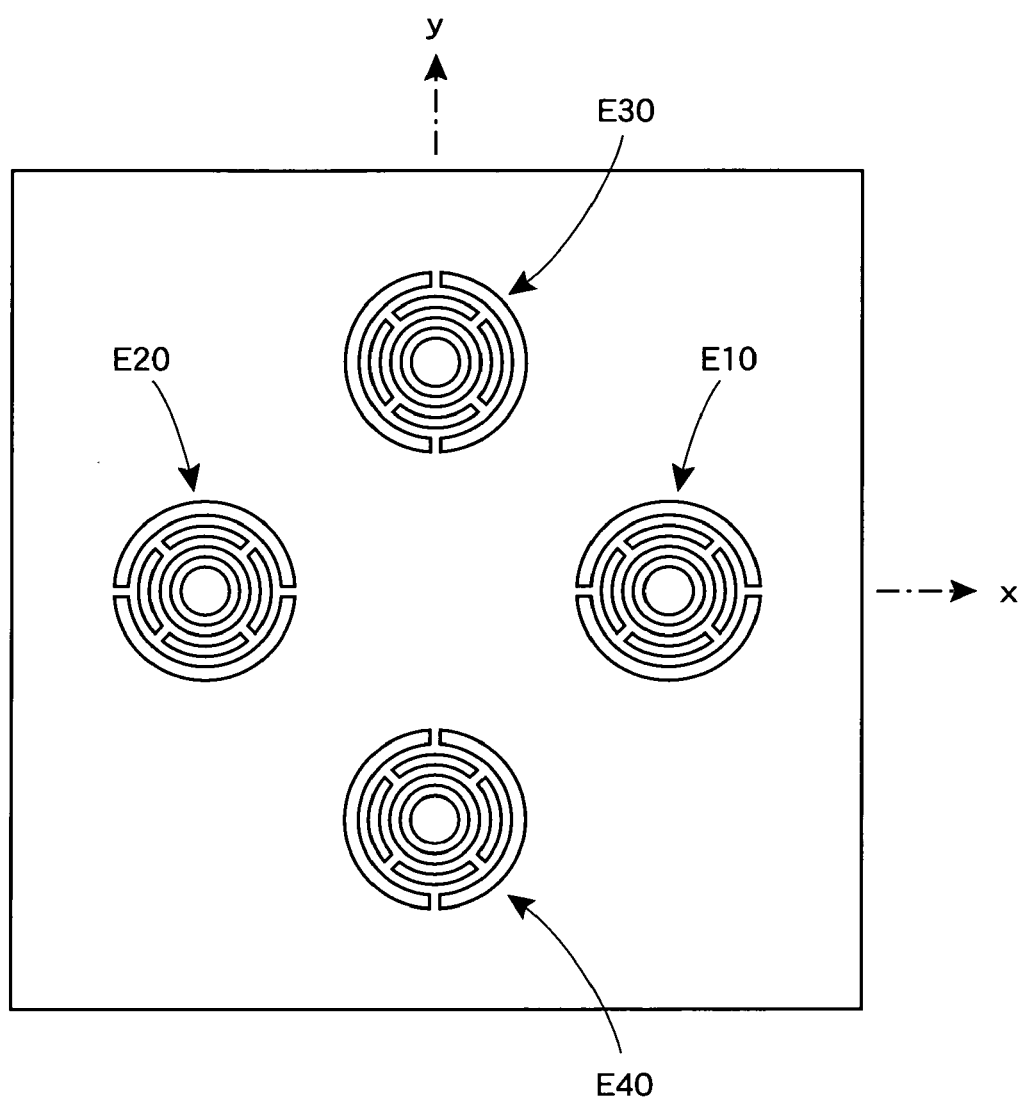
FIG. 36 is a top view of supporting member 300, showing an electrode configuration suited for detecting all six force components by the force detection device of the second embodiment of this invention.

An example of a configuration of fixed electrodes for enabling the detection of all six components of Fx, Fy, Fz, Mx, My, and Mz is shown for the force detection device of the second embodiment in the top view of FIG. 36 (top view of supporting member 300). Each of fixed electrode sets E10, E20, E30, and E40 is comprised of eight fixed electrodes and this is because specific fixed electrodes have been split according to use in order to enable the detection of all six force components.

Enlarged views of the fixed electrode sets E10, E20, E30, and E40, shown in FIG. 36, are shown in FIG. 37, FIG. 38, FIG. 39, and FIG. 40, respectively. In each of these enlarged views, the gray hatching are provided to illustrate the electrode shapes clearly and do not indicate cross sections. As illustrated in these Figures, fixed electrodes E15, E25, E35, and E45, which respectively form Z-axis displacement detection capacitance elements, are formed at the central parts of the respective four fixed electrode sets E10, E20, E30, and E40. However, each of these fixed electrodes is split into two independent split electrodes for any two of the three functions of Fz detection, Mx detection, and My detection.

Figure 37:
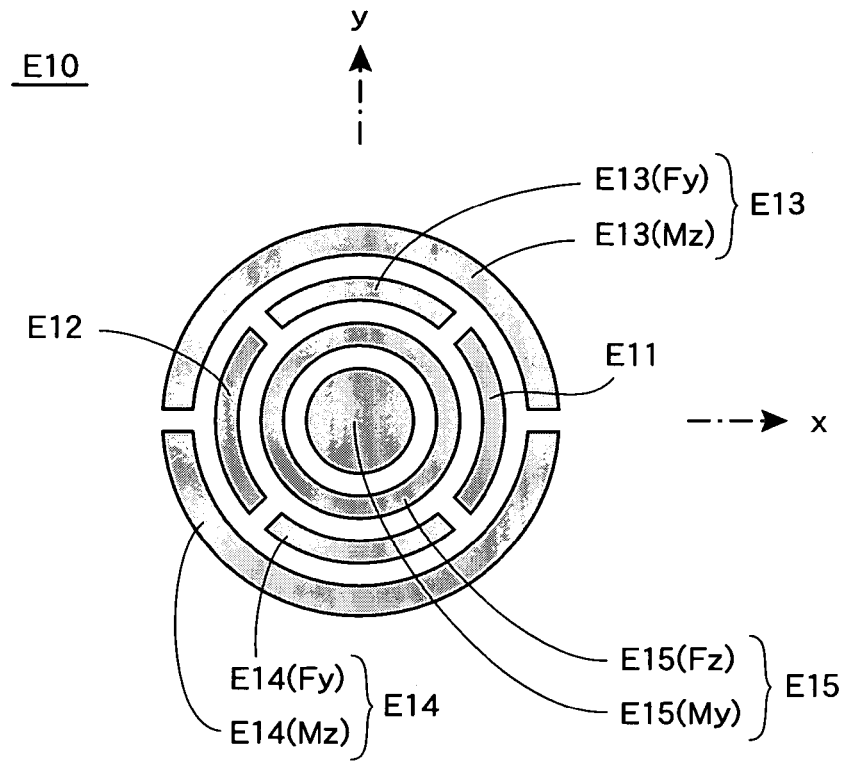
FIG. 37 is an enlarged plan view of a fixed electrode set E10 shown in FIG. 36 (the gray hatching are provided to illustrate the electrode shapes clearly and do not indicate cross sections).

For example, in the case of the example shown in FIG. 37, fixed electrode E15 is comprised of an annular Fz detection electrode E15(Fz) and a circular My detection electrode E15(My), which is disposed at the inner side of annular Fz detection electrode E15(Fz). In the case of the example shown in FIG. 38, fixed electrode E25 is comprised of an annular Fz detection electrode E25(Fz) and a circular My detection electrode E25(My), which is disposed at the inner side of annular Fz detection electrode E25(Fz). Also, in the case of the example shown in FIG. 39, fixed electrode E35 is comprised of an annular Fz detection electrode E35(Fz) and a circular Mx detection electrode E35(Mx), which is disposed at the inner side of annular Fz detection electrode E35(Fz), and in the case of the example shown in FIG. 40, fixed electrode E45 is comprised of an annular Fz detection electrode E45(Fz) and a circular Mx detection electrode E45(Mx), which is disposed at the inner side of annular Fz detection electrode E45(Fz). In each of these cases, an electrode configuration is provided in which a circular electrode and an annular electrode are positioned concentrically and which is suited for arranging a Z-axis displacement detection capacitance element. Needless to say, which of the detection elements are to be positioned at the inner side and the outer side is arbitrary and the illustrated example is simply a single example.

Figure 38:
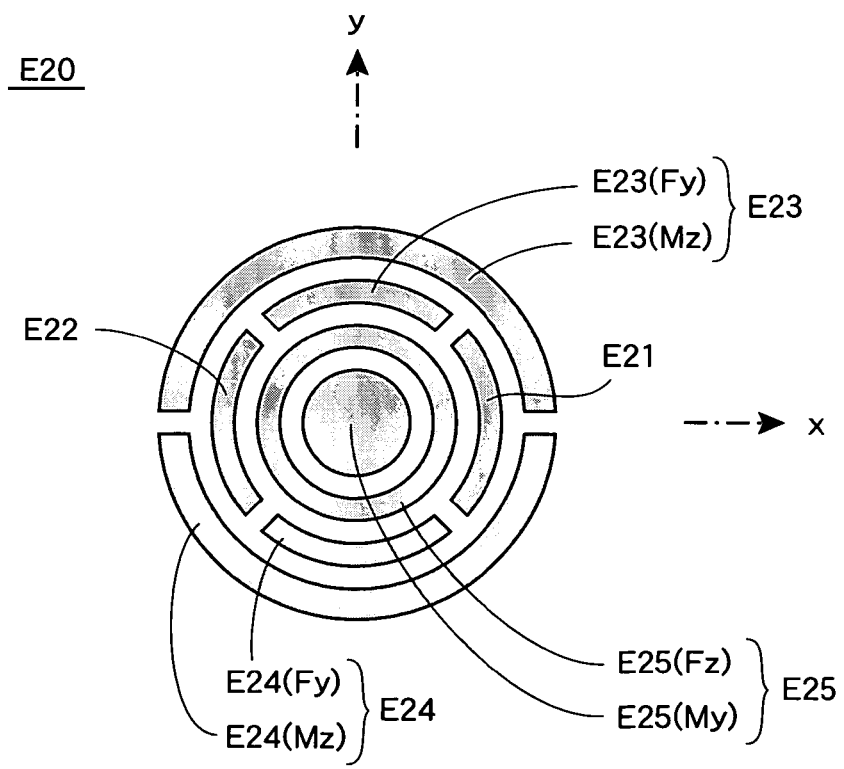
FIG. 38 is an enlarged plan view of a fixed electrode set E20 shown in FIG. 36 (the gray hatching are provided to illustrate the electrode shapes clearly and do not indicate cross sections).
Figure 39:
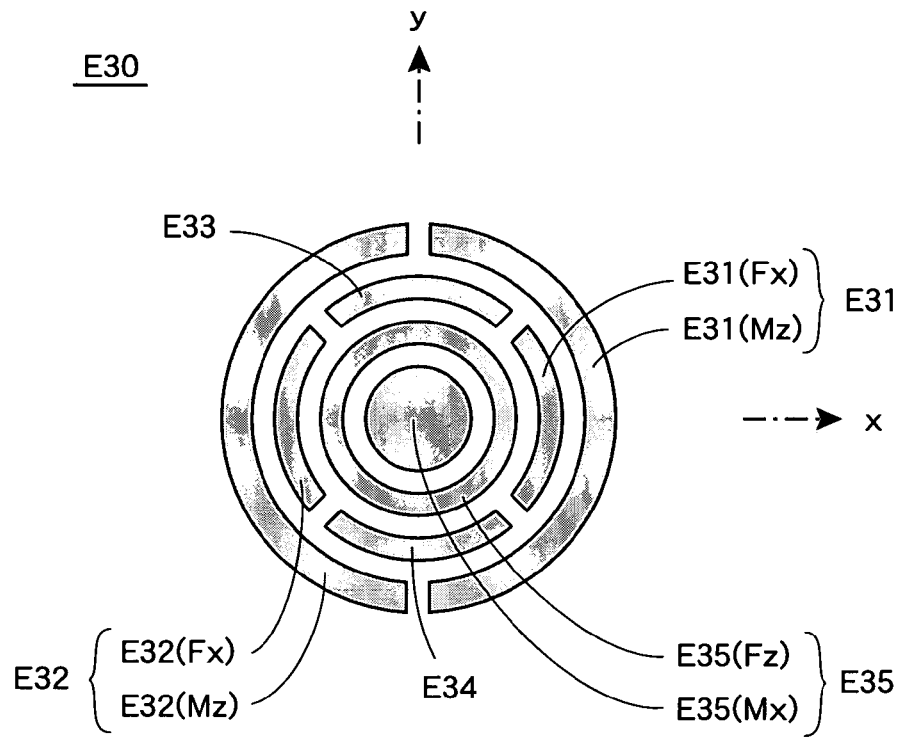
FIG. 39 is an enlarged plan view of a fixed electrode set E30 shown in FIG. 36 (the gray hatching are provided to illustrate the electrode shapes clearly and do not indicate cross sections).

Meanwhile, of the fixed electrodes for arranging X-axis inclination detection capacitance elements and fixed electrodes for arranging Y-axis inclination detection capacitance elements, splitting is carried out wherever necessary. That is, as shown in FIG. 37, fixed electrode E13 is split into an Fy detection electrode E13(Fy) and an Mz detection electrode E13(Mz), and fixed electrode E14 is split into an Fy detection electrode E14(Fy) and an Mz detection electrode E14 (Mz). Also as shown in FIG. 38, fixed electrode E23 is split into an Fy detection electrode E23(Fy) and an Mz detection electrode E23(Mz), and fixed electrode E24 is split into an Fy detection electrode E24(Fy) and an Mz detection electrode E24(Mz). Meanwhile, as shown in FIG. 39, fixed electrode E31 is split into an Fx detection electrode E31(Fx) and an Mz detection electrode E31(Mz), and fixed electrode E32 is split into an Fx detection electrode E32(Fx) and an Mz detection electrode E32(Mz). Also as shown in FIG. 40, fixed electrode E41 is split into an Fx detection electrode E41(Fx) and an Mz detection electrode E41(Mz), and fixed electrode E42 is split into an Fx detection electrode E42(Fx) and an Mz detection electrode E42(Mz).

By thus preparing the total of 32 fixed electrodes as shown in FIG. 37 to FIG. 40, all of the wiring of FIG. 30 to FIG. 35 can be provided in an overlapped manner and a force detection device that can detect all six components of Fx, Fy, Fz, Mx, My, and Mz can be realized.

Figure 40:
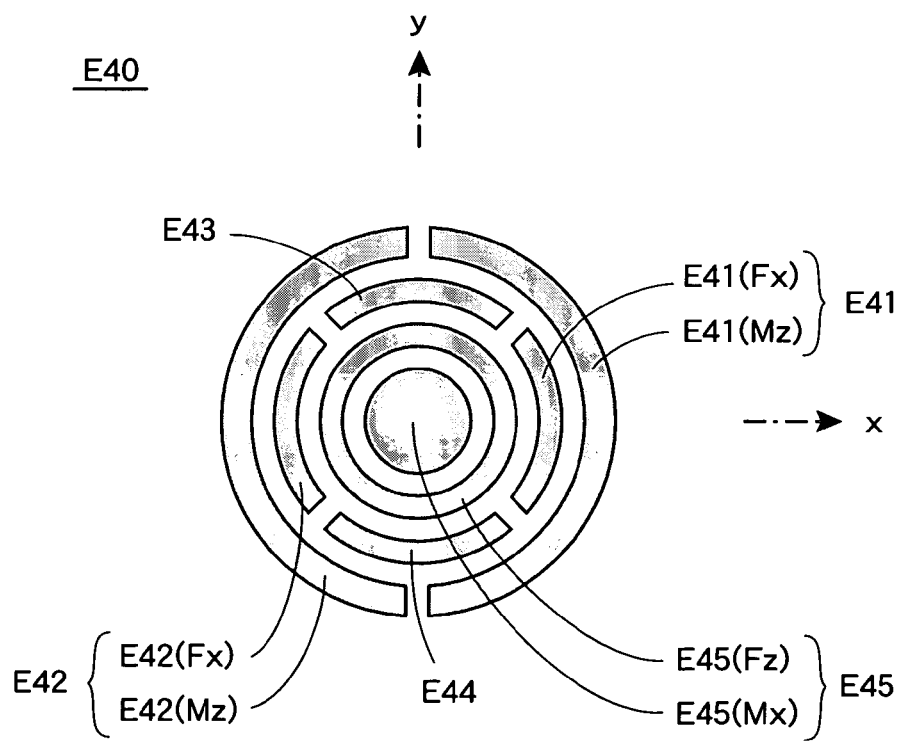
FIG. 40 is an enlarged plan view of a fixed electrode set E40 shown in FIG. 36 (the gray hatching are provided to illustrate the electrode shapes clearly and do not indicate cross sections).

That is, as the wiring provided to fixed electrodes E31, E32, E41, and E42 among the wiring shown in FIG. 30 for detection of a force Fx, wiring are provided to fixed electrodes E31(Fx), E32(Fx), E41(Fx), and E42(Fx) shown in FIG. 39 and FIG. 40, and as the wiring provided to fixed electrodes E13, E14, E23, and E24 among the wiring shown in FIG. 31 for detection of a force Fy, wiring are provided to fixed electrodes E13(Fy), E14(Fy), E23(Fy), and E24(Fy) shown in FIG. 37 and FIG. 38. Also, as the wiring provided to fixed electrodes E15, E25, E35, and E45 among the wiring shown in FIG. 32 for detection of a force Fz, wiring are provided to fixed electrodes E15(Fz), E25(Fz), E35(Fz), and E45(Fz) shown in FIG. 37 to FIG. 40. Meanwhile, as the wiring provided to fixed electrodes E35 and E45 among the wiring shown in FIG. 33 for detection of a moment Mx, wiring are provided to fixed electrodes E35(Mx) and E45 (Mx) shown in FIG. 39 and FIG. 40, and as the wiring provided to fixed electrodes E15 and E25 among the wiring shown in FIG. 34 for detection of a moment My, wiring are provided to fixed electrodes E15(My) and E25(My) shown in FIG. 37 and FIG. 38. Furthermore, as the wiring provided to fixed electrodes E13, E14, E23, E24, E31, E32, E41, and E42 among the wiring shown in FIG. 35 for detection of a moment Mz, wiring are provided to fixed electrodes E13 (Mz), E14(Mz), E23(Mz), E24(Mz), E31(Mz), E32(Mz), E41(Mz), and E42(Mz) shown in FIG. 37 to FIG. 40.

<<<Section 7. Embodiments Having an Auxiliary Base Plate Added>>>

As can be understood from the six equations of FIG. 15 that illustrate the detection principles of the first embodiment, addition and subtraction of static capacitance values are carried out. As was mentioned above, the additions in these equations are not carried out by actually performing computations but are carried out by means of wiring that connect capacitance elements in parallel. That is, with this invention, a plurality of capacitance elements that are to be subject to addition are made to belong to the same group and connected in parallel to each other, and the detection of a force or moment is carried out based on the difference between the overall capacitance value of the set of capacitance elements belonging to one group and the overall capacitance value of the set of capacitance elements belonging to another group. All of the wiring shown in FIG. 16, FIG. 17, FIG. 19, FIG. 20, and FIG. 21 are provided with two terminals, and the detection of a predetermined force is enabled based on the difference in the electrical signals obtained from these two terminals.

However, for the wiring shown in FIG. 18 for detecting a force Fz, only one terminal Tfz is provided. This is because subtraction of a capacitance element is not carried out for the detection of a force Fz as can be understood from the equation in FIG. 15 concerning a force Fz. The negative sign attached to the front of this equation is due to the manner in which the coordinate axis defined and indicates that when a force +Fz in the positive Z-axis direction acts, the detected value (sum of the static capacitance values C15, C25, C35, and C45) decreases with respect to a reference value and when a force −Fz in the negative Z-axis direction acts, the detected value increases with respect to the reference value.

Put in another way, among the six force components indicated by the six equations in FIG. 15, whereas each of the force components besides Fz is obtained as a difference between two static capacitance values, just the force Fz is not an amount that is obtained as a difference. This signifies that in the state in which no forces that are to be detected are acting whatsoever, whereas the detection values of the forces Fx, Fy, Mx, My, and Mz will be output as 0, the detection value of the force Fz will not be 0 but will be output as a predetermined reference value. Obviously, if this reference value is measured in advance and the detection value of the force Fz is arranged to be output as the difference with respect to this reference value, there will be no problems in principle.

However in terms of practical use, there is an important difference between the method of obtaining a detection value as a difference between the static capacitance values of two capacitance elements existing within a device and the method of obtaining a detection value as a difference between the static capacitance value of a single capacitance element group and a predetermined reference value. That is, whereas use of the former method provides the merit that error factors are canceled out even if there is some scattering of dimensional precision among individual lots, such a merit is not provided with the latter method. Also, dimensional fluctuations due to thermal expansion of the respective parts occur according to the temperature conditions of the environment in which this force detection device is used, and whereas the former method provides the merit that the influences of such dimensional fluctuations are canceled out, such a merit is not provided with the latter method.

In consideration of these points, it is preferable for practical use to employ, as much as possible, the method of obtaining a detection value as a difference of static capacitance values of two capacitance element groups that exist within a device. It is thus preferable to enable the realization of detection by a difference of some form for the detection of a force Fz as well. The embodiment to be described here realizes this by the provision of an auxiliary base plate.

Figure 41:
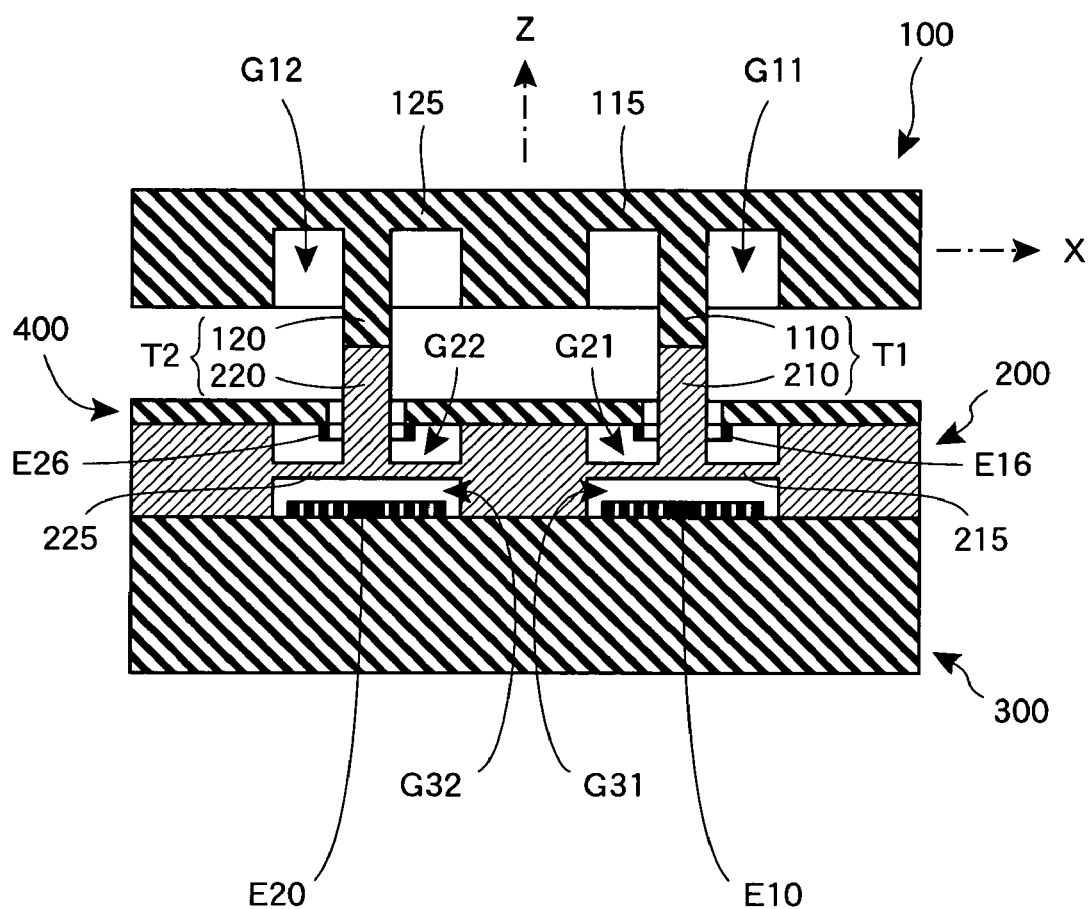
FIG. 41 is a side view in section showing a modification example wherein an auxiliary base plate 400 is added further to the force detection of the first embodiment, of which the side view in section is shown in FIG. 10.

FIG. 41 is a side view in section showing the arrangement of a force detection device of this embodiment that uses an auxiliary base plate. The basic structure of this embodiment is substantially the same as the structure of the force detection device of the first embodiment shown in FIG. 10, and a top view thereof is equivalent to the top view shown in FIG. 9. FIG. 41 is a side view in section along the position corresponding to sectioning line 10—10 of FIG. 9 of the force detection device of this modification example that uses an auxiliary base plate. This embodiment shown in FIG. 41 differs from the embodiment shown in FIG. 10 in the following two points.

The first difference is that whereas a total of twenty fixed electrodes are formed as shown in FIG. 13 on supporting member 300 in the embodiment of FIG. 10, a total of thirty six fixed electrodes (fixed electrode sets E10, E20, E30, and E40) are formed on supporting member 300 in the embodiment of FIG. 41 as shown in FIG. 22. This is done in consideration of enabling the detection of all six force components as was described already in Section 4.

Figure 42:
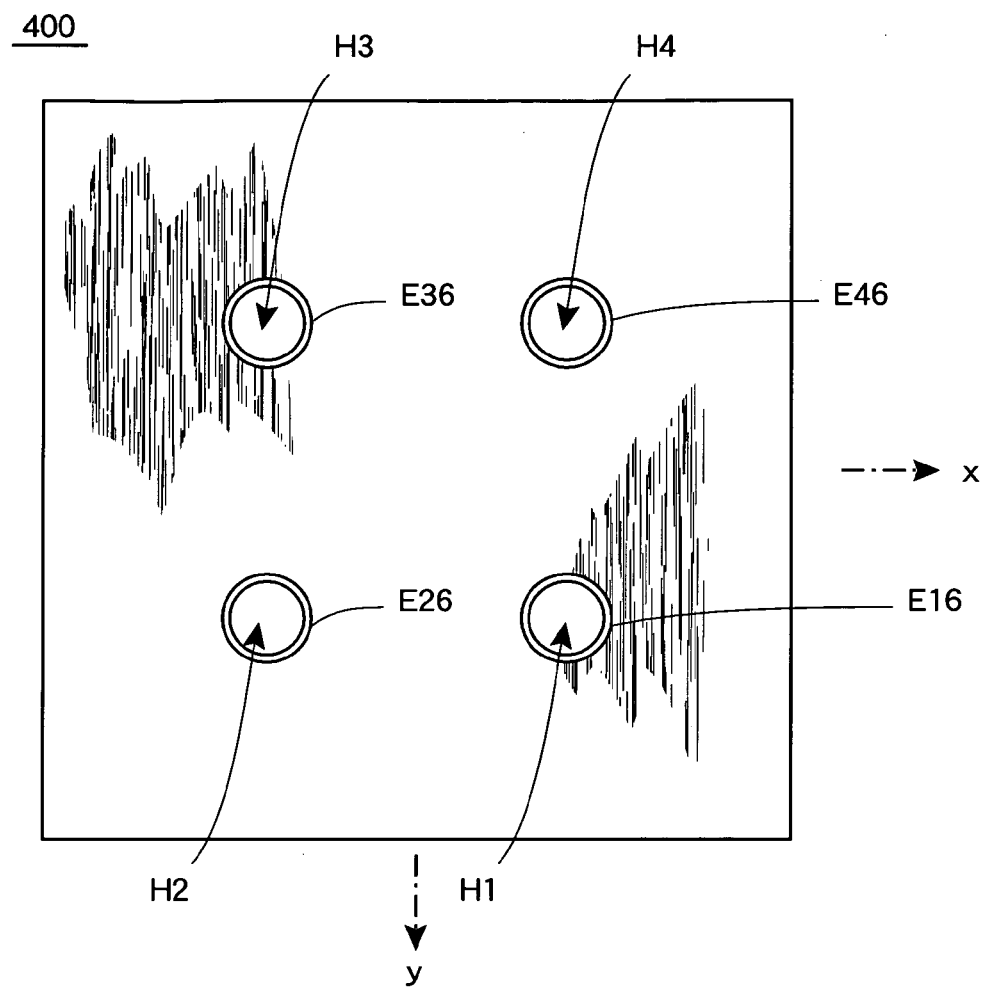
FIG. 42 is a bottom view of auxiliary base plate 400 used in the modification example shown in FIG. 41.

The second difference, which is a difference concerning an essential characteristic of this embodiment to be described in Section 7, is that an auxiliary base plate 400, having fixed electrodes E16, E26, E36, and E46 disposed on the bottom surface thereof, is disposed on the top surface of intermediate member 200 (intermediate member 200 is also made slightly smaller in thickness). FIG. 42 is a bottom view of this auxiliary base plate 400. As illustrated, auxiliary base plate 400 has formed therein openings H1 to H4 for passing through force transmitting members T1 to T4. The diameters of these openings H1 to H4 are set to be slightly greater than the diameters of force transmitting members T1 to T4 so that even when force transmitting members T1 to T4 become inclined or displaced, they will not contact auxiliary base plate 400.

Auxiliary base plate 400 is formed of an insulating material and is joined to the top surface of intermediate member 200. In other words, auxiliary base plate 400 is fixed via intermediate member 200 to supporting member 300 so as to be disposed above diaphragms 215, 225, 235, and 245.

Figure 43:
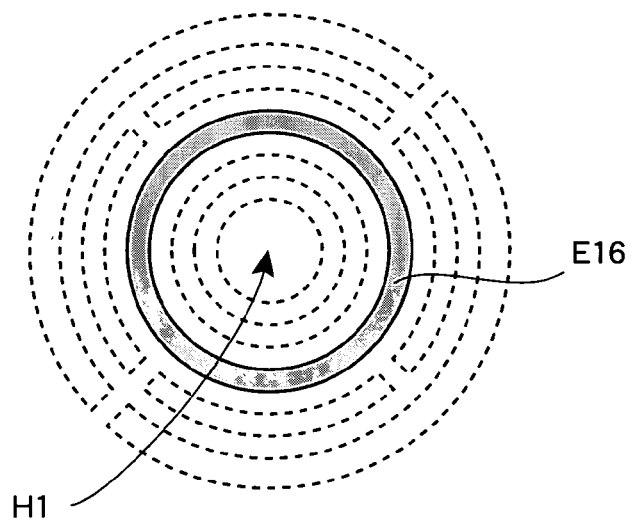
FIG. 43 is an enlarged plan view showing the shape and arrangement of a fixed electrode E16 shown in FIG. 42.

As shown in FIG. 42, annular fixed electrodes E16, E26, E36, and E46 are formed at the respective circumferences of openings H1 to H4. FIG. 43 is an enlarged plan view showing the shape and position of this annular fixed electrode E16, and the broken lines indicate a projection image formed by the projection of the outline of fixed electrode set E10, shown in FIG. 23, onto auxiliary base plate 400. Opening H1 is formed at the inner side of fixed electrode E16. As can be understood from a comparison with FIG. 23, fixed electrode E16 is an annular electrode of the same shape and same size as fixed electrode E15(Fz) and is positioned at a position at which it opposes fixed electrode E15(Fz) from above. Likewise, fixed electrodes E26, E36, and E46, formed on the bottom surface of auxiliary base plate 400, are respectively annular electrodes of the same shape and same size as fixed electrodes E25(Fz), E35(Fz), and E45(Fz), shown in FIG. 24, FIG. 25, and FIG. 26, and are positioned at positions at which they respectively oppose these fixed electrodes from above.

The four fixed electrodes E16, E26, E36, and E46, formed at the auxiliary base plate 400, and the opposing parts of diaphragms 215, 225, 235, and 245, which are formed of conductive material, respectively form capacitance elements C16, C26, C36, and C46. This embodiment is thus provided with a total of forty fixed electrodes, of which thirty six are formed on the top surface of supporting member 300 (see FIG. 22) and the remaining four are formed on the bottom surface of auxiliary base plate 400 (see FIG. 42). As a result, a total of thirty six capacitance elements are positioned below diaphragms 215, 225, 235, and 245 and four auxiliary capacitance elements are positioned above diaphragms 215, 225, 235, and 245.

As with capacitance elements C15, C25, C35, and C45, capacitance elements C16, C26, C36, and C46 are used to detect a force Fz. However, the increase/decrease of the static capacitance values of capacitance elements C16, C26, C36, and C46 will be exactly opposite the increase/decrease of the static capacitance values of capacitance elements C15, C25, C35, and C45. This can be understood readily from the side view in section of FIG. 41. For example, when a positive Z-axis direction force +Fz is applied to force receiving member 100, since force transmitting members T1 to T4 will be displaced upwards in the Figure and diaphragms 215, 225, 235, and 245 will also be displaced upwards, all of capacitance elements C15, C25, C35, and C45, which are formed below these diaphragms, will become wider in electrode interval and decrease in static capacitance value while all of capacitance elements C16, C26, C36, and C46, which are formed above the diaphragms, will become narrower in electrode interval and increase in static capacitance value. Exactly the opposite phenomena will occur in the case where a negative Z-axis direction force −Fz is applied to force receiving member 100.

Thus with the force detection device of this embodiment, the equation:

$$Fz = (C16 + C26 + C36 + C46) - (C15 + C25 + C35 + C45)$$

may be used as the equation for detecting a force Fz in place of the equation for a force Fz shown in FIG. 15. This detection is based on the difference between the static capacitance value of the entirety of a set of capacitance elements belonging to one group and the static capacitance value of the entirety of a set of capacitance elements belonging to another group, and, as mentioned above, can provide the merit of canceling out errors due to differences in dimensional precision according to lot and errors due to temperature variations. As with the wiring shown in FIG. 18 for the four fixed electrodes E15, E25, E35, and E45, the wiring for the four fixed electrodes E16, E26, E36, and E46 shown in FIG. 42 may be a wiring with which all electrodes are connected to a single terminal.

Such wiring can thus be regarded as being wiring wherein Z-axis displacement detection capacitance elements C15, C25, C35, and C45, positioned at positions of undergoing changes such that the electrode intervals widen as a whole when the force transmitting members become displaced in the positive Z-axis direction and undergoing changes such that, with each capacitance element, a part of the electrode intervals narrows while another part widens when the corresponding force transmitting member becomes inclined, are grouped as one group, Z-axis displacement detection capacitance elements C16, C26, C36, and C46, positioned at positions of undergoing changes such that the electrode intervals oppositely narrow as a whole when the force transmitting members become displaced in the positive Z-axis direction and undergoing changes such that, with each capacitance element, a part of the electrode intervals narrows while another part widens when the corresponding force transmitting member becomes inclined, are grouped as another group, and the plurality of capacitance elements belonging to the same group are connected in parallel to each other. And by providing such wiring, a Z-axis direction force Fz that acts on the force receiving member can be detected from the difference between the overall static capacitance value of the set of Z-axis displacement detection capacitance elements belonging to one group and the overall static capacitance value of the set of Z-axis displacement detection capacitance elements belonging to the other group.

Z-axis displacement detection capacitance elements C16, C26, C36, and C46, formed using auxiliary base plate 400, may also be used in the detection of moments Mx and My. According to the equation shown in the lower part of FIG. 19 and the equation shown in the lower part of FIG. 20, the detections of Mx and My are detections based on the difference between the overall static capacitance value of the set of capacitance elements belonging to one group and the overall static capacitance value of the set of capacitance elements belonging to another group, and thus provide the merit of improved detection precision. However, by adding capacitance elements C16, C26, C36, and C46 to the detection operation, detection based on the static capacitance values of a total of eight capacitance elements is enabled and the detection precision can thus be improved further.

As mentioned above, in regard to the displacement of the force transmitting members in the Z-axis direction, the increase/decrease of the capacitance values of capacitance elements C16, C26, C36, and C46 are exactly reverse the increase/decrease of the capacitance values of capacitance elements C15, C25, C35, and C45. Thus in order to detect a moment Mx, the equation:

$$Mx = (C35 + C45 + C16 + C26) - (C15 + C25 + C36 + C46)$$

may be used in place of the equation for a moment Mx that is shown in the lower part of FIG. 19. For example, fixed electrodes E16, E26, E36, and E46, respectively of the same shape and same size as the four fixed electrodes E15, E25, E35, and E45, shown in FIG. 19, are positioned at positions of the bottom face of auxiliary base plate 400 that correspond to the fixed electrodes E15, E25, E35, and E45 (such positioning however is not possible in actuality due to the existence of openings H1 to H4 as shall be described below), wiring are provided to connect fixed electrodes E16 and E26 to a terminal Tmx3 and connect fixed electrodes E36 and E46 to a terminal Tmx4, and in the final stage, terminal Tmx3 is connected to terminal Tmx2, shown in FIG. 19, and terminal Tmx4 is connected to terminal Tmx1, shown in FIG. 19. In the case where the electrode configuration on the supporting member 300 takes on the form shown in FIG. 22, fixed electrodes E16(Mx), E26(Mx), E36(Mx), and E46(Mx) of the same shape and same size as fixed electrodes E15(Mx), E25(Mx), E35(Mx), and E45(Mx), shown in FIG. 23 to FIG. 26, are formed on the auxiliary base plate 400. However in actuality, since openings H1 to H4 are formed in auxiliary base plate 400, fixed electrodes of the same shape and same size cannot be formed. Thus for practical use, the shape and size of the electrodes formed on supporting member 300 will have to be modified somewhat.

Such wiring can thus be regarded as being wiring wherein Z-axis displacement detection capacitance element C15, which is positioned at a position of undergoing a change such that the electrode interval widens as a whole when first force transmitting member T1 becomes displaced in the positive Z-axis direction and undergoing a change such that the electrode interval narrows at one part and widens at another part when first force transmitting member T1 becomes inclined, Z-axis displacement detection capacitance element C25, which is positioned at a position of undergoing a change such that the electrode interval widens as a whole when second force transmitting member T2 becomes displaced in the positive Z-axis direction and undergoing a change such that the electrode interval narrows at one part and widens at another part when second force transmitting member T2 becomes inclined, Z-axis displacement detection capacitance element C36, which is positioned at a position of undergoing a change such that the electrode interval narrows as a whole when third force transmitting member T3 becomes displaced in the positive Z-axis direction and undergoing a change such that the electrode interval narrows at one part and widens at another part when third force transmitting member T3 becomes inclined, and Z-axis displacement detection capacitance element C46, which is positioned at a position of undergoing a change such that the electrode interval narrows as a whole when fourth force transmitting member T4 becomes displaced in the positive Z-axis direction and undergoing a change such that the electrode interval narrows at one part and widens at another part when fourth force transmitting member T4 becomes inclined, are grouped as one group, Z-axis displacement detection capacitance element C16, which is positioned at a position of undergoing a change such that the electrode interval narrows as a whole when first force transmitting member T1 becomes displaced in the positive Z-axis direction and undergoing a change such that the electrode interval narrows at one part and widens at another part when first force transmitting member T1 becomes inclined, Z-axis displacement detection capacitance element C26, which is positioned at a position of undergoing a change such that the electrode interval narrows as a whole when second force transmitting member T2 becomes displaced in the positive Z-axis direction and undergoing a change such that the electrode interval narrows at one part and widens at another part when second force transmitting member T2 becomes inclined, Z-axis displacement detection capacitance element C35, which is positioned at a position of undergoing a change such that the electrode interval widens as a whole when third force transmitting member T3 becomes displaced in the positive Z-axis direction and undergoing a change such that the electrode interval narrows at one part and widens at another part when third force transmitting member T3 becomes inclined, and Z-axis displacement detection capacitance element C45, which is positioned at a position of undergoing a change such that the electrode interval widens as a whole when fourth force transmitting member T4 becomes displaced in the positive Z-axis direction and undergoing a change such that the electrode interval narrows at one part and widens at another part when fourth force transmitting member T4 becomes inclined, are grouped as another group, and the plurality of capacitance elements belonging to the same group are connected in parallel to each other. And by providing such wiring, a moment Mx about the X-axis that acts on the force receiving member can be detected from the difference between the overall static capacitance value of the set of Z-axis displacement detection capacitance elements belonging to one group and the overall static capacitance value of the set of Z-axis displacement detection capacitance elements belonging to the other group.

Also, in order to detect a moment My, the equation:

$$My = (C15 + C45 + C26 + C36) - (C25 + C35 + C16 + C46)$$

may be used in place of the equation for a moment My that is shown in the lower part of FIG. 20. That is, fixed electrodes E16, E26, E36, and E46 respectively of the same shape and same size as the four fixed electrodes E15, E25, E35, and E45, shown in FIG. 19, are positioned at positions of the bottom face of auxiliary base plate 400 that correspond to fixed electrodes E15, E25, E35, and E45, wiring are provided to connect fixed electrodes E16 and E46 to a terminal Tmy3 and connect fixed electrodes E26 and E36 to a terminal Tmy4, and in the final stage, terminal Tmy3 is connected to terminal Tmy2, shown in FIG. 20, and terminal Tmy4 is connected to terminal Tmy1, shown in FIG. 20. In the case where the electrode configuration on the supporting member 300 takes on the form shown in FIG. 22, fixed electrodes E16(My), E26(My), E36(My), and E46(My) of the same shape and same size as fixed electrodes E15(My), E25(My), E35(My), and E45(My), shown in FIG. 23 to FIG. 26, are essentially formed on the auxiliary base plate 400. However in actuality, since openings H1 to H4 are formed in auxiliary base plate 400, fixed electrodes of the same shape and same size cannot be formed. Thus for practical use, the shape and size of the electrodes formed on supporting member 300 will have to be modified somewhat.

Such wiring can thus be regarded as being wiring wherein Z-axis displacement detection capacitance element C15, which is positioned at a position of undergoing a change such that the electrode interval widens as a whole when first force transmitting member T1 becomes displaced in the positive Z-axis direction and undergoing a change such that the electrode interval narrows at one part and widens at another part when first force transmitting member T1 becomes inclined, Z-axis displacement detection capacitance element C26, which is positioned at a position of undergoing a change such that the electrode interval narrows as a whole when second force transmitting member T2 becomes displaced in the positive Z-axis direction and undergoing a change such that the electrode interval narrows at one part and widens at another part when second force transmitting member T2 becomes inclined, Z-axis displacement detection capacitance element C36, which is positioned at a position of undergoing a change such that the electrode interval narrows as a whole when third force transmitting member T3 becomes displaced in the positive Z-axis direction and undergoing a change such that the electrode interval narrows at one part and widens at another part when third force transmitting member T3 becomes inclined, and Z-axis displacement detection capacitance element C45, which is positioned at a position of undergoing a change such that the electrode interval widens as a whole when fourth force transmitting member T4 becomes displaced in the positive Z-axis direction and undergoing a change such that the electrode interval narrows at one part and widens at another part when fourth force transmitting member T4 becomes inclined, are grouped as one group, Z-axis displacement detection capacitance element C16, which is positioned at a position of undergoing a change such that the electrode interval narrows as a whole when first force transmitting member T1 becomes displaced in the positive Z-axis direction and undergoing a change such that the electrode interval narrows at one part and widens at another part when first force transmitting member T1 becomes inclined, Z-axis displacement detection capacitance element C25, which is positioned at a position of undergoing a change such that the electrode interval widens as a whole when second force transmitting member T2 becomes displaced in the positive Z-axis direction and undergoing a change such that the electrode interval narrows at one part and widens at another part when second force transmitting member T2 becomes inclined, Z-axis displacement detection capacitance element C35, which is positioned at a position of undergoing a change such that the electrode interval widens as a whole when third force transmitting member T3 becomes displaced in the positive Z-axis direction and undergoing a change such that the electrode interval narrows at one part and widens at another part when third force transmitting member T3 becomes inclined, and Z-axis displacement detection capacitance element C46, which is positioned at a position of undergoing a change such that the electrode interval narrows as a whole when fourth force transmitting member T4 becomes displaced in the positive Z-axis direction and undergoing a change such that the electrode interval narrows at one part and widens at another part when fourth force transmitting member T4 becomes inclined, are grouped as another group, and the plurality of capacitance elements belonging to the same group are connected in parallel to each other. And by providing such wiring, a moment My about the Y-axis that acts on the force receiving member can be detected from the difference between the overall static capacitance value of the set of Z-axis displacement detection capacitance elements belonging to one group and the overall static capacitance value of the set of Z-axis displacement detection capacitance elements belonging to the other group.

Though an embodiment in which an auxiliary base plate is added was described above using examples of application to the first embodiment described in Section 3 and Section 4, this embodiment of adding an auxiliary base plate may likewise be applied to the second embodiment described in Section 5 and Section 6.

For example, though with the force detection device of the second embodiment, the equation, $Fz=-(C15+C25+C35+C45)$ is defined at the lower part of FIG. 32 as the equation for detection of a force Fz, by providing auxiliary base plate 400 in the same manner as in the above-described examples and forming capacitance elements C16, C26, C36, and C46 at positions above capacitance elements C15, C25, C35, and C45, respectively, a force Fz can be detected by the following equation:

$$Fz = (C16 + C26 + C36 + C46) - (C15 + C25 + C35 + C45)$$

Obviously, even in the case where auxiliary plate 400 is provided in the force detection device of the second embodiment, Z-axis displacement detection capacitance elements C16, C26, C36, and C46, formed using auxiliary base plate 400, may be used for the detection of moments Mx and My. Though the equation shown in the lower part of FIG. 33 and the equation shown in the lower part of FIG. 34 show that the each of the detections of moments Mx and My is a detection based on difference between the static capacitance values of two capacitance elements, by adding capacitance elements C16, C26, C36, and C46 to the detection operation, detection based on the static capacitance values of a total of four capacitance elements is enabled and the detection precision can thus be improved further.

For example, in order to detect a moment Mx, the equation:

$$Mx = (C45 + C36) - (C35 + C46)$$

may be used. That is, fixed electrodes E36 and E46, respectively of the same shape and same size as the two fixed electrodes E35 and E45, shown in FIG. 33, are provided at positions of the bottom face of auxiliary base plate 400 that correspond to fixed electrodes E35 and E45, wiring are provided to connect fixed electrode E36 to a terminal Tmx3 and connect fixed electrode E46 to a terminal Tmx4, and in the final stage, terminal Tmx3 is connected to terminal Tmx2, shown in FIG. 33, and terminal Tmx4 is connected to terminal Tmx1, shown in FIG. 33. In the case where the electrode configuration on the supporting member 300 takes on the form shown in FIG. 36, fixed electrodes E36(Mx) and E46(Mx) of the same shape and same size as fixed electrodes E35(Mx) and E45(Mx), shown in FIG. 39 and FIG. 40, are formed on the auxiliary base plate 400. However in actuality, due to the existence of openings H3 and H4, fixed electrodes of the same shape and same size cannot be formed. Measures, such as making the fixed electrodes E35, E45, E35(Mx), and E45(Mx), to be formed on the supporting member 300, have an annular shape instead of a circular shape, etc., will thus be required.

Such wiring can thus be regarded as being wiring wherein Z-axis displacement detection capacitance element C35, which is positioned at a position of undergoing a change such that the electrode interval widens as a whole when third force transmitting member T3 becomes displaced in the positive Z-axis direction and undergoing a change such that the electrode interval narrows at one part and widens at another part when third force transmitting member T3 becomes inclined, and Z-axis displacement detection capacitance element C46, which is positioned at a position of undergoing a change such that the electrode interval narrows as a whole when fourth force transmitting member T4 becomes displaced in the positive Z-axis direction and undergoing a change such that the electrode interval narrows at one part and widens at another part when fourth force transmitting member T4 becomes inclined, are grouped as one group, Z-axis displacement detection capacitance element C36, which is positioned at a position of undergoing a change such that the electrode interval narrows as a whole when third force transmitting member T3 becomes displaced in the positive Z-axis direction and undergoing a change such that the electrode interval narrows at one part and widens at another part when third force transmitting member T3 becomes inclined, and Z-axis displacement detection capacitance element C45, which is positioned at a position of undergoing a change such that the electrode interval widens as a whole when fourth force transmitting member T4 becomes displaced in the positive Z-axis direction and undergoing a change such that the electrode interval narrows at one part and widens at another part when fourth force transmitting member T4 becomes inclined, are grouped as another group, and the plurality of capacitance elements belonging to the same group are connected in parallel to each other. And by providing such wiring, a moment Mx about the X-axis that acts on the force receiving member can be detected from the difference between the overall static capacitance value of the set of Z-axis displacement detection capacitance elements belonging to one group and the overall static capacitance value of the set of Z-axis displacement detection capacitance elements belonging to the other group.

Also for the detection of a moment My, the equation:

$$My = (C15 + C26) - (C25 + C16)$$

may be used in place of the equation for a moment My that is shown in the lower part of FIG. 34. That is, fixed electrodes E16 and E26 respectively of the same shape and same size as the two fixed electrodes E15 and E25, shown in FIG. 34, are provided at positions of the bottom face of auxiliary base plate 400 that correspond to fixed electrodes E15 and E25, wiring are provided to connect fixed electrode E16 to a terminal Tmy3 and connect fixed electrode E26 to a terminal Tmy4, and in the final stage, terminal Tmy3 is connected to terminal Tmy2, shown in FIG. 34, and terminal Tmy4 is connected to terminal Tmy1, shown in FIG. 34. In the case where the electrode configuration on the supporting member 300 takes on the form shown in FIG. 36, fixed electrodes E16(My) and E26(My) of the same shape and same size as fixed electrodes E15(My) and E25(My), shown in FIG. 37 and FIG. 38, are formed on the auxiliary base plate 400. However in actuality, due to the existence of openings H1 and H2, fixed electrodes of the same shape and same size cannot be formed. Measures, such as making the fixed electrodes E15, E25, E15(My), and E25(My), to be formed on the supporting member 300, have an annular shape instead of a circular shape, etc., will thus be required.

Such wiring can thus be regarded as being wiring wherein Z-axis displacement detection capacitance element C15, which is positioned at a position of undergoing a change such that the electrode interval widens as a whole when first force transmitting member T1 becomes displaced in the positive Z-axis direction and undergoing a change such that the electrode interval narrows at one part and widens at another part when first force transmitting member T1 becomes inclined, and Z-axis displacement detection capacitance element C26, which is positioned at a position of undergoing a change such that the electrode interval narrows as a whole when second force transmitting member T2 becomes displaced in the positive Z-axis direction and undergoing a change such that the electrode interval narrows at one part and widens at another part when second force transmitting member T2 becomes inclined, are grouped as one group, Z-axis displacement detection capacitance element C16, which is positioned at a position of undergoing a change such that the electrode interval narrows as a whole when first force transmitting member T1 becomes displaced in the positive Z-axis direction and undergoing a change such that the electrode interval narrows at one part and widens at another part when first force transmitting member T1 becomes inclined, and Z-axis displacement detection capacitance element C25, which is positioned at a position of undergoing a change such that the electrode interval widens as a whole when second force transmitting member T2 becomes displaced in the positive Z-axis direction and undergoing a change such that the electrode interval narrows at one part and widens at another part when second force transmitting member T2 becomes inclined, are grouped as another group, and the plurality of capacitance elements belonging to the same group are connected in parallel to each other. And by providing such wiring, a moment My about the Y-axis that acts on the force receiving member can be detected from the difference between the overall static capacitance value of the set of Z-axis displacement detection capacitance elements belonging to one group and the overall static capacitance value of the set of Z-axis displacement detection capacitance elements belonging to the other group.

<<<Section 8. Modification Examples of this Invention>>>

Though this invention has been described above based on the illustrated embodiments, this invention is not limited to these embodiments and may be carried out in various other modes. For example, though in the above-described embodiments, the diaphragm is formed of a conductive material and the diaphragm itself is used as a common displaceable electrode, in a case where the diaphragm is formed of an insulating material, a conductive film may be formed on its bottom surface and used as a common displaceable electrode. Obviously, in place of using just one common displaceable electrode, individual displaceable electrodes opposing the respective fixed electrodes may be used instead.

Though in the above-described embodiments, connecting members (specifically, thin parts of the plate-like force receiving member) with flexibility are provided at the parts at which the respective force transmitting members are connected to the force receiving member, the upper ends of the respective force transmitting members do not necessarily have to be connected to the force receiving member via connecting members with flexibility. If the forces and moments that are to be detected can be made to act on the force receiving member without impediment, a form in which the upper ends of the respective force transmitting members are directly connected to the force receiving member may be taken. However for practical use, it is preferable, for making the forces and moments that are to be detected act without impediment, to connect the upper ends of the respective force transmitting members via connecting members with flexibility to the force receiving member and thereby arrange a structure in which the force transmitting members can be displaced with some degree of freedom with respect to the force receiving member as in the embodiments described above.

Though with the embodiments described up until now, the four force transmitting members and the connecting members thereof are positioned at positions that are symmetrical (positions that are line symmetrical with respect to specific coordinate axis) in a coordinate system with which the origin is set at the center of a square-shaped force receiving member 100 and were all made the same in material and size, these do not have to be positioned necessarily at symmetrical positions and do not have to be made the same in material and size. Obviously, it is also not necessary to prepare sensors of the same type. For example, though with the first embodiment, four force transmitting members are positioned at the four vertex positions of a square, in principle, for detection of the six components of force, the four force transmitting members may be positioned arbitrarily as long as three or more of the four force transmitting members are not positioned along the same plane. However, if the four force transmitting members are not positioned symmetrically with respect to the coordinate system or are not the same in material or size or the individual sensors differ in structure or in size, differences in detection sensitivity will arise among the respective capacitance elements and since some form of correction will be necessary in order to perform detection at high precision, it is preferable, in practical terms, to employ the above-described embodiments.

Though with the present Application, the terms "force receiving member" and "supporting member" are used, this is intended for a general form of use in which the supporting member is put in a fixed state and the forces that are to be detected are made to act on the force receiving member. However, the form of use of this invention's force detection device is not limited to such a form, and a form of use, wherein the force receiving member is oppositely put in a fixed state and the forces that are to be detected are made to act on the supporting member, is also possible. In general, a force detection device has the function of detecting a force acting on a second location in a state in which a first location is fixed, and the phenomenon of detecting forces acting on the force receiving member with the supporting member being put in a fixed state is essentially equivalent to the phenomenon of detecting forces acting on the supporting member with the force receiving member being put in a fixed state.

Also though with the above-described embodiments, sensors for detecting inclinations and displacements of force transmitting members are disposed only at the supporting member side, such sensors may be disposed at the force receiving member side as well to enable inclinations and displacements of the force transmitting members to be detected at both ends thereof and forces and moments may thereby be detected based on the detection results of both the supporting member side and the force receiving member side. By performing such detection, detection operations of higher precision are made possible.

As described above, with this invention's force detection device, forces and moments can be detected in a distinguishing manner by a structure that is as simple as possible.

INDUSTRIAL APPLICABILITY

This invention is optimal for applications in which forces and moments are to be detected independent of each other and can be used in various fields, such as in devices for controlling the operations of robots and industrial machines, man-machine interfaces of input devices for electronic equipment, etc.

The invention claimed is:
1. A force detection device comprising:
a force receiving member (10; 100), receiving forces to be detected;
a supporting member (20; 300), positioned below the force receiving member;
a first force transmitting member (11; T1), having an upper end thereof connected to said force receiving member and a lower end thereof connected via a connecting member (215), having flexibility, to said supporting member;
a second force transmitting member (12; T2), having an upper end thereof connected to said force receiving member and a lower end thereof connected via a connecting member (225), having flexibility, to said supporting member;

a third force transmitting member (13; T3), having an upper end thereof connected to said force receiving member and a lower end thereof connected via a connecting member (235), having flexibility, to said supporting member;

a fourth force transmitting member (14; T4), having an upper end thereof connected to said force receiving member and a lower end thereof connected via a connecting member (245), having flexibility, to said supporting member;

a first sensor (21; S1) having capacitance elements (C11 to C15) each of which comprises a fixed electrode (E11 to E15), fixed to said supporting member, and a displaceable electrode (215), fixed to a displaceable surface that becomes displaced in accordance to a displacement of a lower part of said first force transmitting member;

a second sensor (22; S2) having capacitance elements (C21 to C25) each of which comprises a fixed electrode (E21 to E25), fixed to said supporting member, and a displaceable electrode (225), fixed to a displaceable surface that becomes displaced in accordance to a displacement of a lower part of said second force transmitting member;

a third sensor (23; S3) having capacitance elements (C31 to C35) each of which comprises a fixed electrode (E31 to E35), fixed to said supporting member, and a displaceable electrode (235), fixed to a displaceable surface that becomes displaced in accordance to a displacement of a lower part of said third force transmitting member;

a fourth sensor (24; S4) having capacitance elements (C41 to C45) each of which comprises a fixed electrode (E41 to E45), fixed to said supporting member, and a displaceable electrode (245), fixed to a displaceable surface that becomes displaced in accordance to a displacement of a lower part of said fourth force transmitting member;

wiring, dividing the respective capacitance elements of said first to fourth sensors into a plurality of groups and connecting the plurality of capacitance elements, belonging to the same group, to each other in parallel; and a detection circuit (30), detecting a force or a moment, acting on said force receiving member, based on a difference between an overall static capacitance value of a set of capacitance elements belonging to one group and an overall static capacitance value of a set of capacitance elements belonging to another group.

2. The force detection device according to claim 1, wherein when an XYZ three-dimensional coordinate system with an X-axis, a Y-axis and a Z-axis is defined, each of the first to fourth force transmitting members (T1 to T4) is comprised of a structure having the Z-axis direction as a longitudinal direction, a surface on which the fixed electrodes are formed is a surface parallel to an XY plane, the first sensor (S1) has an "X-axis inclination detection capacitance element, belonging to a first group and being positioned at a position at which an electrode interval narrows when the first force transmitting member (T1) becomes inclined in a positive X-axis direction" (C11), and an "X-axis inclination detection capacitance element, belonging to a second group and being positioned at a position at which an electrode interval widens when the first force transmitting member (T1) becomes inclined in the positive X-axis direction" (C12), the second sensor (S2) has an "X-axis inclination detection capacitance element, belonging to the first group and being positioned at a position at which an electrode interval narrows when the second force transmitting member (T2) becomes inclined in the positive X-axis direction" (C21), and an "X-axis inclination detection capacitance element, belonging to the second group and being positioned at a position at which an electrode interval widens when the second force transmitting member (T2) becomes inclined in the positive X-axis direction" (C22), the third sensor (S3) has an "X-axis inclination detection capacitance element, belonging to the first group and being positioned at a position at which an electrode interval narrows when the third force transmitting member (T3) becomes inclined in the positive X-axis direction" (C31), and an "X-axis inclination detection capacitance element, belonging to the second group and being positioned at a position at which an electrode interval widens when the third force transmitting member (T3) becomes inclined in the positive X-axis direction" (C32), the fourth sensor (S4) has an "X-axis inclination detection capacitance element, belonging to the first group and being positioned at a position at which an electrode interval narrows when the fourth force transmitting member (T4) becomes inclined in the positive X-axis direction" (C41), and an "X-axis inclination detection capacitance element, belonging to the second group and being positioned at a position at which an electrode interval widens when the fourth force transmitting member (T4) becomes inclined in the positive X-axis direction" (C42), and the detection circuit (30) has a function of detecting a force Fx in the X-axis direction, which acts on the force receiving member, by a difference between an overall static capacitance value of a set of X-axis inclination detection capacitance elements belonging to the first group and an overall static capacitance value of a set of X-axis inclination detection capacitance elements belonging to the second group.

3. The force detection device according to claim 2, wherein the first sensor (S1) furthermore has a "Y-axis inclination detection capacitance element, belonging to a third group and being positioned at a position at which an electrode interval narrows when the first force transmitting member (T1) becomes inclined in a positive Y-axis direction" (C13), and a "Y-axis inclination detection capacitance element, belonging to a fourth group and being positioned at a position at which an electrode interval widens when the first force transmitting member (T1) becomes inclined in the positive Y-axis direction" (C14), the second sensor (S2) furthermore has a "Y-axis inclination detection capacitance element, belonging to the third group and being positioned at a position at which an electrode interval narrows when the second force transmitting member (T2) becomes inclined in the positive Y-axis direction" (C23), and a "Y-axis inclination detection capacitance element, belonging to the fourth group and being positioned at a position at which an electrode interval widens when the second force transmitting member (T2) becomes inclined in the positive Y-axis direction" (C24), the third sensor (S3) furthermore has a "Y-axis inclination detection capacitance element, belonging to the third group and being positioned at a position at which an electrode interval narrows when the third force transmitting member (T3) becomes inclined in the positive Y-axis direction" (C33), and a "Y-axis inclination detection capacitance element, belonging to the fourth group and being positioned at a position at which an electrode interval widens when the third force transmitting member (T3) becomes inclined in the positive Y-axis direction" (C34), the fourth sensor (S4) furthermore has a "Y-axis inclination detection capacitance element, belonging to the third group and being positioned at a position at which an electrode interval narrows when the fourth force transmitting member (T4) becomes inclined in the positive Y-axis direction" (C43), and a "Y-axis inclination detection capacitance element, belonging to the fourth group and being positioned at a position at which an electrode interval widens when the fourth force transmitting member (T4) becomes inclined in the positive Y-axis direction" (C44), and the detection circuit (30) has a function of detecting a force Fy in the Y-axis direction, which acts on the force receiving member, by a difference between an overall static capacitance value of a set of Y-axis inclination detection capacitance elements belonging to the third group and an overall static capacitance value of a set of Y-axis inclination detection capacitance elements belonging to the fourth group.

4. The force detection device according to claim 2, wherein the first sensor (S1) furthermore has a "Z-axis displacement detection capacitance element, being positioned at a position at which an electrode interval undergoes a change of either narrowing or widening in an overall manner when the first force transmitting member (T1) becomes displaced in the Z-axis direction and at which a change such that the electrode interval narrows at one part but widens at another part occurs when the first force transmitting member (T1) becomes inclined" (C 15), the second sensor (S2) furthermore has a "Z-axis displacement detection capacitance element, being positioned at a position at which an electrode interval undergoes a change of either narrowing or widening in an overall manner when the second force transmitting member (T2) becomes displaced in the Z-axis direction and at which a change such that the electrode interval narrows at one part but widens at another part occurs when the second force transmitting member (T2) becomes inclined" (C25), the third sensor (S3) furthermore has a "Z-axis displacement detection capacitance element, being positioned at a position at which an electrode interval undergoes a change of either narrowing or widening in an overall manner when the third force transmitting member (T3) becomes displaced in the Z-axis direction and at which a change such that the electrode interval narrows at one part but widens at another part occurs when the third force transmitting member (T3) becomes inclined" (C35), the fourth sensor (S4) furthermore has a "Z-axis displacement detection capacitance element, being positioned at a position at which an electrode interval undergoes a change of either narrowing or widening in an overall manner when the fourth force transmitting member (T4) becomes displaced in the Z-axis direction and at which a change such that the electrode interval narrows at one part but widens at another part occurs when the fourth force transmitting member (T4) becomes inclined" (C45), the Z-axis displacement detection capacitance elements of said first to fourth sensors are connected to each other in parallel by a wiring, and the detection circuit (30) has a function of detecting a force Fz in the Z-axis direction, which acts on the force receiving member, by an overall static capacitance value of a set of capacitance elements that are connected in parallel.

5. The force detection device according to claim 1, wherein when an XYZ three-dimensional coordinate system with an X-axis, a Y-axis and a Z-axis is defined, each of the first to fourth force transmitting members (T1 to T4) is comprised of a structure having the Z-axis direction as a longitudinal direction, a surface on which the fixed electrodes are formed is a surface parallel to an XY plane, the first sensor (S1) has a "Z-axis displacement detection capacitance element, belonging to a first group and being positioned at a position at which an electrode interval widens in an overall manner when the first force transmitting member (T1) becomes displaced in a positive Z-axis direction and at which a change such that the electrode interval narrows at one part but widens at another part occurs when the first force transmitting member (T1) becomes inclined" (C15) and a "Z-axis displacement detection capacitance element, belonging to a second group and being positioned at a position at which an electrode interval narrows in an overall manner when the first force transmitting member (T1) becomes displaced in the positive Z-axis direction and at which a change such that the electrode interval narrows at one part but widens at another part occurs when the first force transmitting member (T1) becomes inclined" (C16), the second sensor (S2) has a "Z-axis displacement detection capacitance element, belonging to the first group and being positioned at a position at which an electrode interval widens in an overall manner when the second force transmitting member (T2) becomes displaced in the positive Z-axis direction and at which a change such that the electrode interval narrows at one part but widens at another part occurs when the second force transmitting member (T2) becomes inclined" (C25) and a "Z-axis displacement detection capacitance element, belonging to the second group and being positioned at a position at which an electrode interval narrows in an overall manner when the second force transmitting member (T2) becomes displaced in the positive Z-axis direction and at which a change such that the electrode interval narrows at one part but widens at another part occurs when the second force transmitting member (T2) becomes inclined" (C26), the third sensor (S3) has a "Z-axis displacement detection capacitance element, belonging to the first group and being positioned at a position at which an electrode interval widens in an overall manner when the third force transmitting member (T3) becomes displaced in the positive Z-axis direction and at which a change such that the electrode interval narrows at one part but widens at another part occurs when the third force transmitting member (T3) becomes inclined" (C35) and a "Z-axis displacement detection capacitance element, belonging to the second group and being positioned at a position at which an electrode interval narrows in an overall manner when the third force transmitting member (T3) becomes displaced in the positive Z-axis direction and at which a change such that the electrode interval narrows at one part but widens at another part occurs when the third force transmitting member (T3) becomes inclined" (C36), the fourth sensor (S4) has a "Z-axis displacement detection capacitance element, belonging to the first group and being positioned at a position at which an electrode interval widens in an overall manner when the fourth force transmitting member (T4) becomes displaced in the positive Z-axis direction and at which a change such that the electrode interval narrows at one part but widens at another part occurs when the fourth force transmitting member (T4) becomes inclined" (C45) and a "Z-axis displacement detection capacitance element, belonging to the second group and being positioned at a position at which an electrode interval narrows in an overall manner when the fourth force transmitting member (T4) becomes displaced in the positive Z-axis direction and at which a change such that the electrode interval narrows at one part but widens at another part occurs when the fourth force transmitting member (T4) becomes inclined" (C46), and the detection circuit (30) has a function of detecting a force Fz in the Z-axis direction, which acts on the force receiving member, by a difference between an overall static capacitance value of a set of Z-axis displacement detection capacitance elements belonging to the first group and an overall static capacitance value of a set of Z-axis displacement detection capacitance elements belonging to the second group.

6. The force detection device according to claim 1, wherein when an XYZ three-dimensional coordinate system with an X-axis, a Y-axis and a Z-axis is defined, each of the first to fourth force transmitting members (T1 to T4) is comprised of a structure having the Z-axis direction as a longitudinal direction, a surface on which the fixed electrodes are formed is a surface parallel to an XY plane, the first force transmitting member (T1) is positioned so that a longitudinal direction axis thereof is in the first quadrant of the XY plane, the second force transmitting member (T2) is positioned so that a longitudinal direction axis thereof is in the second quadrant of the XY plane, the third force transmitting member (T3) is positioned so that a longitudinal direction axis thereof is in the third quadrant of the XY plane, and the fourth force transmitting member (T4) is positioned so that a longitudinal direction axis thereof is in the fourth quadrant of the XY plane.

7. The force detection device according to claim 6, wherein the first sensor (S1) has a "Z-axis displacement detection capacitance element, belonging to a first group and being positioned at a position at which an electrode interval undergoes a change of either narrowing or widening in an overall manner when the first force transmitting member (T1) becomes displaced in the Z-axis direction and at which a change such that the electrode interval narrows at one part but widens at another part occurs when the first force transmitting member (T1) becomes inclined" (C15), the second sensor (S2) has a "Z-axis displacement detection capacitance element, belonging to the first group and being positioned at a position at which an electrode interval undergoes a change of either narrowing or widening in an overall manner when the second force transmitting member (T2) becomes displaced in the Z-axis direction and at which a change such that the electrode interval narrows at one part but widens at another part occurs when the second force transmitting member (T2) becomes inclined" (C25), the third sensor (S3) has a "Z-axis displacement detection capacitance element, belonging to a second group and being positioned at a position at which an electrode interval undergoes a change of either narrowing or widening in an overall manner when the third force transmitting member (T3) becomes displaced in the Z-axis direction and at which a change such that the electrode interval narrows at one part but widens at another part occurs when the third force transmitting member (T3) becomes inclined" (C35), the fourth sensor (S4) has a "Z-axis displacement detection capacitance element, belonging to the second group and being positioned at a position at which an electrode interval undergoes a change of either narrowing or widening in an overall manner when the fourth force transmitting member (T4) becomes displaced in the Z-axis direction and at which a change such that the electrode interval narrows at one part but widens at another part occurs when the fourth force transmitting member (T4) becomes inclined" (C45), and the detection circuit (30) has a function of detecting a moment Mx about the X-axis that acts on the force receiving member by a difference between an overall static capacitance value of a set of Z-axis displacement detection capacitance elements belonging to the first group and an overall static capacitance value of a set of Z-axis displacement detection capacitance elements belonging to the second group.

8. The force detection device according to claim 7, wherein the first sensor (S1) furthermore has a "Z-axis displacement detection capacitance element, belonging to a third group and being positioned at a position at which an electrode interval undergoes a change of either narrowing or widening in an overall manner when the first force transmitting member (T1) becomes displaced in the Z-axis direction and at which a change such that the electrode interval narrows at one part but widens at another part occurs when the first force transmitting member (T1) becomes inclined" (C15), the second sensor (S2) furthermore has a "Z-axis displacement detection capacitance element, belonging to a fourth group and being positioned at a position at which an electrode interval undergoes a change of either narrowing or widening in an overall manner when the second force transmitting member (T2) becomes displaced in the Z-axis direction and at which a change such that the electrode interval narrows at one part but widens at another part occurs when the second force transmitting member (T2) becomes inclined" (C25), the third sensor (S3) furthermore has a "Z-axis displacement detection capacitance element, belonging to the fourth group and being positioned at a position at which an electrode interval undergoes a change of either narrowing or widening in an overall manner when the third force transmitting member (T3) becomes displaced in the Z-axis direction and at which a change such that the electrode interval narrows at one part but widens at another part occurs when the third force transmitting member (T3) becomes inclined" (C35), the fourth sensor (S4) furthermore has a "Z-axis displacement detection capacitance element, belonging to the third group and being positioned at a position at which an electrode interval undergoes a change of either narrowing or widening in an overall manner when the fourth force transmitting member (T4) becomes displaced in the Z-axis direction and at which a change such that the electrode interval narrows at one part but widens at another part occurs when the fourth force transmitting member (T4) becomes inclined" (C45), and the detection circuit (30) has a function of detecting a moment My about the Y-axis that acts on the force receiving member by a difference between an overall static capacitance value of a set of Z-axis displacement detection capacitance elements belonging to the third group and an overall static capacitance value of a set of Z-axis displacement detection capacitance elements belonging to the fourth group.

9. The force detection device according to claim 7, wherein the first sensor (S1) furthermore has a "Z-axis displacement detection capacitance element, belonging to a fifth group and being positioned at a position at which an electrode interval undergoes a change of either narrowing or widening in an overall manner when the first force transmitting member (T1) becomes displaced in the Z-axis direction and at which a change such that the electrode interval narrows at one part but widens at another part occurs when the first force transmitting member (T1) becomes inclined" (C15), the second sensor (S2) furthermore has a "Z-axis displacement detection capacitance element, belonging to the fifth group and being positioned at a position at which an electrode interval undergoes a change of either narrowing or widening in an overall manner when the second force transmitting member (T2) becomes displaced in the Z-axis direction and at which a change such that the electrode interval narrows at one part but widens at another part occurs when the second force transmitting member (T2) becomes inclined" (C25), the third sensor (S3) furthermore has a "Z-axis displacement detection capacitance element, belonging to the fifth group and being positioned at a position at which an electrode interval undergoes a change of either narrowing or widening in an overall manner when the third force transmitting member (T3) becomes displaced in the Z-axis direction and at which a change such that the electrode interval narrows at one part but widens at another part occurs when the third force transmitting member (T3) becomes inclined" (C35), the fourth sensor (S4) furthermore has a "Z-axis displacement detection capacitance element, belonging to the fifth group and being positioned at a position at which an electrode interval undergoes a change of either narrowing or widening in an overall manner when the fourth force transmitting member (T4) becomes displaced in the Z-axis direction and at which a change such that the electrode interval narrows at one part but widens at another part occurs when the fourth force transmitting member (T4) becomes inclined" (C45), and the detection circuit (30) has a function of detecting a force Fz in the Z-axis direction, which acts on the force receiving member, by an overall static capacitance value of a set of Z-axis displacement detection capacitance elements belonging to the fifth group.

10. The force detection device according to claim 6, wherein the first sensor (S1) has a "Z-axis displacement detection capacitance element, belonging to a first group and being positioned at a position at which an electrode interval widens in an overall manner when the first force transmitting member (T1) becomes displaced in a positive Z-axis direction and at which a change such that the electrode interval narrows at one part but widens at another part occurs when the first force transmitting member (T1) becomes inclined" (C15) and a "Z-axis displacement detection capacitance element, belonging to a second group and being positioned at a position at which an electrode interval narrows in an overall manner when the first force transmitting member (T1) becomes displaced in the positive Z-axis direction and at which a change such that the electrode interval narrows at one part but widens at another part occurs when the first force transmitting member (T1) becomes inclined" (C16), the second sensor (S2) has a "Z-axis displacement detection capacitance element, belonging to the first group and being positioned at a position at which an electrode interval widens in an overall manner when the second force transmitting member (T2) becomes displaced in the positive Z-axis direction and at which a change such that the electrode interval narrows at one part but widens at another part occurs when the second force transmitting member (T2) becomes inclined" (C25) and a "Z-axis displacement detection capacitance element, belonging to the second group and being positioned at a position at which an electrode interval narrows in an overall manner when the second force transmitting member (T2) becomes displaced in the positive Z-axis direction and at which a change such that the electrode interval narrows at one part but widens at another part occurs when the second force transmitting member (T2) becomes inclined" (C26), the third sensor (S3) has a "Z-axis displacement detection capacitance element, belonging to the second group and being positioned at a position at which an electrode interval widens in an overall manner when the third force transmitting member (T3) becomes displaced in the positive Z-axis direction and at which a change such that the electrode interval narrows at one part but widens at another part occurs when the third force transmitting member (T3) becomes inclined" (C35) and a "Z-axis displacement detection capacitance element, belonging to the first group and being positioned at a position at which an electrode interval narrows in an overall manner when the third force transmitting member (T3) becomes displaced in the positive Z-axis direction and at which a change such that the electrode interval narrows at one part but widens at another part occurs when the third force transmitting member (T3) becomes inclined" (C36), the fourth sensor (S4) has a "Z-axis displacement detection capacitance element, belonging to the second group and being positioned at a position at which an electrode interval widens in an overall manner when the fourth force transmitting member (T4) becomes displaced in the positive Z-axis direction and at which a change such that the electrode interval narrows at one part but widens at another part occurs when the fourth force transmitting member (T4) becomes inclined" (C45) and a "Z-axis displacement detection capacitance element, belonging to the first group and being positioned at a position at which an electrode interval narrows in an overall manner when the fourth force transmitting member (T4) becomes displaced in the positive Z-axis direction and at which a change such that the electrode interval narrows at one part but widens at another part occurs when the fourth force transmitting member (T4) becomes inclined" (C46), and the detection circuit (30) has a function of detecting a moment Mx about the X-axis that acts on the force receiving member by a difference between an overall static capacitance value of a set of Z-axis displacement detection capacitance elements belonging to the first group and an overall static capacitance value of a set of Z-axis displacement detection capacitance elements belonging to the second group.

11. The force detection device according to claim 10, wherein the first sensor (S1) furthermore has a "Z-axis displacement detection capacitance element, belonging to a third group and being positioned at a position at which an electrode interval widens in an overall manner when the first force transmitting member (T1) becomes displaced in the positive Z-axis direction and at which a change such that the electrode interval narrows at one part but widens at another part occurs when the first force transmitting member (T1) becomes inclined" (C15) and a "Z-axis displacement detection capacitance element, belonging to a fourth group and being positioned at a position at which an electrode interval narrows in an overall manner when the first force transmitting member (T1) becomes displaced in the positive Z-axis direction and at which a change such that the electrode interval narrows at one part but widens at another part occurs when the first force transmitting member (T1) becomes inclined" (C16), the second sensor (S2) furthermore has a "Z-axis displacement detection capacitance element, belonging to the fourth group and being positioned at a position at which an electrode interval widens in an overall manner when the second force transmitting member (T2) becomes displaced in the positive Z-axis direction and at which a change such that the electrode interval narrows at one part but widens at another part occurs when the second force transmitting member (T2) becomes inclined" (C25) and a "Z-axis displacement detection capacitance element, belonging to the third group and being positioned at a position at which an electrode interval narrows in an overall manner when the second force transmitting member (T2) becomes displaced in the positive Z-axis direction and at which a change such that the electrode interval narrows at one part but widens at another part occurs when the second force transmitting member (T2) becomes inclined" (C26), the third sensor (S3) furthermore has a "Z-axis displacement detection capacitance element, belonging to the fourth group and being positioned at a position at which an electrode interval widens in an overall manner when the third force transmitting member (T3) becomes displaced in the positive Z-axis direction and at which a change such that the electrode interval narrows at one part but widens at another part occurs when the third force transmitting member (T3) becomes inclined" (C35) and a "Z-axis displacement detection capacitance element, belonging to the third group and being positioned at a position at which an electrode interval narrows in an overall manner when the third force transmitting member (T3) becomes displaced in the positive Z-axis direction and at which a change such that the electrode interval narrows at one part but widens at another part occurs when the third force transmitting member (T3) becomes inclined" (C36), the fourth sensor (S4) furthermore has a "Z-axis displacement detection capacitance element, belonging to the third group and being positioned at a position at which an electrode interval widens in an overall manner when the fourth force transmitting member (T4) becomes displaced in the positive Z-axis direction and at which a change such that the electrode interval narrows at one part but widens at another part occurs when the fourth force transmitting member (T4) becomes inclined" (C45) and a "Z-axis displacement detection capacitance element, belonging to the fourth group and being positioned at a position at which an electrode interval narrows in an overall manner when the fourth force transmitting member (T4) becomes displaced in the positive Z-axis direction and at which a change such that the electrode interval narrows at one part but widens at another part occurs when the fourth force transmitting member (T4) becomes inclined" (C46), and the detection circuit (30) has a function of detecting a moment My about the Y-axis that acts on the force receiving member by a difference between an overall static capacitance value of a set of Z-axis displacement detection capacitance elements belonging to the third group and an overall static capacitance value of a set of Z-axis displacement detection capacitance elements belonging to the fourth group.

12. The force detection device according to claim 10, wherein the first sensor (S1) furthermore has a "Z-axis displacement detection capacitance element, belonging to a fifth group and being positioned at a position at which an electrode interval widens in an overall manner when the first force transmitting member (T1) becomes displaced in the positive Z-axis direction and at which a change such that the electrode interval narrows at one part but widens at another part occurs when the first force transmitting member (T1) becomes inclined" (C15) and a "Z-axis displacement detection capacitance element, belonging to a sixth group and being positioned at a position at which an electrode interval narrows in an overall manner when the first force transmitting member (T1) becomes displaced in the positive Z-axis direction and at which a change such that the electrode interval narrows at one part but widens at another part occurs when the first force transmitting member (T1) becomes inclined" (C16), the second sensor (S2) furthermore has a "Z-axis displacement detection capacitance element, belonging to the fifth group and being positioned at a position at which an electrode interval widens in an overall manner when the second force transmitting member (T2)

becomes displaced in the positive Z-axis direction and at which a change such that the electrode interval narrows at one part but widens at another part occurs when the second force transmitting member (T2) becomes inclined" (C25) and a "Z-axis displacement detection capacitance element, belonging to the sixth group and being positioned at a position at which an electrode interval narrows in an overall manner when the second force transmitting member (T2) becomes displaced in the positive Z-axis direction and at which a change such that the electrode interval narrows at one part but widens at another part occurs when the second force transmitting member (T2) becomes inclined" (C26), the third sensor (S3) furthermore has a "Z-axis displacement detection capacitance element, belonging to the fifth group and being positioned at a position at which an electrode interval widens in an overall manner when the third force transmitting member (T3) becomes displaced in the positive Z-axis direction and at which a change such that the electrode interval narrows at one part but widens at another part occurs when the third force transmitting member (T3) becomes inclined" (C35) and a "Z-axis displacement detection capacitance element, belonging to the sixth group and being positioned at a position at which an electrode interval narrows in an overall manner when the third force transmitting member (T3) becomes displaced in the positive Z-axis direction and at which a change such that the electrode interval narrows at one part but widens at another part occurs when the third force transmitting member (T3) becomes inclined" (C36), the fourth sensor (S4) furthermore has a "Z-axis displacement detection capacitance element, belonging to the fifth group and being positioned at a position at which an electrode interval widens in an overall manner when the fourth force transmitting member (T4) becomes displaced in the positive Z-axis direction and at which a change such that the electrode interval narrows at one part but widens at another part occurs when the fourth force transmitting member (T4) becomes inclined" (C45) and a "Z-axis displacement detection capacitance element, belonging to the sixth group and being positioned at a position at which an electrode interval narrows in an overall manner when the fourth force transmitting member (T4) becomes displaced in the positive Z-axis direction and at which a change such that the electrode interval narrows at one part but widens at another part occurs when the fourth force transmitting member (T4) becomes inclined" (C46), and the detection circuit (30) has a function of detecting a force Fz in the Z-axis direction, which acts on the force receiving member, by a difference between an overall static capacitance value of a set of Z-axis displacement detection capacitance elements belonging to the fifth group and an overall static capacitance value of a set of Z-axis displacement detection capacitance elements belonging to the sixth group.

13. The force detection device according to claim 6, wherein the first sensor (S1) has an "X-axis inclination detection capacitance element, belonging to a first group and being positioned at a position at which an electrode interval narrows when the first force transmitting member (T1) becomes inclined in a positive X-axis direction" (C11), an "X-axis inclination detection capacitance element, belonging to a second group and being positioned at a position at which an electrode interval widens when the first force transmitting member (T1) becomes inclined in the positive X-axis direction" (C12), a "Y-axis inclination detection capacitance element, belonging to the second group and being positioned at a position at which an electrode interval narrows when the first force transmitting member (T1) becomes inclined in a positive Y-axis direction" (C13), and a "Y-axis inclination detection capacitance element, belonging to the first group and being positioned at a position at which an electrode interval widens when the first force transmitting member (T1) becomes inclined in the positive Y-axis direction" (C14), the second sensor (S2) has an "X-axis inclination detection capacitance element, belonging to the first group and being positioned at a position at which an electrode interval narrows when the second force transmitting member (T2) becomes inclined in the positive X-axis direction" (C21), an "X-axis inclination detection capacitance element, belonging to the second group and being positioned at a position at which an electrode interval widens when the second force transmitting member (T2) becomes inclined in the positive X-axis direction" (C22), a "Y-axis inclination detection capacitance element, belonging to the first group and being positioned at a position at which an electrode interval narrows when the second force transmitting member (T2) becomes inclined in the positive Y-axis direction" (C23), and a "Y-axis inclination detection capacitance element, belonging to the second group and being positioned at a position at which an electrode interval widens when the second force transmitting member (T2) becomes inclined in the positive Y-axis direction" (C24), the third sensor (S3) has an "X-axis inclination detection capacitance element, belonging to the second group and being positioned at a position at which an electrode interval narrows when the third force transmitting member (T3) becomes inclined in the positive X-axis direction" (C31), an "X-axis inclination detection capacitance element, belonging to the first group and being positioned at a position at which an electrode interval widens when the third force transmitting member (T3) becomes inclined in the positive X-axis direction" (C32), a "Y-axis inclination detection capacitance element, belonging to the first group and being positioned at a position at which an electrode interval narrows when the third force transmitting member (T3) becomes inclined in the positive Y-axis direction" (C33), and a "Y-axis inclination detection capacitance element, belonging to the second group and being positioned at a position at which an electrode interval widens when the third force transmitting member (T3) becomes inclined in the positive Y-axis direction" (C34), the fourth sensor (S4) has an "X-axis inclination detection capacitance element, belonging to the second group and being positioned at a position at which an electrode interval narrows when the fourth force transmitting member (T4) becomes inclined in the positive X-axis direction" (C41), an "X-axis inclination detection capacitance element, belonging to the first group and being positioned at a position at which an electrode interval widens when the fourth force transmitting member (T4) becomes inclined in the positive X-axis direction" (C42), a "Y-axis inclination detection capacitance element, belonging to the second group and being positioned at a position at which an electrode interval narrows when the fourth force transmitting member (T4) becomes inclined in the positive Y-axis direction" (C43), and a "Y-axis inclination detection capacitance element, belonging to the first group and being positioned at a position at which an electrode interval widens when the fourth force transmitting member (T4) becomes inclined in the positive Y-axis direction" (C44), and the detection circuit (30) has a function of detecting a moment Mz about the Z-axis that acts on the force receiving member by a difference between an overall static capacitance value of a set of capacitance elements belonging to the first group and an overall static capacitance value of a set of capacitance elements belonging to the second group.

14. The force detection device according to claim 13, wherein the X-axis inclination detection capacitance element, belonging to the first group that forms the first sensor, and the Y-axis inclination detection capacitance element, belonging to the first group that forms the first sensor, are comprised as a physically single capacitance element (E11/14, 215), the X-axis inclination detection capacitance element, belonging to the second group that forms the first sensor, and the Y-axis inclination detection capacitance element, belonging to the second group that forms the first sensor, are comprised as a physically single capacitance element (E12/13, 215), the X-axis inclination detection capacitance element, belonging to the first group that forms the second sensor, and the Y-axis inclination detection capacitance element, belonging to the first group that forms the second sensor, are comprised as a physically single capacitance element (E21/23, 225), the X-axis inclination detection capacitance element, belonging to the second group that forms the second sensor, and the Y-axis inclination detection capacitance element, belonging to the second group that forms the second sensor, are comprised as a physically single capacitance element (E22/24, 225), the X-axis inclination detection capacitance element, belonging to the first group that forms the third sensor, and the Y-axis inclination detection capacitance element, belonging to the first group that forms the third sensor, are comprised as a physically single capacitance element (E31/34, 235), the X-axis inclination detection capacitance element, belonging to the second group that forms the third sensor, and the Y-axis inclination detection capacitance element, belonging to the second group that forms the third sensor, are comprised as a physically single capacitance element (E32/33, 235), and the X-axis inclination detection capacitance element, belonging to the first group that forms the fourth sensor, and the Y-axis inclination detection capacitance element, belonging to the first group that forms the fourth sensor, are comprised as a physically single capacitance element (E41/43, 245), the X-axis inclination detection capacitance element, belonging to the second group that forms the fourth sensor, and the Y-axis inclination detection capacitance element, belonging to the second group that forms the fourth sensor, are comprised as a physically single capacitance element (E42/44, 245).

15. The force detection device according to claim 1, wherein when an XYZ three-dimensional coordinate system with an X-axis, a Y-axis and a Z-axis is defined, each of the first to fourth force transmitting members (T1 to T4) is comprised of a structure having the Z-axis direction as a longitudinal direction, a surface on which the fixed electrodes are formed is a surface parallel to an XY plane, the first force transmitting member (T1) is positioned at a position at which a longitudinal direction axis thereof intersects a positive part of the X-axis, the second force transmitting member (T2) is positioned at a position at which a longitudinal direction axis thereof intersects a negative part of the X-axis, the third force transmitting member (T3) is positioned at a position at which a longitudinal direction axis thereof intersects a positive part of the Y-axis, and the fourth force transmitting member (T4) is positioned at a position at which a longitudinal direction axis thereof intersects a negative part of the Y-axis.

16. The force detection device according to claim 15, wherein the first sensor (S1) has a "Z-axis displacement detection capacitance element, belonging to a first group and being positioned at a position at which an electrode interval widens in an overall manner when the first force transmitting member (T1) becomes displaced in a positive Z-axis direction and at which a change such that the electrode interval narrows at one part but widens at another part occurs when the first force transmitting member (T1) becomes inclined" (C15) and a "Z-axis displacement detection capacitance element, belonging to a second group and being positioned at a position at which an electrode interval narrows in an overall manner when the first force transmitting member (T1) becomes displaced in the positive Z-axis direction and at which a change such that the electrode interval narrows at one part but widens at another part occurs when the first force transmitting member (T1) becomes inclined" (C16), the second sensor (S2) has a "Z-axis displacement detection capacitance element, belonging to the second group and being positioned at a position at which an electrode interval widens in an overall manner when the second force transmitting member (T2) becomes displaced in the positive Z-axis direction and at which a change such that the electrode interval narrows at one part but widens at another part occurs when the second force transmitting member (T2) becomes inclined" (C25) and a "Z-axis displacement detection capacitance element, belonging to the first group and being positioned at a position at which an electrode interval narrows in an overall manner when the second force transmitting member (T2) becomes displaced in the positive Z-axis direction and at which a change such that the electrode interval narrows at one part but widens at another part occurs when the second force transmitting member (T2) becomes inclined" (C26), the third sensor (S3) has a "Z-axis displacement detection capacitance element, belonging to a third group and being positioned at a position at which an electrode interval widens in an overall manner when the third force transmitting member (T3) becomes displaced in the positive Z-axis direction and at which a change such that the electrode interval narrows at one part but widens at another part occurs when the third force transmitting member (T3) becomes inclined" (C35) and a "Z-axis displacement detection capacitance element, belonging to a fourth group and being positioned at a position at which an electrode interval narrows in an overall manner when the third force transmitting member (T3) becomes displaced in the positive Z-axis direction and at which a change such that the electrode interval narrows at one part but widens at another part occurs when the third force transmitting member (T3) becomes inclined" (C36), the fourth sensor (S4) has a "Z-axis displacement detection capacitance element, belonging to the fourth group and being positioned at a position at which an electrode interval widens in an overall manner when the fourth force transmitting member (T4) becomes displaced in the positive Z-axis direction and at which a change such that the electrode interval narrows at one part but widens at another part occurs when the fourth force transmitting member (T4) becomes inclined" (C45) and a "Z-axis displacement detection capacitance element, belonging to the third group and being positioned at a position at which an electrode interval narrows in an overall manner when the fourth force transmitting member (T4) becomes displaced in the positive Z-axis direction and at which a change such that the electrode interval narrows at one part but widens at another part occurs when the fourth force transmitting member (T4) becomes inclined" (C46), and the detection circuit (30) has a function of detecting a moment My about the Y-axis that acts on the force receiving member by a difference between an overall static capacitance value of a set of Z-axis displacement detection capacitance elements belonging to the first group and an overall static capacitance value of a set of Z-axis displacement detection capacitance elements belonging to the second group and a function of detecting a moment Mx about the X-axis that acts on the force receiving member by a difference between an overall static capacitance value of a set of Z-axis displacement detection capacitance elements belonging to the third group and an overall static capacitance value of a set of Z-axis displacement detection capacitance elements belonging to the fourth group.

17. The force detection device according to claim 16, wherein the first sensor (S1) furthermore has a "Z-axis displacement detection capacitance element, belonging to a fifth group and being positioned at a position at which an electrode interval widens in an overall manner when the first force transmitting member (T1) becomes displaced in the positive Z-axis direction and at which a change such that the electrode interval narrows at one part but widens at another part occurs when the first force transmitting member (T1) becomes inclined" (C15) and a "Z-axis displacement detection capacitance element, belonging to a sixth group and being positioned at a position at which an electrode interval narrows in an overall manner when the first force transmitting member (T1) becomes displaced in the positive Z-axis direction and at which a change such that the electrode interval narrows at one part but widens at another part occurs when the first force transmitting member (T1) becomes inclined" (C16), the second sensor (S2) furthermore has a "Z-axis displacement detection capacitance element, belonging to the fifth group and being positioned at a position at which an electrode interval widens in an overall manner when the second force transmitting member (T2) becomes displaced in the positive Z-axis direction and at which a change such that the electrode interval narrows at one part but widens at another part occurs when the second force transmitting member (T2) becomes inclined" (C25) and a "Z-axis displacement detection capacitance element, belonging to the sixth group and being positioned at a position at which an electrode interval narrows in an overall manner when the second force transmitting member (T2) becomes displaced in the positive Z-axis direction and at which a change such that the electrode interval narrows at one part but widens at another part occurs when the second force transmitting member (T2) becomes inclined" (C26), the third sensor (S3) furthermore has a "Z-axis displacement detection capacitance element, belonging to the fifth group and being positioned at a position at which an electrode interval widens in an overall manner when the third force transmitting member (T3) becomes displaced in the positive Z-axis direction and at which a change such that the electrode interval narrows at one part but widens at another part occurs when the third force transmitting member (T3) becomes inclined" (C35) and a "Z-axis displacement detection capacitance element, belonging to the sixth group and being positioned at a position at which an electrode interval narrows in an overall manner when the third force transmitting member becomes displaced in the positive Z-axis direction and at which a change such that the electrode interval narrows at one part but widens at another part occurs when the third force transmitting member becomes inclined" (C36), the fourth sensor (S4) furthermore has a "Z-axis displacement detection capacitance element, belonging to the fifth group and being positioned at a position at which an electrode interval widens in an overall manner when the fourth force transmitting member (T4) becomes displaced in the positive Z-axis direction and at which a change such that the electrode interval narrows at one part but widens at another part occurs when the fourth force transmitting member (T4) becomes inclined" (C45) and a "Z-axis displacement detection capacitance element, belonging to the sixth group and being positioned at a position at which an electrode interval narrows in an overall manner when the fourth force transmitting member (T4) becomes displaced in the positive Z-axis direction and at which a change such that the electrode interval narrows at one part but widens at another part occurs when the fourth force transmitting member (T4) becomes inclined" (C46), and the detection circuit (30) has a function of detecting a force Fz in the Z-axis direction, which acts on the force receiving member, by a difference between an overall static capacitance value of a set of Z-axis displacement detection capacitance elements belonging to the fifth group and an overall static capacitance value of a set of Z-axis displacement detection capacitance elements belonging to the sixth group.

18. The force detection device according to claim 15, wherein the first sensor (S1) has a "Y-axis inclination detection capacitance element, belonging to a first group and being positioned at a position at which an electrode interval narrows when the first force transmitting member (T1) becomes inclined in a positive Y-axis direction" (C13), and a "Y-axis inclination detection capacitance element, belonging to a second group and being positioned at a position at which an electrode interval widens when the first force transmitting member (T1) becomes inclined in the positive Y-axis direction" (C14), the second sensor (S2) has a "Y-axis inclination detection capacitance element, belonging to the second group and being positioned at a position at which an electrode interval narrows when the second force transmitting member (T2) becomes inclined in the positive Y-axis direction" (C23), and a "Y-axis inclination detection capacitance element, belonging to the first group and being positioned at a position at which an electrode interval widens when the second force transmitting member (T2) becomes inclined in the positive Y-axis direction" (C24), the third sensor (S3) has an "X-axis inclination detection capacitance element, belonging to the second group and being positioned at a position at which an electrode interval narrows when the third force transmitting member (T3) becomes inclined in a positive X-axis direction" (C31), and an "X-axis inclination detection capacitance element, belonging to the first group and being positioned at a position at which an electrode interval widens when the third force transmitting member (T3) becomes inclined in the positive X-axis direction" (C32), the fourth sensor (S4) has an "X-axis inclination detection capacitance element, belonging to the first group and being positioned at a position at which an electrode interval narrows when the fourth force transmitting member (T4) becomes inclined in the positive X-axis direction" (C41), and an "X-axis inclination detection capacitance element, belonging to the second group and being positioned at a position at which an electrode interval widens when the fourth force transmitting member (T4) becomes inclined in the positive X-axis direction" (C42), and the detection circuit (30) has a function of detecting a moment Mz about the Z-axis that acts on the force receiving member by a difference between an overall static capacitance value of a set of capacitance elements belonging to the first group and an overall static capacitance value of a set of capacitance elements belonging to the second group.

19. The force detection device according to claim 2, wherein with an xy two-dimensional coordinate system, having an origin along a longitudinal direction axis of a specific force transmitting member, having an x-axis parallel to the X-axis, and having a y-axis parallel to Y-axis, being defined, the X-axis inclination detection capacitance element for said force transmitting member is comprised of a pair of capacitance elements having electrodes (E1, E2), positioned respectively at a positive part and a negative part of the x-axis.

20. The force detection device according to claim 3, wherein with an xy two-dimensional coordinate system, having an origin along a longitudinal direction axis of a specific force transmitting member, having an x-axis parallel to the X-axis, and having a y-axis parallel to Y-axis, being defined, the Y-axis inclination detection capacitance element for said force transmitting member is comprised of a pair of capacitance elements having electrodes (E3, E4), positioned respectively at a positive part and a negative part of the y-axis.

21. The force detection device according to claim 4, wherein the Z-axis displacement detection capacitance element for a specific force transmitting member is comprised of a capacitance element having a circular or annular electrode (E5) centered about a longitudinal direction axis of said force transmitting member.

22. The force detection device according to claim 21, wherein a plurality of Z-axis displacement capacitance elements are formed of a plurality of circular or annular electrodes (E15 to E45) that are positioned concentrically on the same plane.

23. The force detection device according to claim 1, wherein the upper ends of the respective force transmitting members (T1 to T4) are connected to the force receiving member (100) via connecting members (115, 125, 135 and 145) that have flexibility.

24. The force detection device according to claim 23, wherein the force receiving member (100) is comprised of a plate-like member, the respective force transmitting members (T1 to T4) are comprised of columnar members, and the connecting members (115, 125, 135 and 145), connecting the force receiving member with the respective force transmitting members, are comprised of thin parts of the plate-like force receiving member.

25. The force detection device according to claim 1, wherein the respective force transmitting members (T1 to T4) are comprised of columnar members, lower surfaces of said force transmitting members are joined to centers of diaphragms (215, 225, 235 and 245) that function as connecting members, and by fixing circumferences of said diaphragms to the supporting member (300), the force transmitting members are connected to the supporting member.

26. The force detection device according to claim 25, wherein diaphragms (215, 225, 235, and 245), having flexibility and conductivity, are used as the connecting members, the lower surfaces of the force transmitting members (T1 to T4) are joined to the centers of the diaphragms, and by fixing the circumferences of said diaphragms to the supporting member (300), the force transmitting members are connected to the supporting member and said diaphragms themselves are used as displaceable electrodes.

27. The force detection device according to claim 25, wherein at least a part of the plurality of fixed electrodes (E11 to E45) are formed on a top surface of the supporting member (300) so that at least a part of the capacitance elements are formed below the diaphragms (215, 225, 235 and 245).

28. The force detection device according to claim 25, wherein an auxiliary base plate (400), having openings (H1 to H4) for passing through the force transmitting members (T1 to T4), is fixed to the supporting member (300) so as to be positioned above the diaphragms (215, 225, 235 and 245), and at least a part of the plurality of fixed electrodes (E11 to E45) are formed on a bottom surface of said auxiliary base plate so that at least a part of the capacitance elements are formed above the diaphragms.

29. The force detection device according to claim 3, wherein the first sensor (S1) furthermore has a "Z-axis displacement detection capacitance element, being positioned at a position at which an electrode interval undergoes a change of either narrowing or widening in an overall manner when the first force transmitting member (T1) becomes displaced in the Z-axis direction and at which a change such that the electrode interval narrows at one part but widens at another part occurs when the first force transmitting member (T1) becomes inclined" (C15), the second sensor (S2) furthermore has a "Z-axis displacement detection capacitance element, being positioned at a position at which an electrode interval undergoes a change of either narrowing or widening in an overall manner when the second force transmitting member (T2) becomes displaced in the Z-axis direction and at which a change such that the electrode interval narrows at one part but widens at another part occurs when the second force transmitting member (T2) becomes inclined" (C25), the third sensor (S3) furthermore has a "Z-axis displacement detection capacitance element, being positioned at a position at which an electrode interval undergoes a change of either narrowing or widening in an overall manner when the third force transmitting member (T3) becomes displaced in the Z-axis direction and at which a change such that the electrode interval narrows at one part but widens at another part occurs when the third force transmitting member (T3) becomes inclined" (C35), the fourth sensor (S4) furthermore has a "Z-axis displacement detection capacitance element, being positioned at a position at which an electrode interval undergoes a change of either narrowing or widening in an overall manner when the fourth force transmitting member (T4) becomes displaced in the Z-axis direction and at which a change such that the electrode interval narrows at one part but widens at another part occurs when the fourth force transmitting member (T4) becomes inclined" (C45), the Z-axis displacement detection capacitance elements of said first to fourth sensors are connected to each other in parallel by a wiring, and the detection circuit (30) has a function of detecting a force Fz in the Z-axis direction, which acts on the force receiving member, by an overall static capacitance value of a set of capacitance elements that are connected in parallel.

30. The force detection device according to claim 8, wherein the first sensor (S1) furthermore has a "Z-axis displacement detection capacitance element, belonging to a fifth group and being positioned at a position at which an electrode interval undergoes a change of either narrowing or widening in an overall manner when the first force transmitting member (T1) becomes displaced in the Z-axis direction and at which a change such that the electrode interval narrows at one part but widens at another part occurs when the first force transmitting member (T1) becomes inclined" (C15), the second sensor (S2) furthermore has a "Z-axis displacement detection capacitance element, belonging to the fifth group and being positioned at a position at which an electrode interval undergoes a change of either narrowing or widening in an overall manner when the second force transmitting member (T2) becomes displaced in the Z-axis direction and at which a change such that the electrode interval narrows at one part but widens at another part occurs when the second force transmitting member (T2) becomes inclined" (C25), the third sensor (S3) furthermore has a "Z-axis displacement detection capacitance element, belonging to the fifth group and being positioned at a position at which an electrode interval undergoes a change of either narrowing or widening in an overall manner when the third force transmitting member (T3) becomes displaced in the Z-axis direction and at which a change such that the electrode interval narrows at one part but widens at another part occurs when the third force transmitting member (T3) becomes inclined" (C35), the fourth sensor (S4) furthermore has a "Z-axis displacement detection capacitance element, belonging to the fifth group and being positioned at a position at which an electrode interval undergoes a change of either narrowing or widening in an overall manner when the fourth force transmitting member (T4) becomes displaced in the Z-axis direction and at which a change such that the electrode interval narrows at one part but widens at another part occurs when the fourth force transmitting member (T4) becomes inclined" (C45), and the detection circuit (30) has a function of detecting a force Fz in the Z-axis direction, which acts on the force receiving member, by an overall static capacitance value of a set of Z-axis displacement detection capacitance elements belonging to the fifth group.

31. The force detection device according to claim 11, wherein the first sensor (S1) furthermore has a "Z-axis displacement detection capacitance element, belonging to a fifth group and being positioned at a position at which an electrode interval widens in an overall manner when the first force transmitting member (T1) becomes displaced in the positive Z-axis direction and at which a change such that the electrode interval narrows at one part but widens at another part occurs when the first force transmitting member (T1) becomes inclined" (C15) and a "Z-axis displacement detection capacitance element, belonging to a sixth group and being positioned at a position at which an electrode interval narrows in an overall manner when the first force transmitting member (T1) becomes displaced in the positive Z-axis direction and at which a change such that the electrode interval narrows at one part but widens at another part occurs when the first force transmitting member (T1) becomes inclined" (C16), the second sensor (S2) furthermore has a "Z-axis displacement detection capacitance element, belonging to the fifth group and being positioned at a position at which an electrode interval widens in an overall manner when the second force transmitting member (T2) becomes displaced in the positive Z-axis direction and at which a change such that the electrode interval narrows at one part but widens at another part occurs when the second force transmitting member (T2) becomes inclined" (C25) and a "Z-axis displacement detection capacitance element, belonging to the sixth group and being positioned at a position at which an electrode interval narrows in an overall manner when the second force transmitting member (T2) becomes displaced in the positive Z-axis direction and at which a change such that the electrode interval narrows at one part but widens at another part occurs when the second force transmitting member (T2) becomes inclined" (C26), the third sensor (S3) furthermore has a "Z-axis displacement detection capacitance element, belonging to the fifth group and being positioned at a position at which an electrode interval widens in an overall manner when the third force transmitting member (T3) becomes displaced in the positive Z-axis direction and at which a change such that the electrode interval narrows at one part but widens at another part occurs when the third force transmitting member (T3) becomes inclined" (C35) and a "Z-axis displacement detection capacitance element, belonging to the sixth group and being positioned at a position at which an electrode interval narrows in an overall manner when the third force transmitting member (T3) becomes displaced in the positive Z-axis direction and at which a change such that the electrode interval narrows at one part but widens at another part occurs when the third force transmitting member (T3) becomes inclined" (C36), the fourth sensor (S4) furthermore has a "Z-axis displacement detection capacitance element, belonging to the fifth group and being positioned at a position at which an electrode interval widens in an overall manner when the fourth force transmitting member (T4) becomes displaced in the positive Z-axis direction and at which a change such that the electrode interval narrows at one part but widens at another part occurs when the fourth force transmitting member (T4) becomes inclined" (C45) and a "Z-axis displacement detection capacitance element, belonging to the sixth group and being positioned at a position at which an electrode interval narrows in an overall manner when the fourth force transmitting member (T4) becomes displaced in the positive Z-axis direction and at which a change such that the electrode interval narrows at one part but widens at another part occurs when the fourth force transmitting member (T4) becomes inclined" (C46), and the detection circuit (30) has a function of detecting a force Fz in the Z-axis direction, which acts on the force receiving member, by a difference between an overall static capacitance value of a set of Z-axis displacement detection capacitance elements belonging to the fifth group and an overall static capacitance value of a set of Z-axis displacement detection capacitance elements belonging to the sixth group.

32. The force detection device according to claims 13, wherein
with an xy two-dimensional coordinate system, having an origin along a longitudinal direction axis of a specific force transmitting member, having an x-axis parallel to the X-axis, and having a y-axis parallel to Y-axis, being defined, the X-axis inclination detection capacitance element for said force transmitting member is comprised of a pair of capacitance elements having electrodes (E1, E2), positioned respectively at a positive part and a negative part of the x-axis.

33. The force detection device according to claims 18, wherein
with an xy two-dimensional coordinate system, having an origin along a longitudinal direction axis of a specific force transmitting member, having an x-axis parallel to the X-axis, and having a y-axis parallel to Y-axis, being defined, the X-axis inclination detection capacitance element for said force transmitting member is comprised of a pair of capacitance elements having electrodes (E1, E2), positioned respectively at a positive part and a negative part of the x-axis.

34. The force detection device according to claim 13, wherein
with an xy two-dimensional coordinate system, having an origin along a longitudinal direction axis of a specific force transmitting member, having an x-axis parallel to the X-axis, and having a y-axis parallel to Y-axis, being defined, the Y-axis inclination detection capacitance element for said force transmitting member is comprised of a pair of capacitance elements having electrodes (E3, E4), positioned respectively at a positive part and a negative part of the y-axis.

35. The force detection device according to claim 18, wherein
with an xy two-dimensional coordinate system, having an origin along a longitudinal direction axis of a specific force transmitting member, having an x-axis parallel to the X-axis, and having a y-axis parallel to Y-axis, being defined, the Y-axis inclination detection capacitance element for said force transmitting member is comprised of a pair of capacitance elements having electrodes (E3, E4), positioned respectively at a positive part and a negative part of the y-axis.

36. The force detection device according to claim 29, wherein
the Z-axis displacement detection capacitance element for a specific force transmitting member is comprised of a capacitance element having a circular or annular electrode (E5) centered about a longitudinal direction axis of said force transmitting member.

37. The force detection device according to claim 5, wherein
the Z-axis displacement detection capacitance element for a specific force transmitting member is comprised of a capacitance element having a circular or annular electrode (E5) centered about a longitudinal direction axis of said force transmitting member.

38. The force detection device according to claim 7, wherein
the Z-axis displacement detection capacitance element for a specific force transmitting member is comprised of a capacitance element having a circular or annular electrode (E5) centered about a longitudinal direction axis of said force transmitting member.

39. The force detection device according to claim 12, wherein
the Z-axis displacement detection capacitance element for a specific force transmitting member is comprised of a capacitance element having a circular or annular electrode (E5) centered about a longitudinal direction axis of said force transmitting member.

40. The force detection device according to claim 31, wherein
the Z-axis displacement detection capacitance element for a specific force transmitting member is comprised of a capacitance element having a circular or annular electrode (E5) centered about a longitudinal direction axis of said force transmitting member.

41. The force detection device according to claim 16, wherein
the Z-axis displacement detection capacitance element for a specific force transmitting member is comprised of a capacitance element having a circular or annular electrode (E5) centered about a longitudinal direction axis of said force transmitting member.

42. The force detection device according to claim 17, wherein
the Z-axis displacement detection capacitance element for a specific force transmitting member is comprised of a capacitance element having a circular or annular electrode (E5) centered about a longitudinal direction axis of said force transmitting member.

43. The force detection device according to claim 36, wherein
a plurality of Z-axis displacement capacitance elements are formed of a plurality of circular or annular electrodes (E15 to E45) that are positioned concentrically on the same plane.

44. The force detection device according to claim 37, wherein
a plurality of Z-axis displacement capacitance elements are formed of a plurality of circular or annular electrodes (E15 to E45) that are positioned concentrically on the same plane.

45. The force detection device according to claim 38, wherein
a plurality of Z-axis displacement capacitance elements are formed of a plurality of circular or annular electrodes (E15 to E45) that are positioned concentrically on the same plane.

46. The force detection device according to claim 39, wherein
a plurality of Z-axis displacement capacitance elements are formed of a plurality of circular or annular electrodes (E15 to E45) that are positioned concentrically on the same plane.

47. The force detection device according to claim 40, wherein
a plurality of Z-axis displacement capacitance elements are formed of a plurality of circular or annular electrodes (E15 to E45) that are positioned concentrically on the same plane.

48. The force detection device according to claim 41, wherein
a plurality of Z-axis displacement capacitance elements are formed of a plurality of circular or annular electrodes (E15 to E45) that are positioned concentrically on the same plane.

49. The force detection device according to claim 42, wherein
a plurality of Z-axis displacement capacitance elements are formed of a plurality of circular or annular electrodes (E15 to E45) that are positioned concentrically on the same plane.

50. The force detection device according to claim 26, wherein
at least a part of the plurality of fixed electrodes (E11 to E45) are formed on a top surface of the supporting member (300) so that at least a part of the capacitance elements are formed below the diaphragms (215, 225, 235 and 245).

51. The force detection device according to claim 26, wherein
an auxiliary base plate (400), having openings (H1 to H4) for passing through the force transmitting members (T1 to T4), is fixed to the supporting member (300) so as to be positioned above the diaphragms (215, 225, 235 and 245), and at least a part of the plurality of fixed electrodes (E11 to E45) are formed on a bottom surface of said auxiliary base plate so that at least a part of the capacitance elements are formed above the diaphragms.

52. The force detection device according to claim 27, wherein
an auxiliary base plate (400), having openings (H1 to H4) for passing through the force transmitting members (T1 to T4), is fixed to the supporting member (300) so as to be positioned above the diaphragms (215, 225, 235 and 245), and at least a part of the plurality of fixed electrodes (E11 to E45) are formed on a bottom surface of said auxiliary base plate so that at least a part of the capacitance elements are formed above the diaphragms.

53. The force detection device according to claim 50, wherein
an auxiliary base plate (400), having openings (H1 to H4) for passing through the force transmitting members (T1 to T4), is fixed to the supporting member (300) so as to be positioned above the diaphragms (215, 225, 235 and 245), and at least a part of the plurality of fixed electrodes (E11 to E45) are formed on a bottom surface of said auxiliary base plate so that at least a part of the capacitance elements are formed above the diaphragms.

* * * * *